United States Patent
LaCross et al.

(10) Patent No.: US 12,528,424 B2
(45) Date of Patent: Jan. 20, 2026

(54) VEHICULAR IMAGING SYSTEM WITH EXTENDABLE CAMERA

(71) Applicant: Magna Mirrors of America, Inc., Holland, MI (US)

(72) Inventors: Anthony J. LaCross, Hastings, MI (US); Timothy W. Condron, Canton, MI (US); Darryl P. De Wind, Canton, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 501 days.

(21) Appl. No.: 18/001,086

(22) PCT Filed: Jun. 24, 2021

(86) PCT No.: PCT/US2021/070765
§ 371 (c)(1),
(2) Date: Dec. 8, 2022

(87) PCT Pub. No.: WO2021/263280
PCT Pub. Date: Dec. 30, 2021

(65) Prior Publication Data
US 2023/0211740 A1    Jul. 6, 2023

Related U.S. Application Data

(60) Provisional application No. 63/202,633, filed on Jun. 18, 2021, provisional application No. 62/706,640, (Continued)

(51) Int. Cl.
*H04N 7/18* (2006.01)
*B60R 1/12* (2006.01)
(Continued)

(52) U.S. Cl.
CPC ................ *B60R 11/04* (2013.01); *B60R 1/12* (2013.01); *B60R 1/22* (2022.01);
(Continued)

(58) Field of Classification Search
CPC .. B60R 11/04; B60R 1/22; B60R 1/12; B60R 2001/1215; B60R 2011/004;
(Continued)

(56) References Cited

U.S. PATENT DOCUMENTS

| 5,550,677 A | 8/1996 | Schofield et al. |
| 5,670,935 A | 9/1997 | Schofield et al. |

(Continued)

FOREIGN PATENT DOCUMENTS

| CN | 104006123 A | 8/2014 |
| CN | 102712287 B | 4/2015 |

(Continued)

OTHER PUBLICATIONS

International Search Report and Written Opinion dated Sep. 23, 2021 for corresponding PCT Application No. PCT/US2021/070765.

Primary Examiner — Patrick E Demosky
(74) Attorney, Agent, or Firm — HONIGMAN LLP

(57) ABSTRACT

A vehicular camera monitoring system includes an electronic control unit (ECU) at a vehicle and a support arm movably disposed at a side portion of the vehicle, with the support arm having a base end attached at the side portion of the vehicle and a distal end opposite the base end. A camera is disposed at the distal end of the support arm. The support arm is movable between a stowed position and an extended position. A cover element covers an aperture at the side portion at least when the support arm is in the extended position. The camera, when the support arm is in the extended position, captures image data and provides captured image data to the ECU, which processes the provided
(Continued)

image data for (i) display of video images derived from provided image data and/or (ii) detection of an object in the field of view of the camera.

35 Claims, 39 Drawing Sheets

Related U.S. Application Data filed on Aug. 31, 2020, provisional application No. 62/705,371, filed on Jun. 24, 2020.

(51) Int. Cl.
 *B60R 1/22* (2022.01)
 *B60R 11/04* (2006.01)
 *B60R 11/00* (2006.01)

(52) U.S. Cl.
 CPC . *B60R 2001/1215* (2013.01); *B60R 2011/004* (2013.01); *B60R 2011/0082* (2013.01); *B60R 2011/0092* (2013.01); *B60R 2011/0094* (2013.01)

(58) Field of Classification Search
 CPC ..... B60R 2011/0082; B60R 2011/0092; B60R 2011/0094
 See application file for complete search history.

(56) References Cited

U.S. PATENT DOCUMENTS

| | | | |
|---|---|---|---|
| 5,760,962 A | 6/1998 | Schofield et al. | |
| 5,796,094 A | 8/1998 | Schofield et al. | |
| 6,097,023 A | 8/2000 | Schofield et al. | |
| 7,777,611 B2 | 8/2010 | Desai | |
| 7,887,202 B1 | 2/2011 | Peterson | |
| 7,965,336 B2 | 6/2011 | Bingle et al. | |
| 9,041,806 B2 | 5/2015 | Baur et al. | |
| 9,126,525 B2 | 9/2015 | Lynam et al. | |
| 9,487,142 B2 | 11/2016 | Sobecki et al. | |
| 9,676,336 B2 | 6/2017 | Peterson et al. | |
| 9,762,880 B2 | 9/2017 | Pflug | |
| 9,900,522 B2 | 2/2018 | Lu | |
| 10,046,706 B2 | 8/2018 | Larson et al. | |
| 10,071,687 B2 | 9/2018 | Ihlenburg et al. | |
| 10,166,924 B2 | 1/2019 | Baur | |
| 10,171,796 B2 | 1/2019 | Sekiguchi et al. | |
| 10,343,621 B2 | 7/2019 | Brouwer et al. | |
| 10,421,404 B2 | 9/2019 | Larson et al. | |
| 10,442,360 B2 | 10/2019 | LaCross et al. | |
| 10,836,327 B2 | 11/2020 | Da Deppo et al. | |
| 11,173,839 B2 * | 11/2021 | Wilson | B60R 11/04 |
| 11,242,008 B2 | 2/2022 | Blank et al. | |
| 11,465,561 B2 | 10/2022 | Peterson et al. | |
| 11,708,035 B2 | 7/2023 | LaCross | |
| 11,912,204 B2 | 2/2024 | Peterson et al. | |
| 2012/0162427 A1 | 6/2012 | Lynam | |
| 2012/0315027 A1 | 12/2012 | Schutz | |
| 2014/0235392 A1 | 8/2014 | Yamaguchi et al. | |
| 2014/0285666 A1 | 9/2014 | O'Connell et al. | |
| 2015/0022664 A1 | 1/2015 | Pflug et al. | |
| 2015/0097953 A1 | 4/2015 | Stambaugh | |
| 2015/0183380 A1 | 7/2015 | Da Deppo et al. | |
| 2015/0304612 A1 | 10/2015 | Richards et al. | |
| 2016/0096486 A1 | 4/2016 | Dziurda et al. | |
| 2017/0104907 A1 | 4/2017 | Rajhansa et al. | |
| 2017/0134661 A1 | 5/2017 | Chietein et al. | |
| 2017/0264797 A1 | 9/2017 | Trinh et al. | |
| 2017/0280111 A1 | 9/2017 | Henion et al. | |
| 2017/0355312 A1 | 12/2017 | Habibi et al. | |
| 2018/0106082 A1 * | 4/2018 | Brown | E05B 85/107 |
| 2018/0134217 A1 | 5/2018 | Peterson et al. | |
| 2018/0151152 A1 * | 5/2018 | Hirosawa | B60R 1/12 |
| 2018/0152604 A1 | 5/2018 | Wierich | |
| 2019/0047475 A1 | 2/2019 | Uken et al. | |
| 2019/0118717 A1 | 4/2019 | Blank et al. | |
| 2019/0118728 A1 | 4/2019 | Oba et al. | |
| 2019/0146297 A1 | 5/2019 | Lynam et al. | |
| 2019/0258131 A9 | 8/2019 | Lynam et al. | |
| 2019/0329720 A1 | 10/2019 | Brouwer et al. | |
| 2020/0025596 A1 | 1/2020 | Parsons | |
| 2020/0114762 A1 | 4/2020 | Shigefuji et al. | |
| 2020/0175722 A1 * | 6/2020 | Nagai | H04N 23/698 |
| 2020/0223364 A1 | 7/2020 | Peterson et al. | |
| 2020/0238910 A1 | 7/2020 | Wilson et al. | |
| 2020/0298762 A1 | 9/2020 | Ichimura et al. | |
| 2020/0377022 A1 | 12/2020 | LaCross et al. | |
| 2020/0398767 A1 | 12/2020 | Park et al. | |
| 2021/0024000 A1 | 1/2021 | Peterson et al. | |
| 2021/0094473 A1 | 4/2021 | Gali et al. | |
| 2021/0155167 A1 | 5/2021 | Lynam et al. | |
| 2021/0162926 A1 | 6/2021 | Lu | |
| 2021/0245662 A1 | 8/2021 | Blank et al. | |
| 2021/0261053 A1 | 8/2021 | Peterson et al. | |
| 2021/0323473 A1 | 10/2021 | Peterson et al. | |
| 2022/0032858 A1 | 2/2022 | LaCross | |
| 2022/0258670 A1 | 8/2022 | Hanchett et al. | |
| 2022/0258672 A1 | 8/2022 | Peterson et al. | |
| 2023/0211740 A1 | 7/2023 | LaCross et al. | |

FOREIGN PATENT DOCUMENTS

| | | |
|---|---|---|
| CN | 110562142 A | 12/2019 |
| EP | 3043202 A1 | 7/2016 |
| KR | 20180056674 A | 5/2018 |
| WO | 2018094163 A1 | 5/2018 |
| WO | 2022150826 A1 | 7/2022 |

* cited by examiner

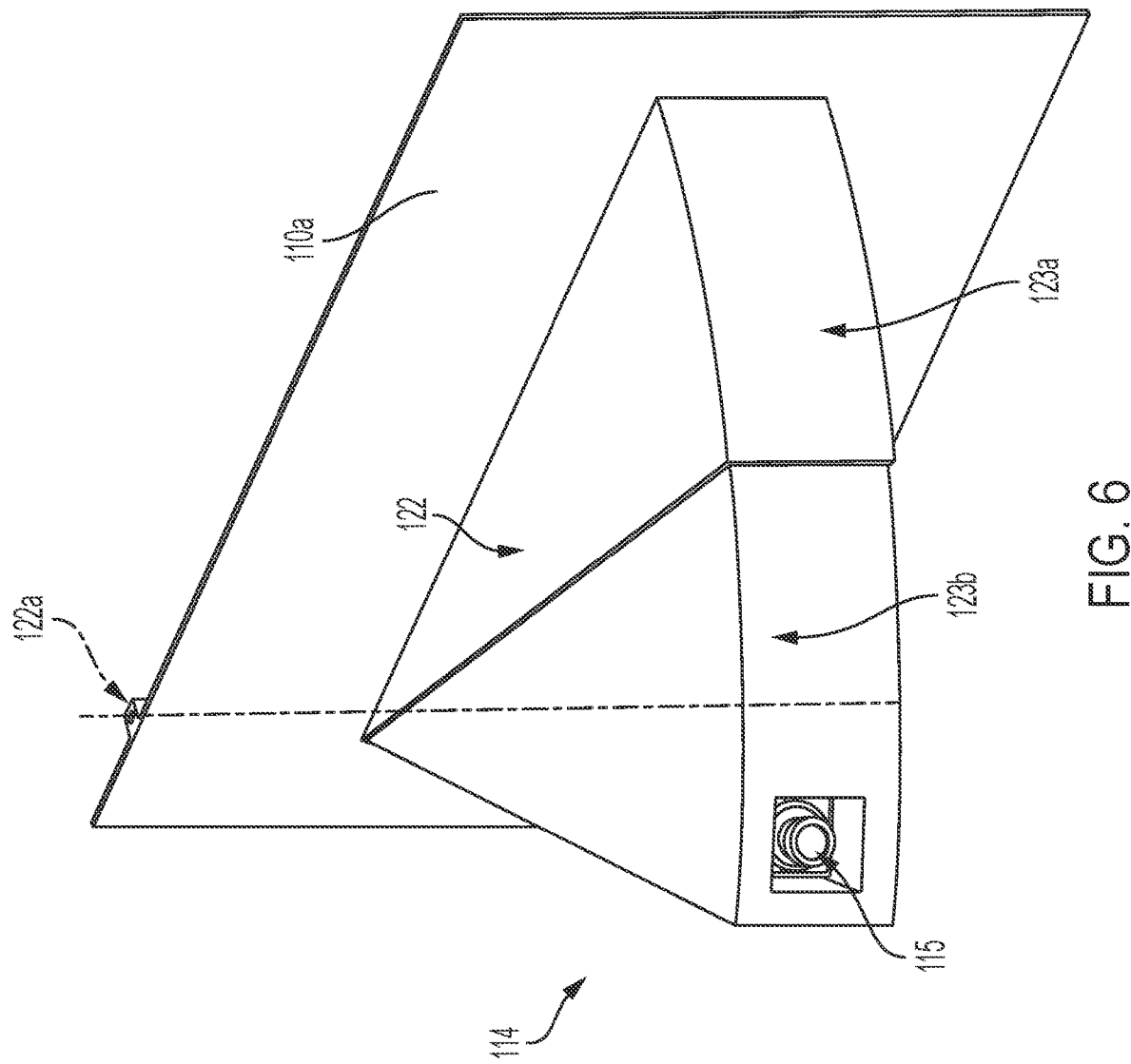

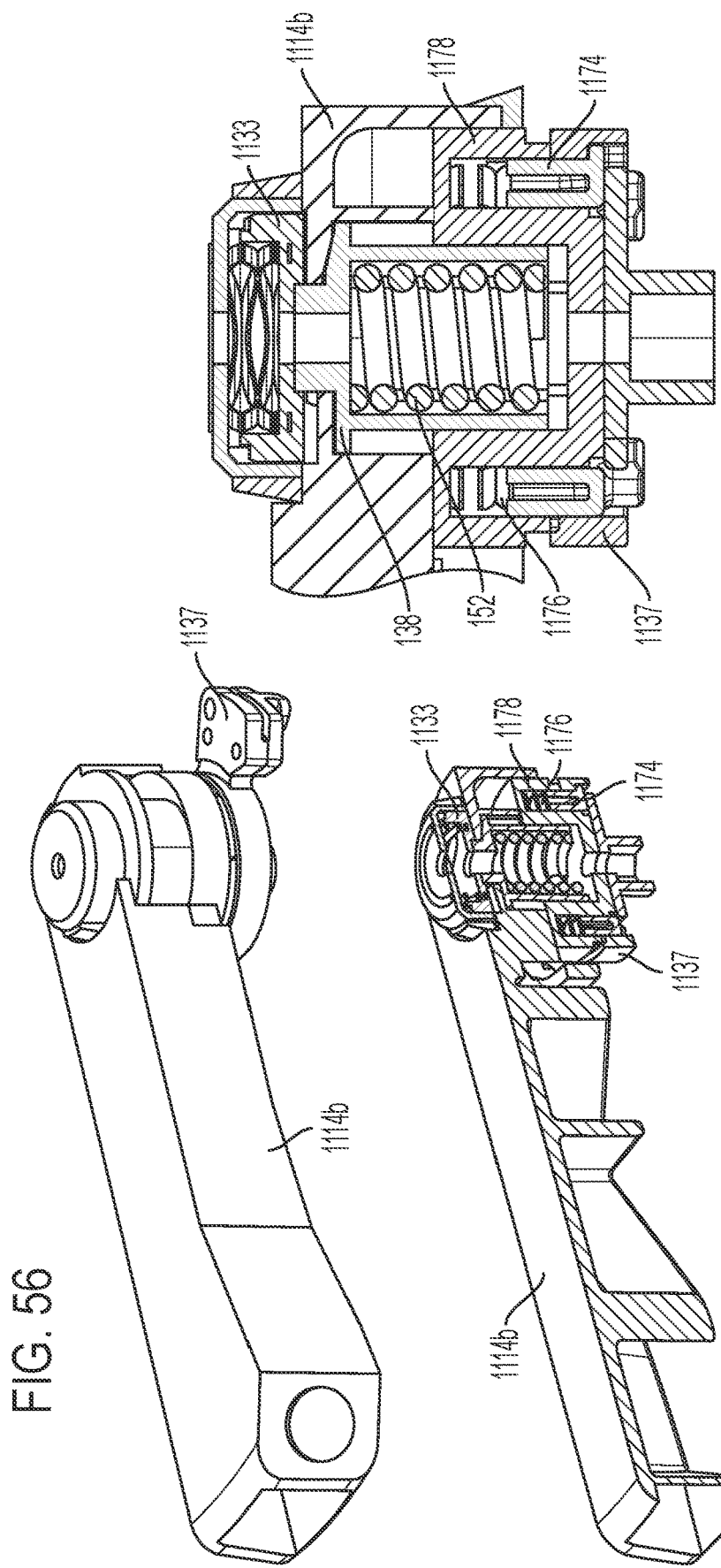

VEHICULAR IMAGING SYSTEM WITH EXTENDABLE CAMERA

CROSS REFERENCE TO RELATED APPLICATIONS

The present application is a 371 national stage entry of PCT Application No. PCT/US2021/070765, filed Jun. 24, 2021, which claims the filing benefits of U.S. provisional application Ser. No. 63/202,633, filed Jun. 18, 2021, U.S. provisional application Ser. No. 62/706,640, filed Aug. 31, 2020, and U.S. provisional application Ser. No. 62/705,371, filed Jun. 24, 2020, which are all hereby incorporated herein by reference in their entireties

FIELD OF THE INVENTION

The present invention relates to vehicular vision systems that display video images derived from image data captured by one or more cameras of the vehicle.

BACKGROUND OF THE INVENTION

It is known to provide a video display at the exterior rearview mirror assembly, such as described in U.S. Pat. No. 7,777,611, which is hereby incorporated herein by reference in its entirety, or to provide a video display at an interior rearview mirror assembly to display sideward and/or rearward images captured by exterior viewing cameras, such as described in U.S. Pat. No. 5,670,935, which is hereby incorporated herein by reference in its entirety.

SUMMARY OF THE INVENTION

The present invention provides a vehicular vision system that captures image data sideward and rearward of an equipped vehicle via side-mounted cameras at the sides of the vehicle, such as for object detection and/or for display of video images for viewing by the driver of the vehicle while driving the vehicle. For example, the cameras may be part of a camera monitoring system (CMS) of the vehicle. The cameras are housed or supported or accommodated at camera devices that are extendable and retractable relative to the side of the vehicle, such that the camera devices, when retracted, are within the side of the vehicle with the exterior surface of the camera device being generally flush or coplanar with the exterior surface of the side of the vehicle. When extended, the camera device seals the opening at the side of the vehicle and positions the camera at a location spaced from the side of the vehicle for providing an enhanced view along the side of and rearward of the vehicle.

In accordance with another aspect of the present invention, the support structure is pivotable between a retracted position, where the support structure is alongside the body portion, and an extended position, where the support structure is extended outward from the body portion so that the camera is positioned outward from the body portion of the vehicle with a field of view exterior of the vehicle. The support structure is pivotable relative to the base portion via an actuator disposed within the body portion of the vehicle. The actuator comprises a drive portion that, when the actuator is operated, moves a linkage that is connected to (i) the drive portion within the body portion of the vehicle and (ii) a pivot element at the base portion.

These and other objects, advantages, purposes and features of the present invention will become apparent upon review of the following specification in conjunction with the drawings.

BRIEF DESCRIPTION OF THE DRAWINGS

FIG. 6 is a perspective view of another camera device, shown in its extended state;

FIG. 56 is a perspective view of the camera wing and detent assembly of FIG. 49;

FIG. 57 is a perspective and cross-sectional view of the camera wing and detent assembly;

FIG. 58 is a cross-sectional view of the detent assembly;

DESCRIPTION OF THE PREFERRED EMBODIMENTS

A vehicle camera monitoring system and/or vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and to provide an output to one or more display devices for displaying video images representative of the captured image data. For example, the vision system may provide a rearview display (such as derived from image data captured by one or more rearward viewing cameras at the vehicle) or a top down or bird's eye or surround view display or the like.

Figure 1:
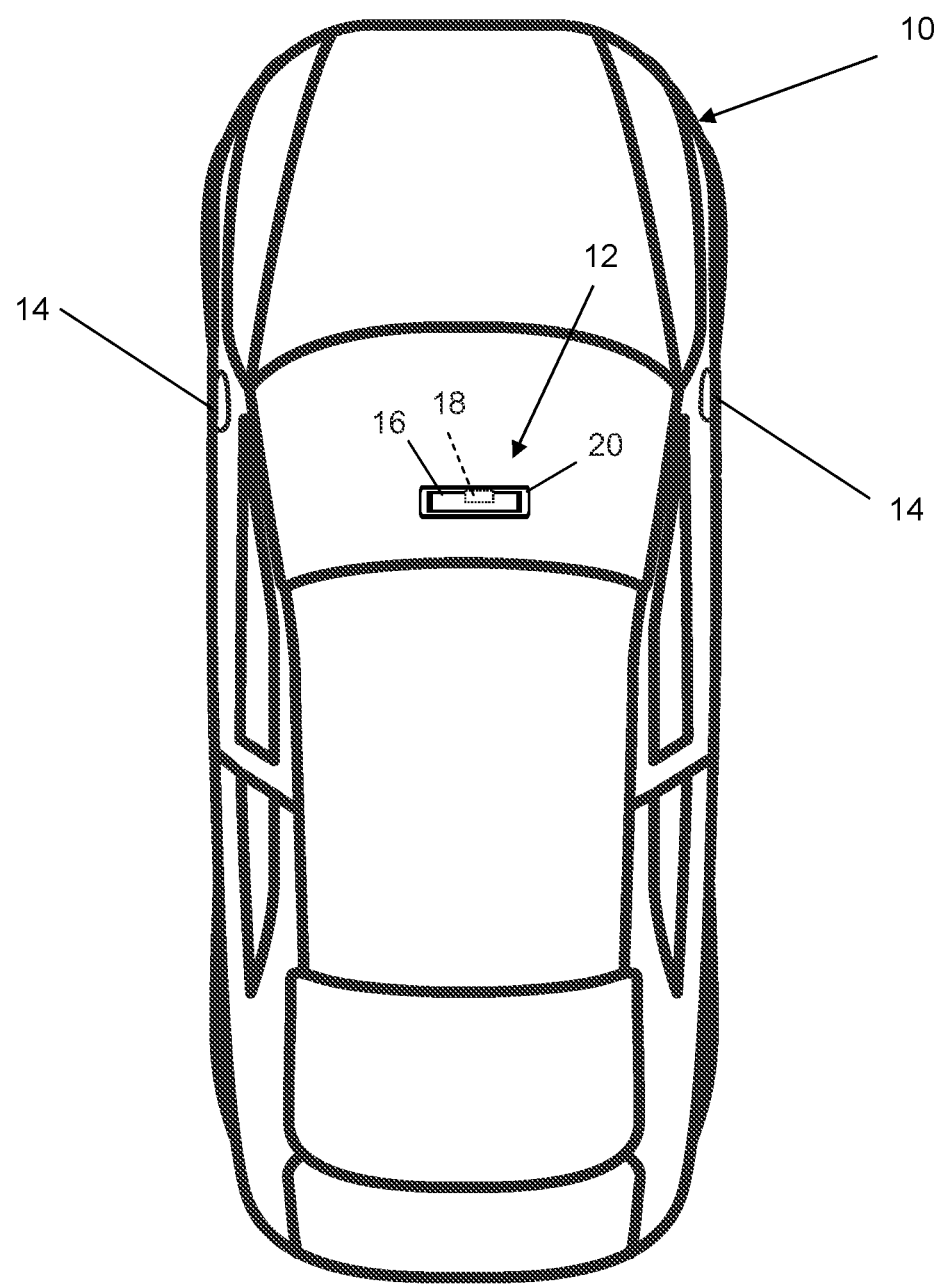
FIG. 1 is a plan view of a vehicle having a vision system and side-mounted camera devices in accordance with the present invention.

Referring now to the drawings and the illustrative embodiments depicted therein, a vehicle 10 includes an imaging system or camera monitoring system or vision system 12 that includes multiple exterior viewing cameras, including side-mounted extendable/retractable camera devices or modules 14 at each side of the vehicle (FIG. 1). The system may also include other cameras, such as surround view cameras (including a rearward viewing or rear backup camera, a forward viewing camera at the front of the vehicle and side surround view cameras at respective sides of the vehicle). The side-mounted camera devices or support structures or support arms or arms or modules 14 may be part of a camera monitoring system (CMS), which may provide a rearward viewing camera that has a different field of view than the rear backup camera. A support arm may be movably disposed at a side portion of the vehicle (e.g., at a driver-side or passenger-side door of the vehicle or at a driver-side or passenger-side body portion of the vehicle forward of the side door or rearward of the side door), the support arm having a base end attached (such as pivotally attached) at the side portion of the vehicle (or at a base portion of the device, with the base portion attached at the side portion of the vehicle) and a distal end opposite the base end. The camera may be disposed at the distal end of the support arm, with the camera 15 (when the module is extended so that the camera is positioned outward from the side portion of the vehicle) capturing image data of the respective scene exterior of the vehicle and in the field of view of the respective camera, with each camera having a lens for focusing images at or onto an imaging array or imaging plane or imager of the camera. The system may display video images derived from image data captured by the cameras at a video display screen in the vehicle for viewing by the driver of the vehicle while the driver is operating the vehicle.

The vision system 12 includes a control or electronic control unit (ECU) 18 having electronic circuitry and associated software, with the electronic circuitry including a data processor or image processor that is operable to process image data captured by the cameras, whereby the ECU may detect or determine presence of objects or the like and/or the system may provide video images to a display device 16 of the interior rearview mirror assembly 20 of the vehicle for viewing by the driver of the vehicle and/or to a display device at the center console or stack of the vehicle (and optionally to CMS displays at or near the driver and passenger side A-pillars of the vehicle, such as described in U.S. Publication Nos. US-2018-0134217 and/or US-2014-0285666, which are hereby incorporated herein by reference in their entireties). The data transfer or signal communication from the cameras to the ECU may comprise any suitable data or communication link, such as a vehicle network bus or CAN (Controller Area Network) bus or LIN (Local Interconnect Network) bus or 12C bus or the like of the equipped vehicle.

The rearward viewing cameras of the CMS cameras may function to provide rearward video images for a dual-mode interior rearview video mirror that can switch from a traditional reflection mode to a panoramic live-video display mode. The system and cameras and display device may utilize aspects of the systems described in U.S. Pat. Nos. 10,442,360; 10,421,404; 10,166,924; 10,046,706; 9,676,336 and/or 9,487,142, and/or U.S. Publication Nos. US-2021-0162926; US-2021-0155167; US-2021-0094473; US-2020-0377022; US-2019-0258131; US-2019-0146297; US-2019-0118717; US-2019-0047475 and/or US-2017-0355312, and/or U.S. patent application Ser. No. 17/301,853, filed Apr. 16, 2021, which was published on Oct. 21, 2021 as U.S. Patent Publication No. US-2021-0323473, and/or Ser. No. 17/248,736, filed Feb. 5, 2021, which was published on Aug. 12, 2021 as U.S. Patent Publication No. 2021-0245662, which are all hereby incorporated herein by reference in their entireties.

Figure 2:
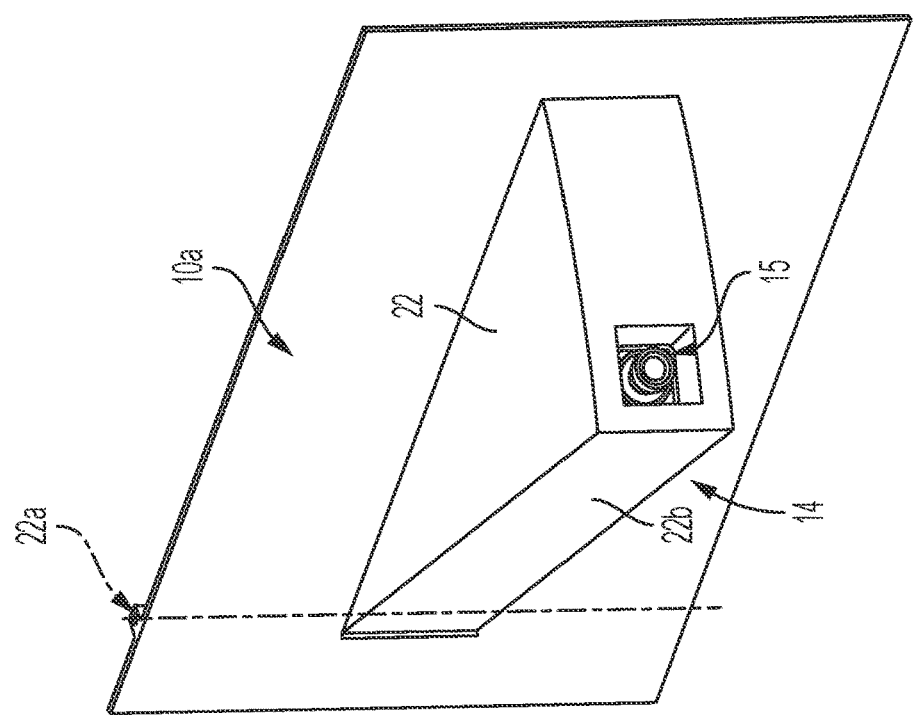
FIG. 2 is a perspective view of the camera device, shown in its extended state.
Figure 5:
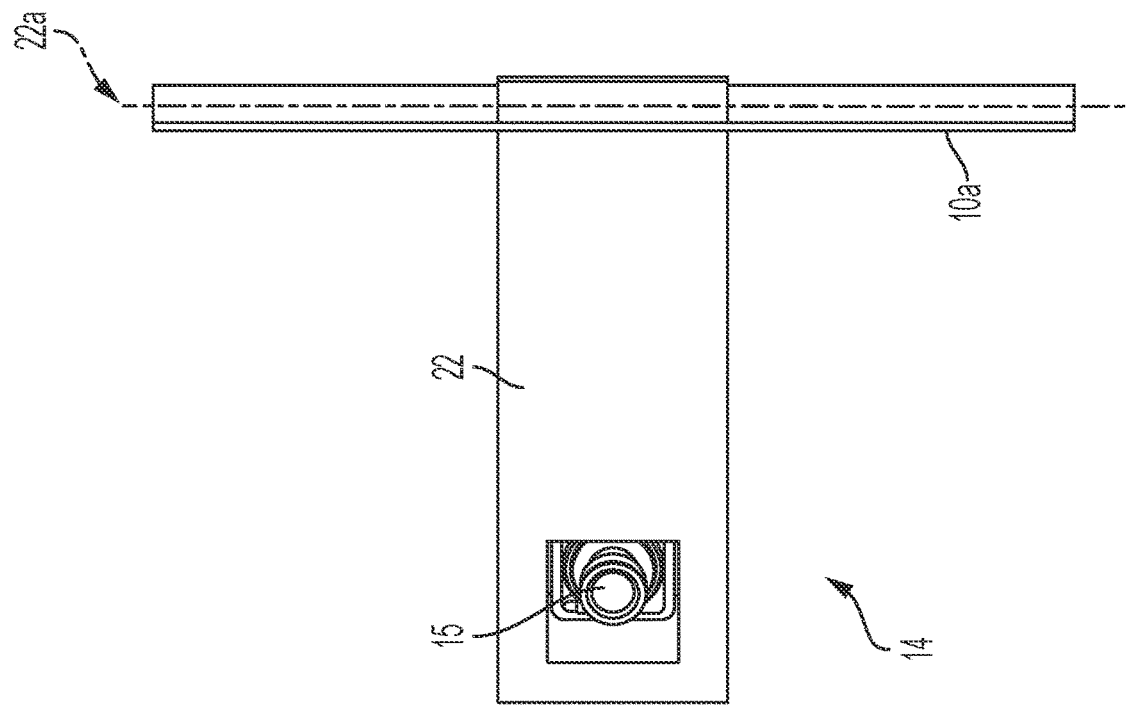
FIG. 5 is a view of the camera device of FIG. 2 from rearward of the camera device.

As shown in FIGS. 2, the camera device or support arm 14 comprises a wedge-shaped housing 22 that supports or houses the camera 15 and that is pivotally mounted at the vehicle body 10a and that pivots about a generally vertical pivot axis 22a. The vehicle body has a slot or aperture formed thereat that is sized to allow for movement of the housing 22 between its retracted or stowed or non-use position or state (FIG. 3) and its extended or deployed or use position or state (FIGS. 2, 4 and 5). The body panel and/or the housing may include a cover element or sealing element to engage and seal between the body panel and the housing when the camera device is extended or retracted and optionally as the camera device moves between the extended position and the retracted position to limit water intrusion and the like into the vehicle body portion.

Figure 3:
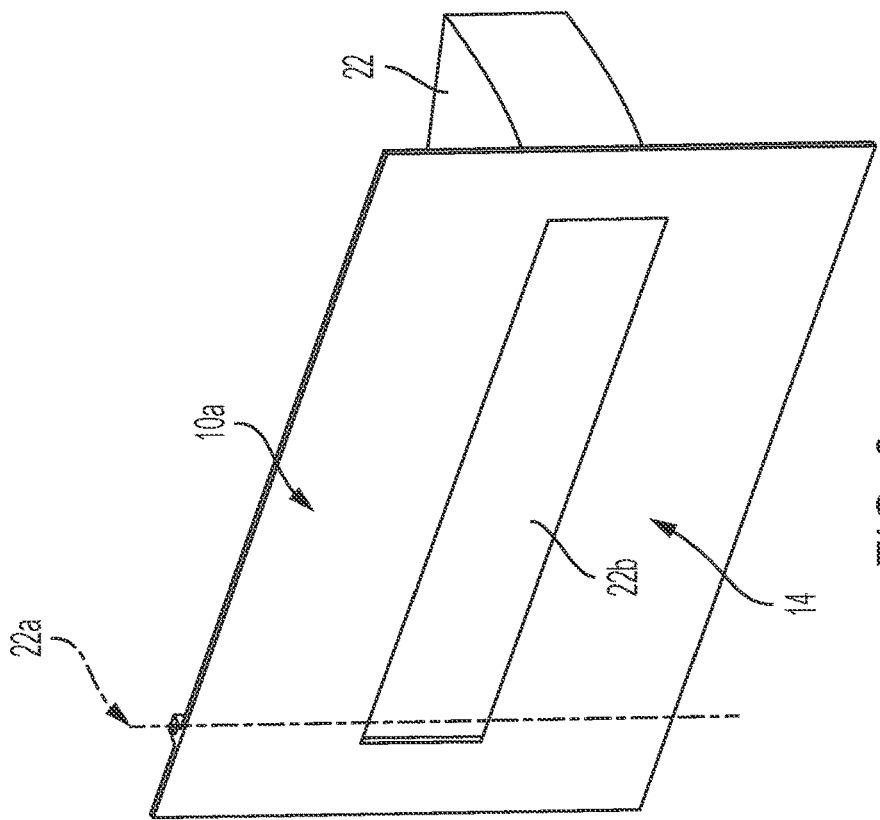
FIG. 3 is a perspective view of the camera device of FIG. 2, shown in its retracted state.
Figure 4:
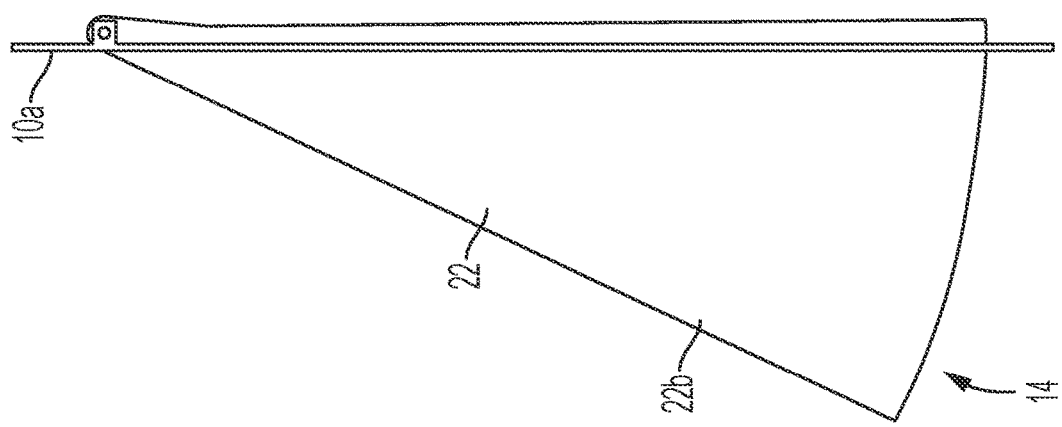
FIG. 4 is a top plan view of the camera device of FIG. 2.

As shown in FIG. 3, when the camera device is in the retracted state, the camera device is disposed inboard of the outer surface or panel of the vehicle body 10a, and an outer surface 22b of the housing is generally flush with or coplanar with or corresponds with the outer surface of the vehicle body around the aperture or slot. The camera housing 22 may cover or seal against the panel of the vehicle body at the aperture to limit water intrusion and the like into the vehicle body portion. As shown in FIG. 2, when the camera device is in the extended state, the housing is rotated about the pivot axis 22a so as to be swung through the aperture and disposed outside of and outboard of or outward from the body panel 10a, with the sides or a rear portion of the housing covering or sealing at the panel around the aperture to limit water intrusion and the like into the vehicle body portion. Optionally, the seal is disposed at the aperture, conforming to and moving along the outer surface of the wing as the wing travels between extended and retracted positions. The design of the housing or wing provides a complete seal to outside environments throughout the entire travel of the wing between the fully extended and fully retracted positions.

The camera device 14 is disposed at a side portion of the vehicle body, such as at a side door panel or at a panel forward of the front driver/passenger door, so as to capture image data representative of a view similar to that provided by a side-mounted exterior rearview mirror assembly. As shown in FIGS. 2 and 5, when the camera device 14 is extended, the camera 15 has its lens and imager viewing generally rearward along the side of the vehicle for capturing image data representative of at least a blind spot region along the side of and rearward of the vehicle.

The camera device is extendable and pivotable to provide an enhanced rearward field of view. The camera device may include an electrically powered motor or actuator that imparts pivotal movement of the camera device relative to the vehicle body portion, such as in response to a user input or other triggering event. Optionally, the camera device may extend anytime the vehicle is driven, such as responsive to the vehicle transmission being shifted into forward or reverse gear. Although described above as pivoting about a generally vertical pivot axis, the camera device may pivot about a generally horizontal pivot axis and, when in its extended position, the camera may be directed generally downward toward the ground along the side (or rear or front) of the vehicle, such as for a surround view camera system or vision system or the like.

Optionally, a ground illuminator may be activated when the housing or wing is extended. Optionally, the wing end position does not have to be a fixed point. For example, the housing or wing can have an intermediate position that is movable or selectable responsive to an input by the driver of the vehicle.

Thus, the camera device of the present invention provides a camera wing or support arm that extends out from vehicle and that operates in two primary states, a deployed/extended state and an undeployed/flush state. The support arm or camera wing or camera device has a base end attached at the side portion of the vehicle and a distal end opposite the base end, with a camera disposed at the distal end of the support arm. When the camera device is retracted, the system achieves better vehicle aerodynamics, and is able to protect the camera(s) from damage while they are stowed within the vehicle. Also, the camera device, when retracted, provides a more aesthetic vehicle exterior and may provide the ability to clean the camera lens upon making the wing flush. When the camera device is extended, the device provides access to hidden camera(s) (camera monitoring systems, 360 degree or surround view cameras, autonomous or self-driving vehicle cameras and/or non-imaging sensors), ground illuminators, maneuvering lighting/cameras. The extended position provides a better vantage point for the cameras on the wing by extending out from the vehicle body. The camera wing may optionally have an intermediate position that falls between the primary states and is adjustable to either the partially extended position or the fully extended position, which allows for camera aiming/positioning.

Figure 8:
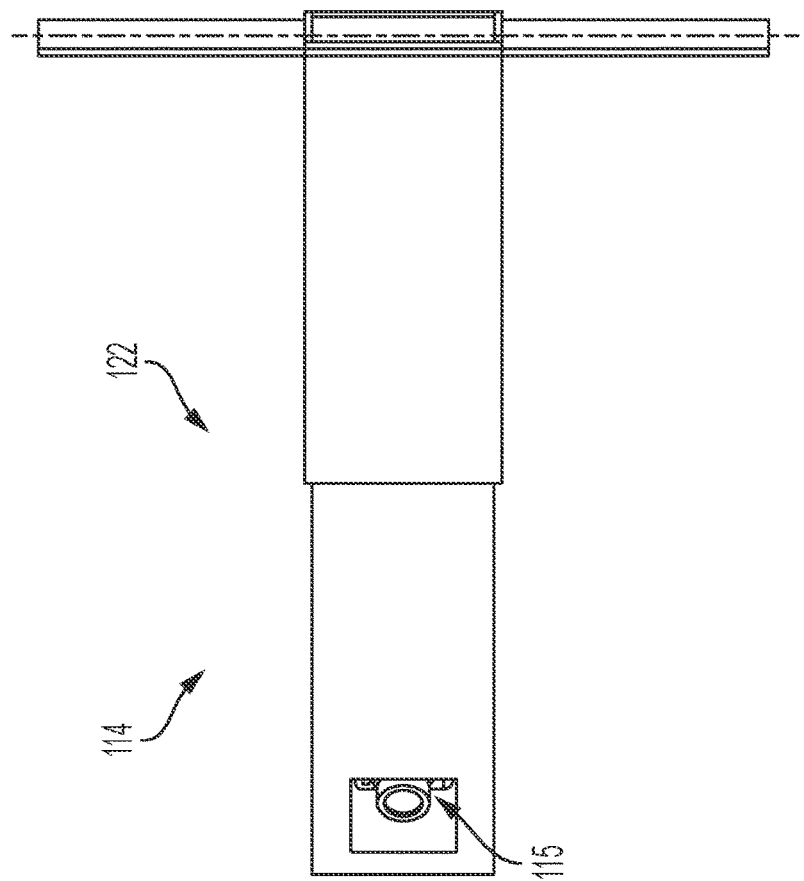
FIG. 8 is a view of the camera device of FIG. 6 from rearward of the camera device.
Figure 7:
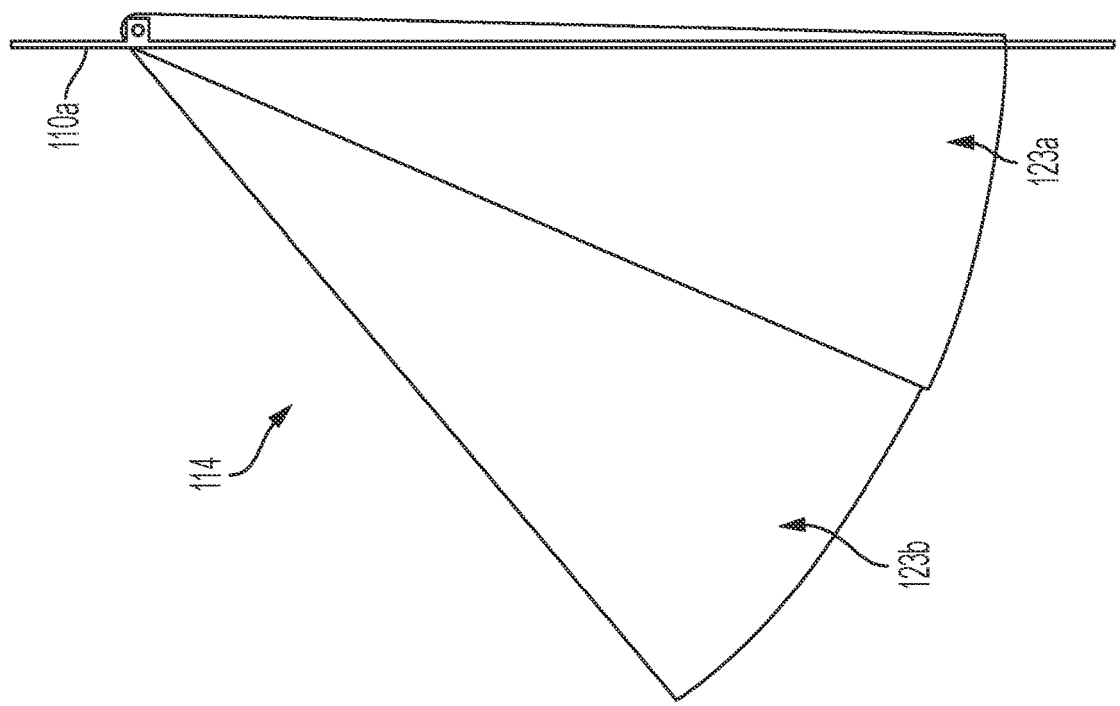
FIG. 7 is a top plan view of the camera device of FIG. 6.

Optionally, the camera device may provide for further laterally outboard extension or may provide for reduced inboard space for the retracted camera device. For example, and such as shown in FIGS. 6-8, a camera device 114 comprises a telescoping wedge-shaped housing 122 that has an inner housing portion or sleeve 123a and an outer housing portion or wing 123b. When the camera device is extended, the outer housing portion extends from the inner housing portion, and when the camera device is retracted, the outer housing portion is received within the inner housing portion. The inner housing portion 123a and/or the body panel 110a may comprise a sealing element that engages the other of the inner housing portion or body panel around the aperture to limit water intrusion and the like into the vehicle body portion. The camera device 114 may otherwise be similar to the camera device 14, discussed above, such that a detailed discussion of the camera devices need not be repeated herein.

The camera device 114 thus includes a sleeve that surrounds the primary body of the camera wing or extending housing. The sleeve allows the camera 115 to swing out (via pivoting about the pivot axis 122a) further from the vehicle to provide a better vantage point for the camera view. In the illustrated embodiment, the inner housing portion 123a and the outer wing 123b both pivot about the pivot axis 122a and are both mounted at the body portion of the vehicle. Optionally, the inner housing may be pivotally mounted at the body portion of the vehicle with the outer wing being movably received in the inner housing.

The sleeve also reduces the packaging depth required to achieve a view further outboard from the vehicle. In other words, the sleeve enables the camera device to extend further from the vehicle body and reduces the packaging depth required to achieve the further extension (i.e., it may provide the same packaging depth as the camera device 14, but may provide two times the distance from the extended camera to the vehicle body).

Figure 11:
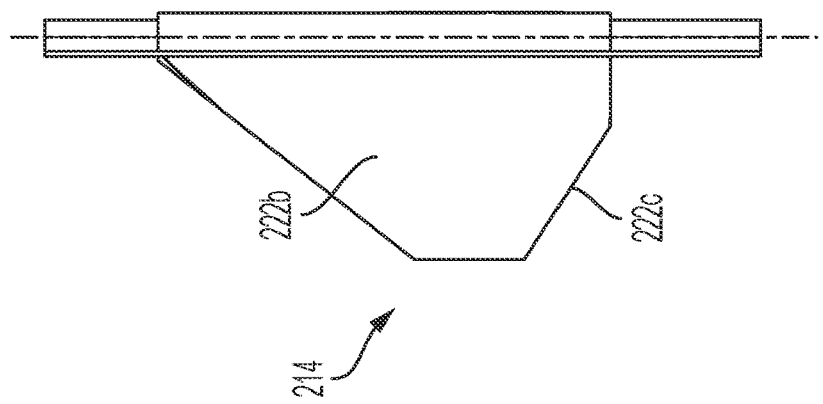
FIG. 11 is a top plan view of the camera device of FIG. 9.
Figure 10:
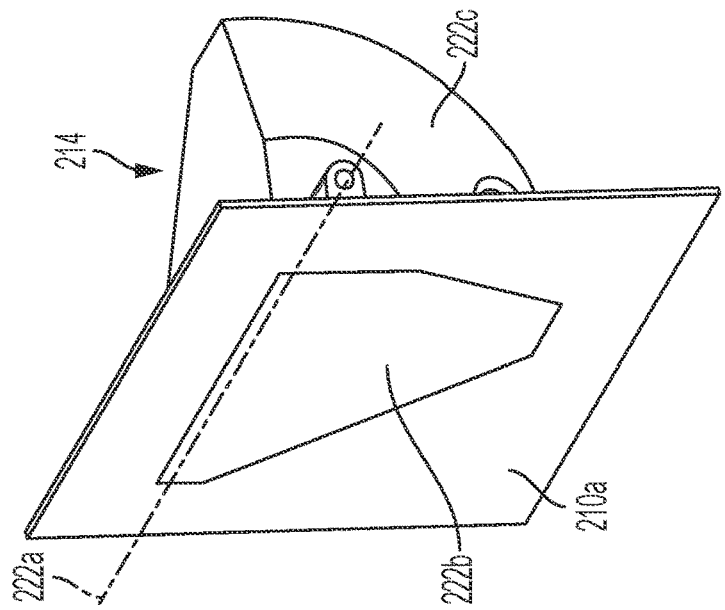
FIG. 10 is a perspective view of the camera device of FIG. 9, shown in its retracted state.
Figure 9:
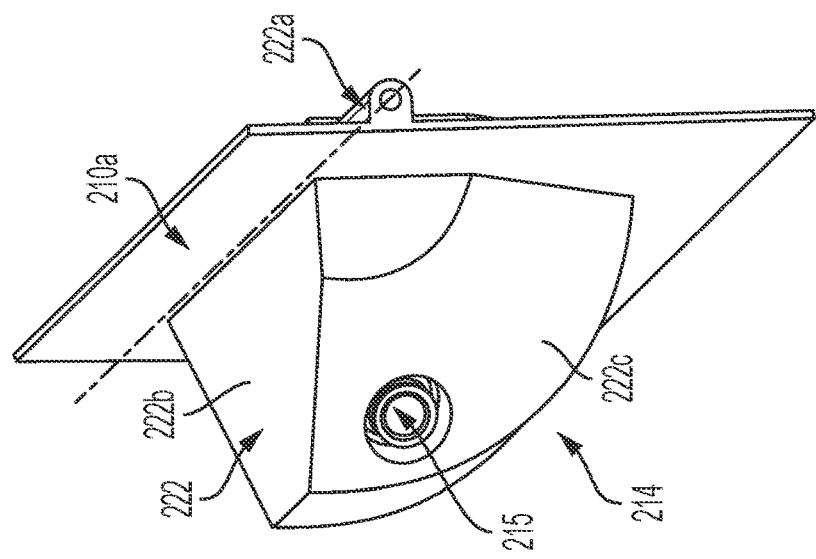
FIG. 9 is a perspective view of another camera device, shown in its extended state.

Optionally, the camera device may pivot about a horizontal pivot axis between a retracted and an extended position. For example, and such as shown in FIGS. 9-11, a camera device 214 comprises a housing 222 that supports or houses the camera 215 and that is pivotally mounted at the vehicle body 210a and that pivots about a generally horizontal pivot axis 222a. The housing (and the aperture at the body portion or panel) may comprise a wedge shape similar to the housing discussed above, or may comprise any suitable shape, such as, for example, the shape shown in FIGS. 9-11, which has an angled rear surface 222c that provides an aperture for the camera 215 to be disposed at or to view through when the camera device is extended.

When the camera device is extended, the housing portion extends from the vehicle body portion 210a, and when the camera device is retracted, the housing portion is received within vehicle body portion, with the outer surface 222b of the housing being generally flush with or co-planar with or corresponding with the outer surface of the vehicle body around the aperture or slot. The housing portion and/or the body panel may comprise a sealing element that engages the other of the housing portion or body panel around the aperture to limit water intrusion and the like into the vehicle body portion throughout the range of movement of the camera device. The camera device does not require a fixed end of travel. For example, the camera wing may be positioned as needed along a path of travel between the retracted position and the fully extended position responsive to an input from the driver. The camera device 214 may otherwise be similar to the camera devices discussed above, such that a detailed discussion of the camera devices need not be repeated herein.

Figure 13:
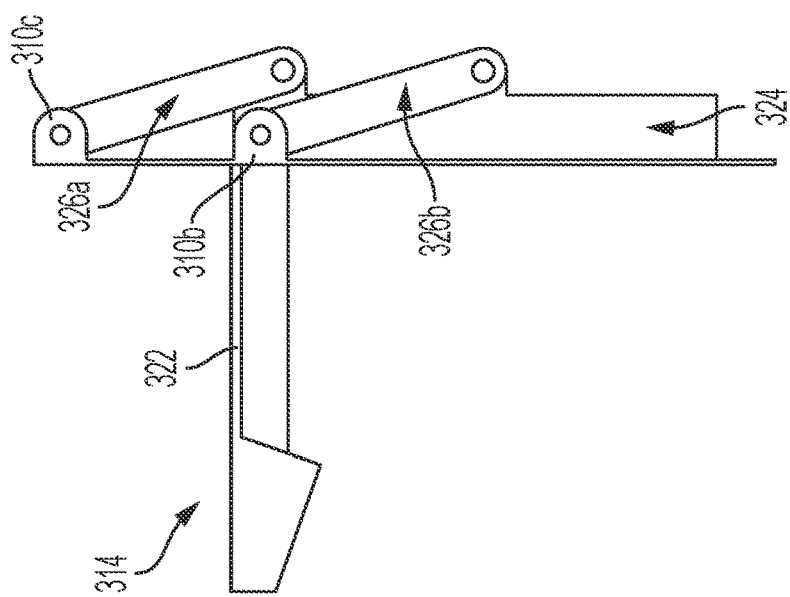
FIG. 13 is a top plan view of the camera device of FIG. 12.
Figure 12:
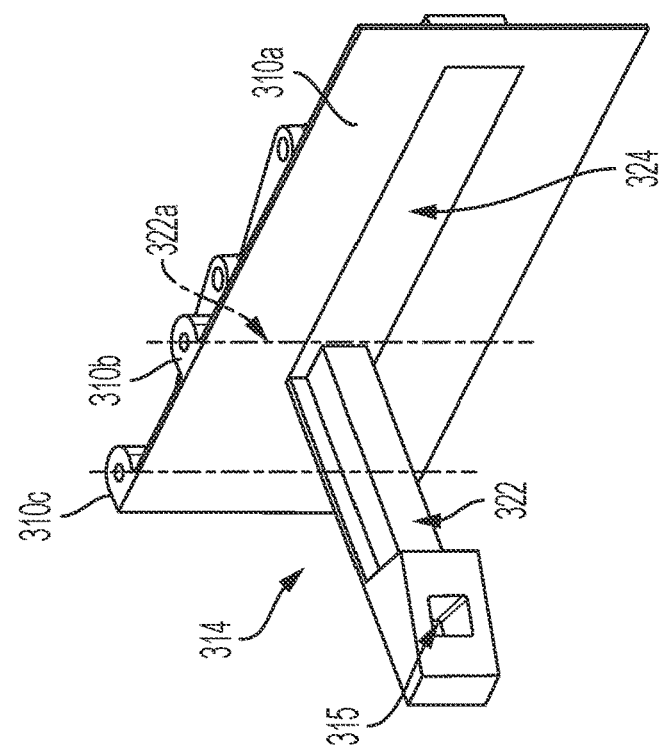
FIG. 12 is a perspective view of another camera device, shown in its extended state.
Figure 16:
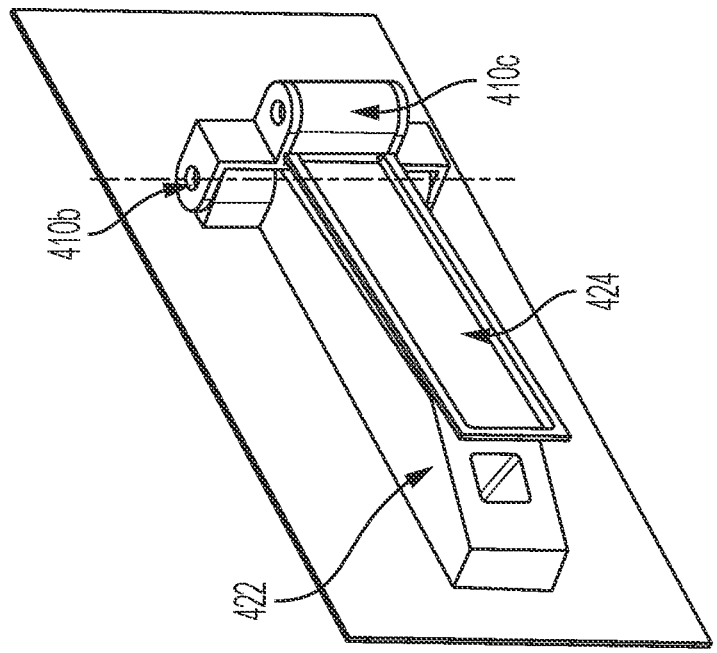
FIG. 16 is a perspective view of the camera device of FIG. 15, shown in its retracted state.

Optionally, the camera device may comprise an elongated wing or arm that extends outward from the vehicle body portion. For example, and with reference to FIGS. 12-14, a camera device 314 comprises an arm 322 that supports or houses the camera 315 and that is pivotally mounted at the vehicle body 310a and that pivots about a generally vertical pivot axis 322a. The vehicle body has a slot or aperture formed thereat that is sized to allow for movement of the arm 322 between its retracted or stowed or non-use position or state (FIG. 14) and its extended or deployed or use position or state (FIGS. 12 and 13).

Figure 14:
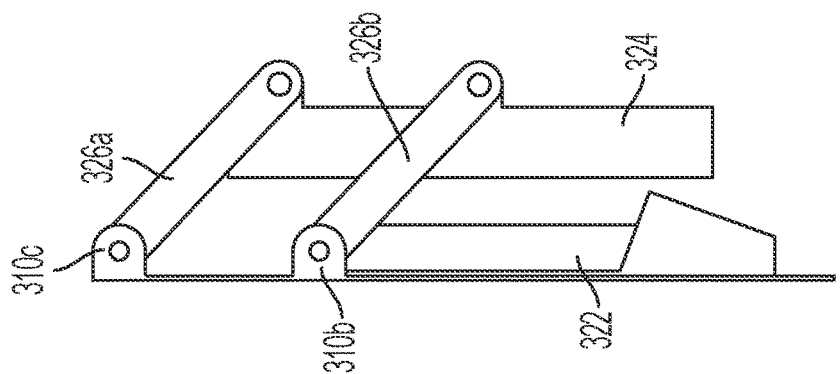
FIG. 14 is a top plan view of the camera device of FIG. 12, shown in its retracted state.

In the illustrated embodiment, a spring-loaded or spring-biased gap seal or sealing element or cover or covering element 324 is movably disposed in the vehicle body portion and linked to the arm 322, such that, when the arm is extended, the sealing element is spring-biased and urged and moved into the aperture to seal at the vehicle body portion to limit water intrusion and the like into the vehicle body portion when the camera device 314 is extended. As can be seen with reference to FIGS. 13 and 14, the arm 322 is pivotally mounted at a pivot element 310b of the vehicle body portion 310a, and the sealing element 324 is movably mounted at the vehicle body portion 310a via pairs of pivotable linkages 326a, 326b (although only the upper linkages are shown, a corresponding pair of lower linkages may be pivotally attached at the vehicle body portion below the aperture and at a lower portion of the arm and sealing element), which pivot relative to the vehicle body portion 310a and relative to the sealing element 324 to move the sealing element into engagement with the vehicle body portion at the aperture when the camera device is extended (FIG. 13) and to move the sealing element inboard away from the vehicle body portion (so as to make room within the body portion for the camera device) when the camera device is retracted (FIG. 14). The linkages 326b are pivotally attached at the pivot element 310b, while the linkages 326a are pivotally attached at another pivot element 310c that is spaced from the pivot element 310b, such that pivotal movement of the linkages move the sealing element 324 while maintaining the sealing element generally parallel to the vehicle body portion 310a. The camera device 314 and sealing element 324 allow for an elongated arm 322 to pivot to extend the camera device sufficiently from the body panel of the vehicle, while taking up a reduced amount of space within the vehicle body portion when the camera device is retracted. The camera device 314 may otherwise be similar to the camera devices discussed above, such that a detailed discussion of the camera devices need not be repeated herein.

Thus, the camera wing rotates out horizontally from the vehicle about a vertical pivot. While the camera wing rotates out, the gap seal piece, which is spring-biased or spring-loaded, moves about the 4-link mechanism to seal off the opening in the vehicle body panel. This design provides benefits in packaging space as the distance of the camera extension from the vehicle is not directly tied to the depth of the overall package (i.e., the camera wing or arm can grow in length, without requiring more packaging depth within the vehicle body portion to contain the camera device when it is in its flush state). Optionally, the camera wing or arm may use a slide out mechanism to extend the camera further out from the vehicle. The extending mechanism may contain a telescoping mechanism, a 4-link mechanism or a sliding mechanism. Further extension from the vehicle provides the driver with a wider field of view that may be beneficial, for example, in a towing application.

Figure 15:
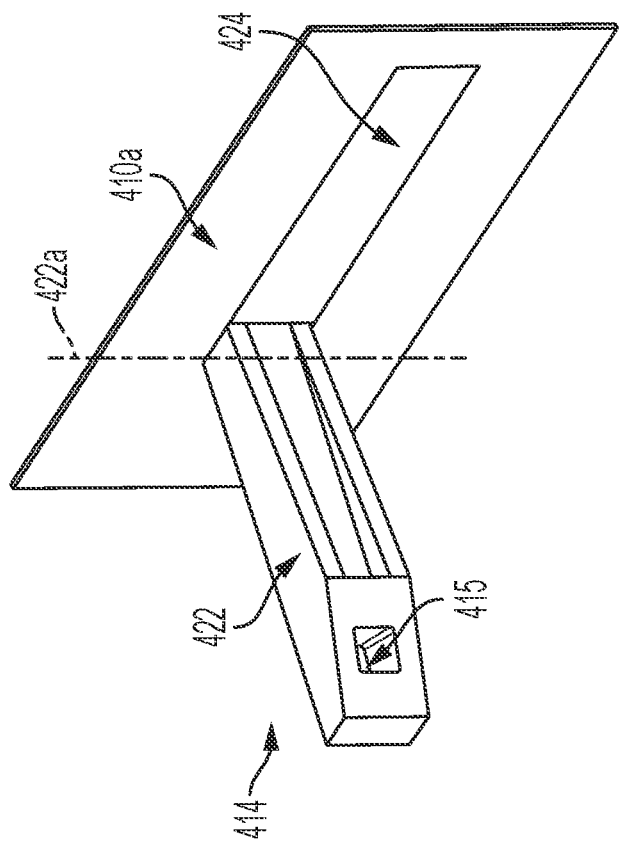
FIG. 15 is a perspective view of another camera device, shown in its extended state.
Figure 17:
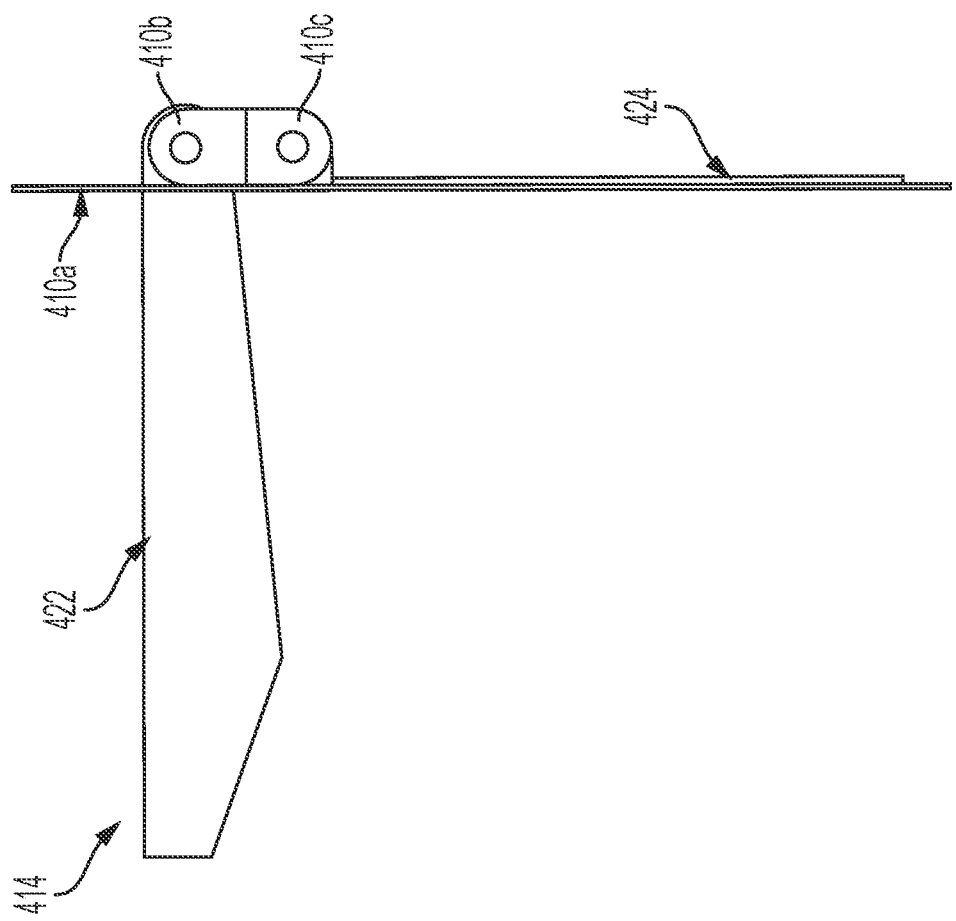
FIG. 17 is a top plan view of the camera device of FIG. 15.

Optionally, for example, and with reference to FIGS. 15-18, a camera device 414 comprises an arm 422 that supports or houses the camera 415 and that is pivotally mounted at the vehicle body 410a and that pivots about a generally vertical pivot axis 422a. The vehicle body has a slot or aperture formed thereat that is sized to allow for movement of the arm 422 between its retracted or stowed or non-use position or state (FIGS. 16 and 18) and its extended or deployed or use position or state (FIGS. 15 and 17).

Figure 18:
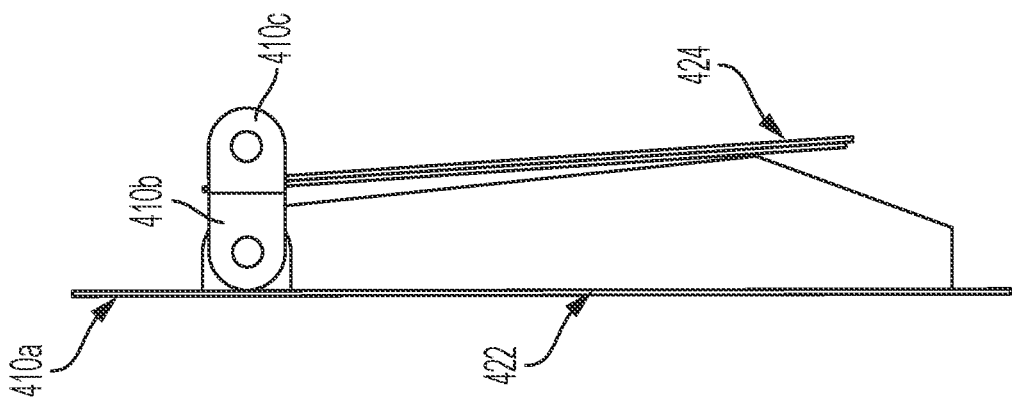
FIG. 18 is a top plan view of the camera device of FIG. 16.

In the illustrated embodiment, a gap seal or sealing element 424 is movably disposed in the vehicle body portion and linked to the arm 422, such that, when the arm is extended, the sealing element is moved into the aperture to seal at the vehicle body portion to limit water intrusion and the like into the vehicle body portion when the camera device 414 is extended. As can be seen with reference to FIGS. 17 and 18, the arm 422 is pivotally mounted at a pivot element 410b of the vehicle body portion 410a, and the sealing element 424 is pivotally and movably mounted at the vehicle body portion 410a at a second pivot element 410c, which pivots or moves relative to the vehicle body portion 410a as the arm pivots so as to move the sealing element 424 into engagement with the vehicle body portion at the aperture when the camera device is extended (FIG. 17) and to move the sealing element inboard away from the vehicle body portion (so as to make room within the body portion for the camera device) when the camera device is retracted (FIG. 18). In other words, the second pivot element 410c is pivotable about the pivot element 410b and pivots according to rotation of the arm 422 relative to the pivot element 410b such that the pivot element 410c pivots toward the aperture when the arm 422 is extended and pivots inboard of the aperture when the arm 422 is retracted. Thus, the second pivot element 410c rotates to provide the pivot point of the sealing element 424 closer to or at the aperture when the arm 422 is extended.

The camera device 414 and sealing element 424 allow for an elongated arm 422 to pivot to extend the camera device sufficiently from the body panel of the vehicle, while taking up a reduced amount of space within the vehicle body portion when the camera device is retracted. The camera device 414 may otherwise be similar to the camera devices discussed above, such that a detailed discussion of the camera devices need not be repeated herein. The camera device 414 uses a spring-biased or spring-loaded flap instead of using the 4-link mechanism to close the gap seal piece, which requires fewer components and provides a reduced packaging size.

Figure 22:
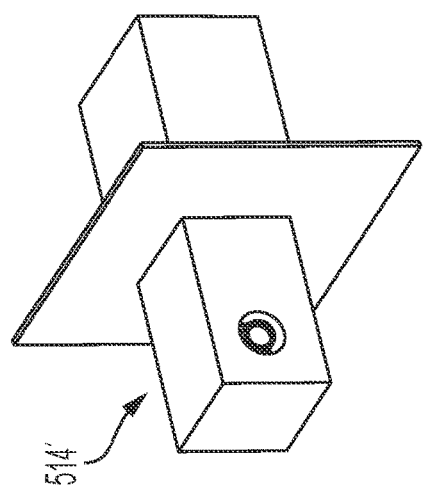
FIG. 22 is a perspective view of another camera device, which extends straight out from the side of the vehicle, shown in its extended state.
Figure 20:
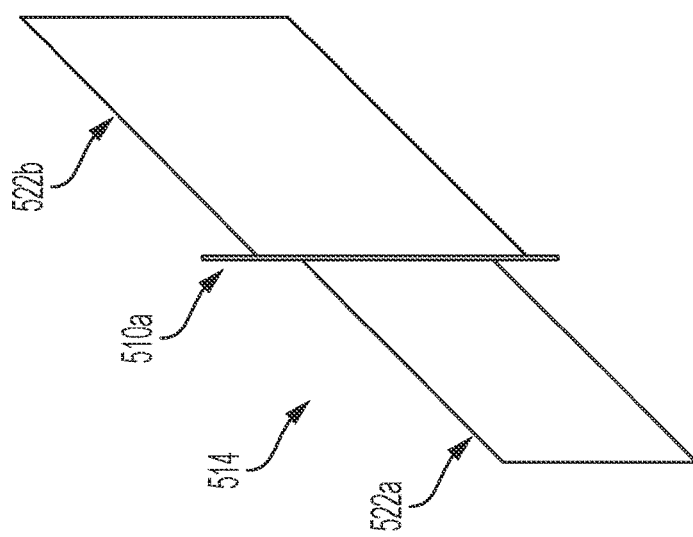
FIG. 20 is a top plan view of the camera device of FIG. 19.
Figure 19:
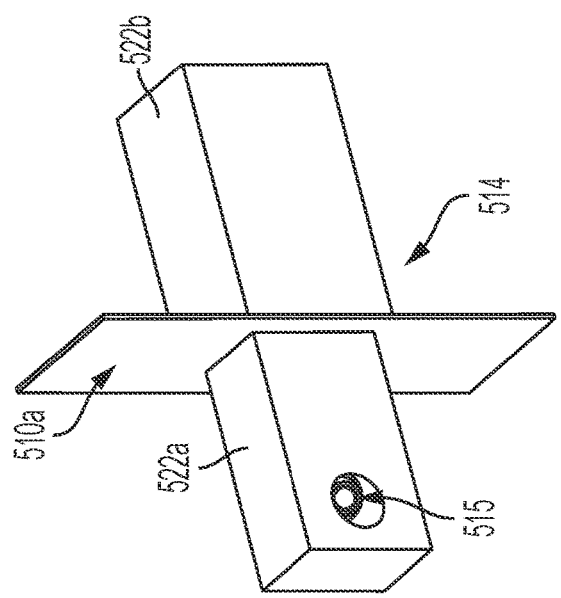
FIG. 19 is a perspective view of another camera device, which extends at an angle from the side of the vehicle, shown in its extended state.
Figure 21:
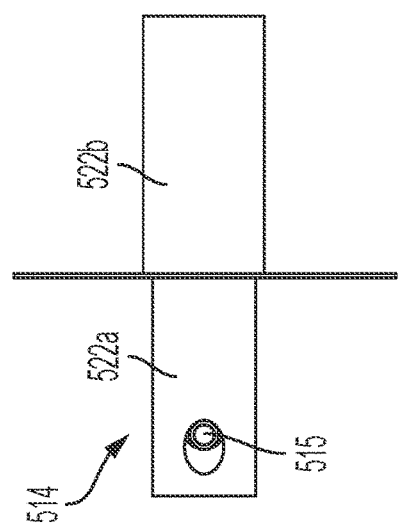
FIG. 21 is a view of the camera device of FIG. 19 from rearward of the camera device.
Figure 23:
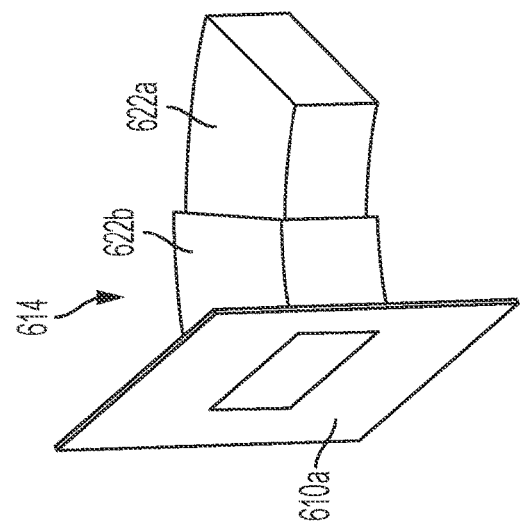
FIG. 23 is a perspective view of another camera device, shown in its extended state.
Figure 24:
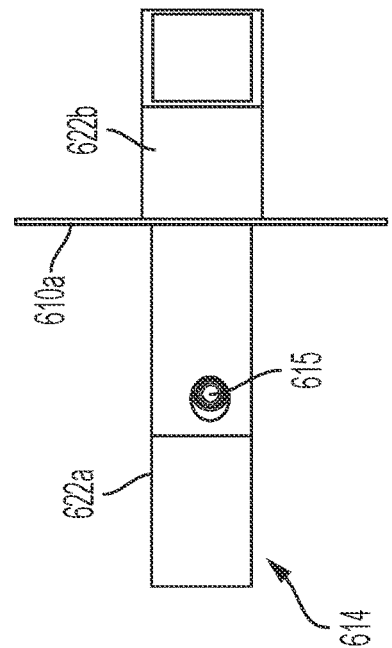
FIG. 24 is a perspective view of the camera device of FIG. 23, shown in its retracted state.
Figure 25:
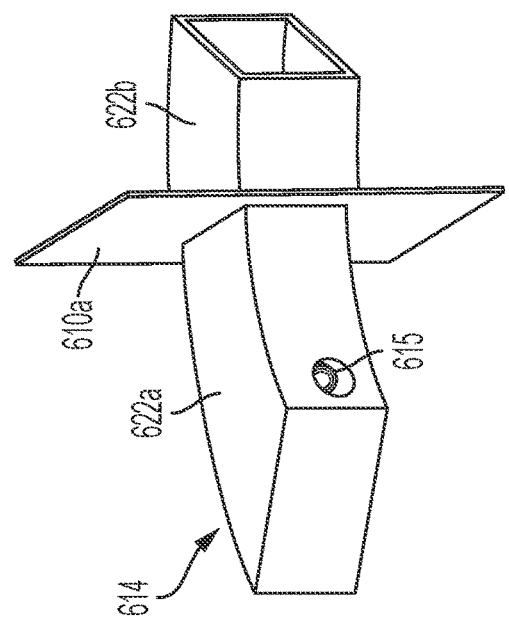
FIG. 25 is a top plan view of the camera device of FIG. 23.
Figure 26:
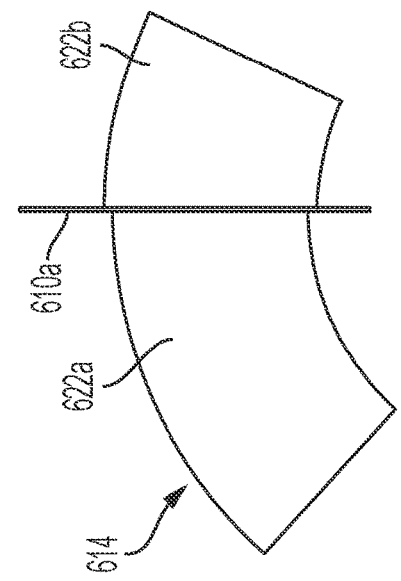
FIG. 26 is a view of the camera device of FIG. 23 from rearward of the camera device.
Figure 27:
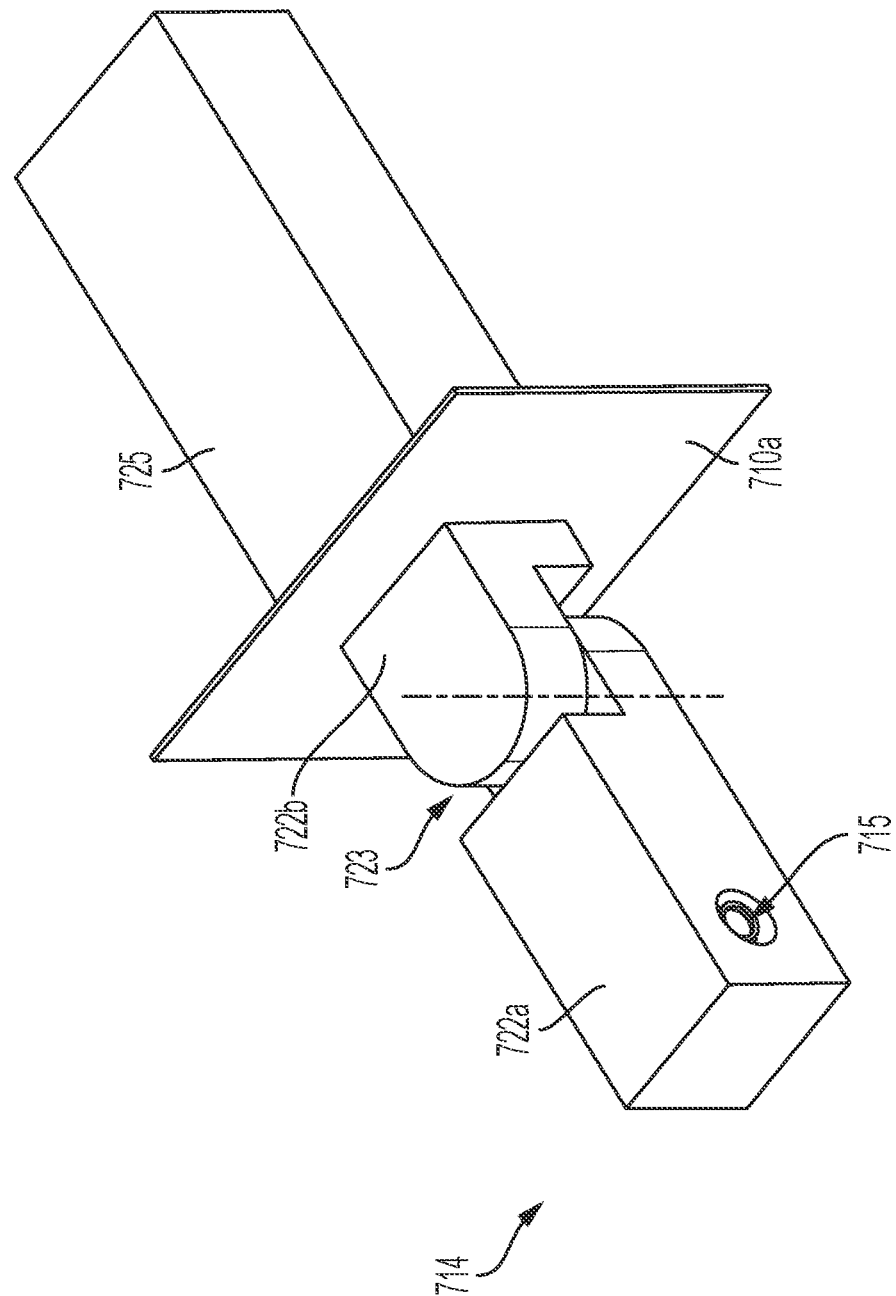
FIG. 27 is a perspective view of another camera device, shown in its extended state.
Figure 28:
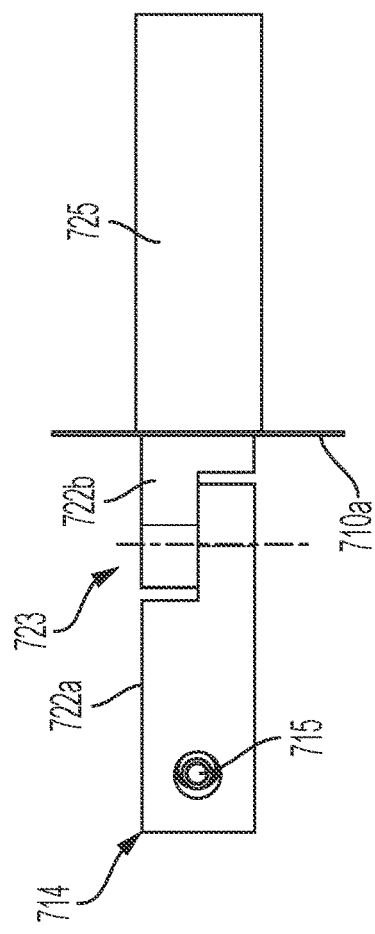
FIG. 28 is a top plan view of the camera device of FIG. 27.
Figure 29:
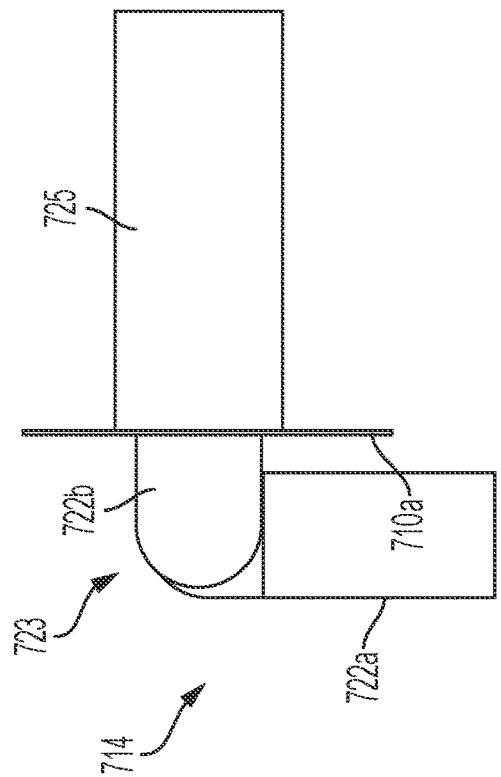
FIG. 29 is a view of the camera device of FIG. 27 from rearward of the camera device.
Figure 30:
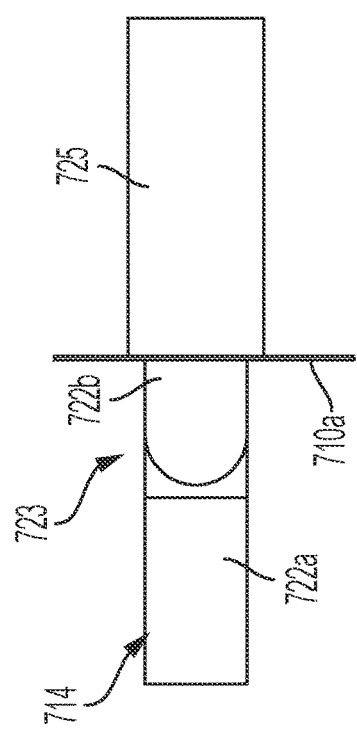
FIG. 30 is a perspective view of the camera device of FIG. 27, shown with the extended part of the camera device pivoted.
Figure 31:
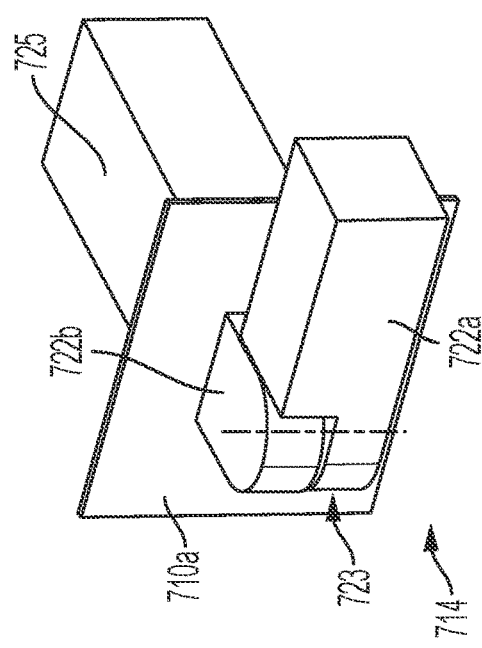
FIG. 31 is a top plan view of the camera device of FIG. 30.

Optionally, the camera device may translationally or linearly move outward from the vehicle body portion when extended. For example, and such as shown in FIGS. 19-21, a camera device 514 comprises an outer housing portion 522a that houses the camera 515 and that, when the camera device is extended, extends laterally outward from the vehicle body portion 510a. When the camera device is retracted, the housing portion 522a may be retracted and received in an inner housing portion 522b disposed inboard of and attached at the vehicle body panel or portion 510a. As shown in FIG. 20, the camera housing 522a and receiver or inner housing 522b are angled relative to the vehicle body panel so that the camera device may be angled (e.g., angled rearward) for a more aerodynamic configuration. An angled configuration may also reduce the depth required for the inner housing 522b to receive the outer housing 522a into the side of the vehicle. Optionally, and such as shown in FIG. 22, the camera device 514' may extend and retract generally perpendicular to the vehicle body portion.

The camera wing or arm or housing slides out from the vehicle body portion at an angle to provide a clean aesthetic package. The vehicle pocket stays sealed throughout the entire actuation and offers the ability to have an intermediate position between the two primary positions (fully extended and fully retracted). The intermediate position or positions may be adjustable to the driver's preferences.

Optionally, the camera device may arcuately move outward from the vehicle body portion when extended. For example, and such as shown in FIGS. 23-26, a camera device 614 comprises a curved outer housing portion 622a that houses the camera 615 and that, when the camera device is extended, extends arcuately outward from the vehicle body portion 610a. When the camera is retracted, the housing portion 622a may be retracted and received in an arcuate inner housing portion 622b disposed inboard of and attached at the vehicle body panel or portion 610a. Thus, the camera wing or arm or housing may slide out of the vehicle body portion in a curved fashion. The arm may be arched or curved with a radius of curvature toward the direction of the field of view of the camera (i.e., the arm is arched or curved towards the side of the vehicle in a rearward direction) (FIGS. 23-26) or the arm may be arched or curved with a radius of curvature opposite of the field of view of the camera (i.e., the arm is arched or curved towards the side of the vehicle in a forward direction). The curve serves to provide a slightly smaller overall package and provides a more unique aesthetic appearance and may provide improved vehicle aerodynamics.

Optionally, the camera device may include a breakaway pivot element that allows the camera wing or outer housing (that houses the camera) to pivot if impacted or pushed when the camera device is in its extended state. For example, and with reference to FIGS. 27-31, a camera device 714 includes an outer arm portion or housing portion 722a that is pivotally attached at an inner arm portion or housing portion 722b at a pivot element or joint 723. When the camera device is extended, the pivot joint is outboard of the vehicle body portion, such that, if the outer arm portion 722a is impacted or pushed, the outer arm portion 722a pivots at the pivot joint relative to the inner arm portion 722b and the vehicle body portion 710a. In the illustrated embodiment, the camera arm is translationally extended from the body portion and is retracted into a camera wing carrier or receiver or housing portion 725 that is attached at an inboard side of the vehicle body portion.

The pivot joint provides the ability for the camera arm or wing to pivot on impact while in its extended state. Upon impact, the head of the wing rotates in order to absorb the impact without causing damage. After impact, the head can return to its extended position because of a spring and detent located at the pivot joint (e.g., a torsional spring may urge the arm or head back toward the non-pivoted state, where the pivot elements engage a detent to retain the arm or head at that orientation or state). The pivot joint may provide the ability for the camera arm or wing to pivot back to its extended state following both forward and rearward impacts. In other words, the pivot joint enables the camera arm to rotate in either direction relative to the extended position and return to the extended, non-pivoted position. The head may also return to the non-pivoted position when the wing is retracted.

Figure 32:
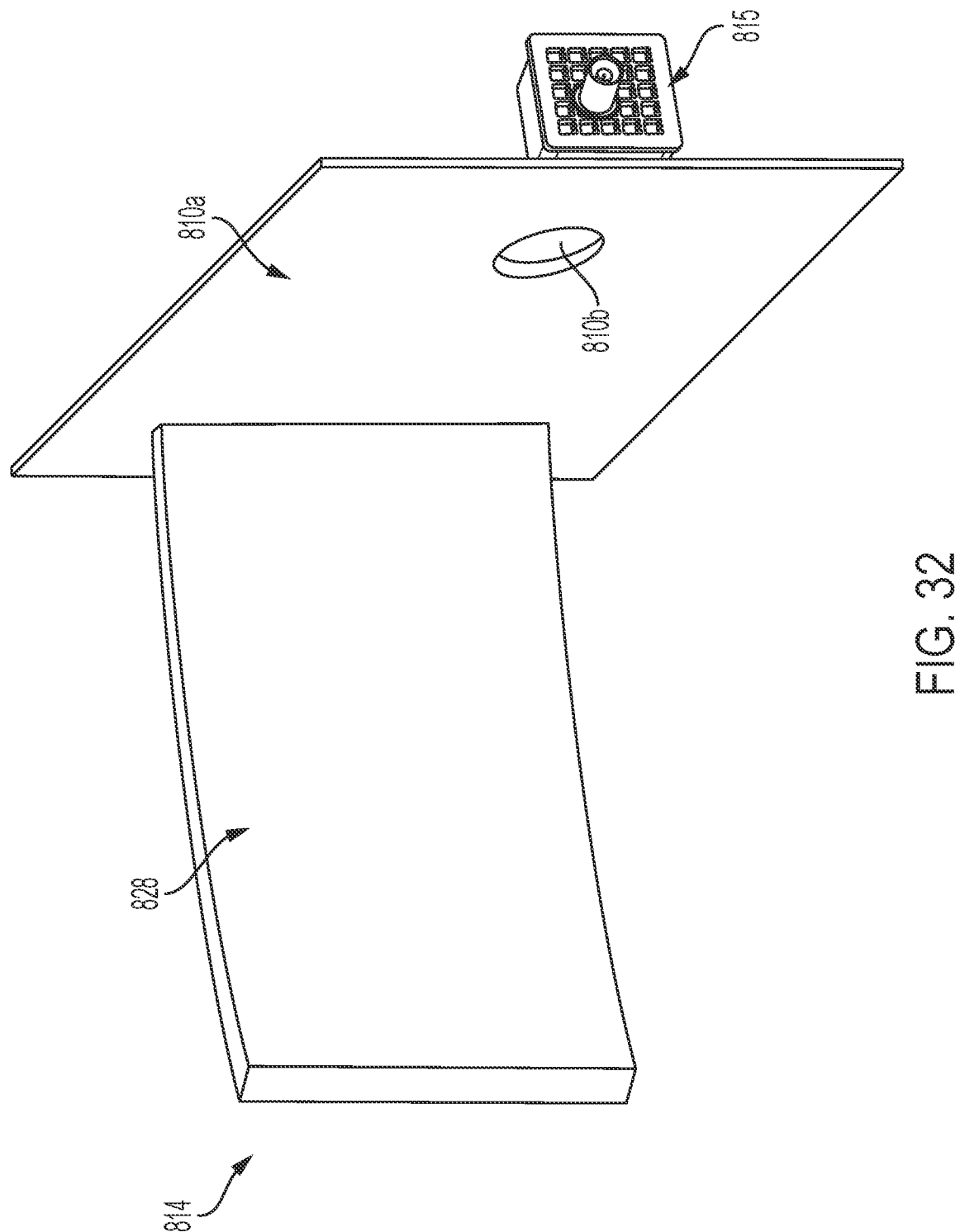
FIG. 32 is a perspective view of another camera device, shown with its mirror in its extended state.
Figure 34:
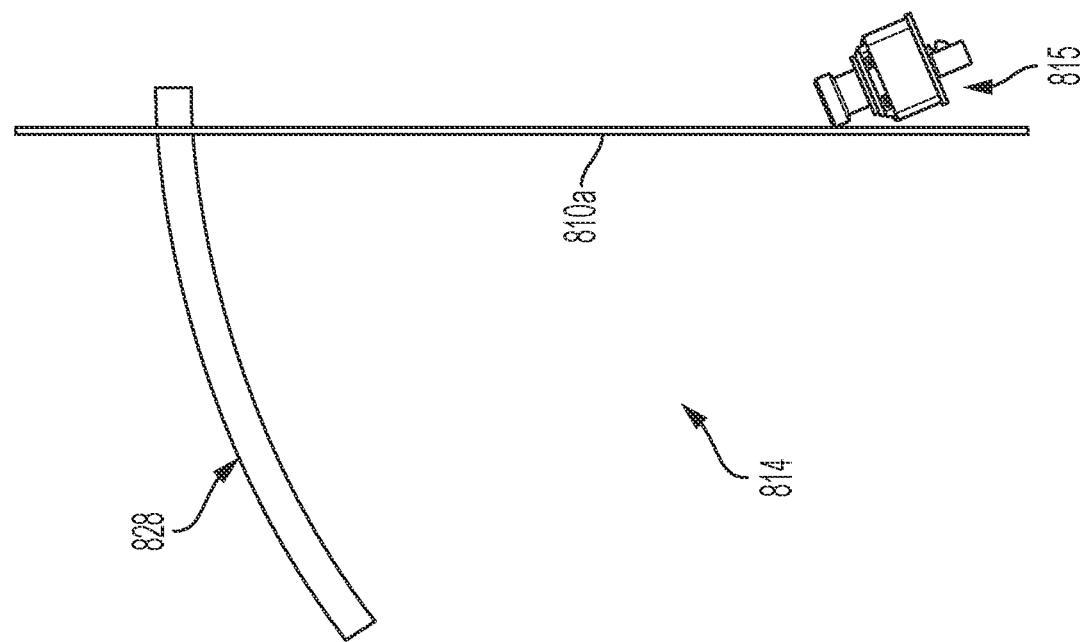
FIG. 34 is a top plan view of the camera device of FIG. 32.
Figure 33:
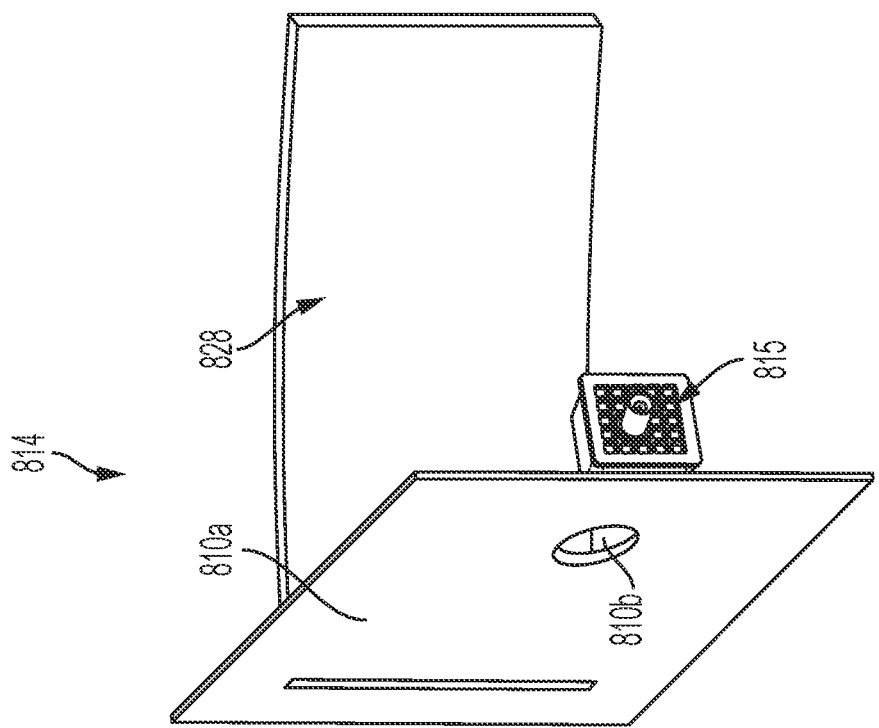
FIG. 33 is a perspective view of the camera device of FIG. 32, shown in its retracted state.

Optionally, and with reference to FIGS. 32-34, a camera device or module 814 includes a camera 815 disposed inboard of a vehicle body portion 810a, and a curved mirror element 828 is extendable and retractable relative to the vehicle body portion at a slot or aperture formed through the body portion. In the illustrated embodiment, the camera 815 is disposed at or near a viewing aperture 810b so that the camera views through the viewing aperture. When the arcuate mirror element 828 is extended, the camera views the reflective surface of the mirror element so as to capture image data representative of the scene occurring behind the camera as reflected by the arcuate mirror element. When the mirror element is retracted (FIG. 33), an outer side edge of the mirror element may be disposed at and correspond with the outer surface of the vehicle body portion. The vehicle body portion may include a sealing element that engages and seals against the mirror element as the mirror element moves between and stops at the extended and retracted positions. The viewing aperture 810b of the camera may also have a sealing element that seals against the surface of the vehicle body when the camera is not viewing through the aperture or the camera may be disposed at the aperture in such a way as to provide the seal. For example, the lens of the camera may be disposed in the aperture and sealed into position at the vehicle body. The camera and mirror element configuration and orientation may utilize aspects of the system described in U.S. Pat. No. 10,384,610, which is hereby incorporated herein by reference in its entirety.

The camera thus can be completely inside the vehicle body portion, with the mirror element inside the body portion when not in use, but when deployed, the mirror element extends from the body portion. The camera thus stays fixed within the body of the vehicle and is protected within the vehicle body portion, while the mirror is the only thing that slides out from the vehicle. The mirror is positioned in front of the camera so that the camera can get the necessary or desired view via reflection of light incident at the curved reflective surface of the mirror element. The mirror element is curved such that by changing the extension of the mirror from the vehicle, the rearward image seen by the camera can be adjusted. This adjustment may be selected or made by the driver to provide the vehicle driver with the required/desired view. The curvature of the mirror element allows for a wider field of view, without requiring a further extension from the vehicle, so that the package size can remain small. The mirror element stays protected while stowed within the vehicle, and the system may provide for self-cleaning of the mirror element upon stowing/deploying.

Thus, the camera devices have different pivot points or axes or movement paths and may provide vertical or horizontal views, depending on the application. The devices may provide for pivoting in different directions, such as rearward, forward, up or down, and may also pivot into the vehicle body portion. The devices may include extending mechanisms to selectively increase or alter the field of view of the camera (such as responsive to a user input actuated by the driver of the vehicle). The devices may provide a manual override for extension or retraction, where the manual override may be a part of the wing or it may be a lever/button in the vehicle cabin that provides a mechanism to force the wing to deploy when it is stuck or unpowered. The extending camera wing may be mounted in various locations, such as at a front or rear vehicle fender or at a side or rear vehicle door or the like. The camera devices include a camera (such as for a CMS or surround view system or the like) and may also include an illumination source (such as for illuminating the ground at the side of the vehicle and/or for illuminating at least a portion of the field of view of the camera) and may also include an indicator or the like or other electronic accessory.

Figure 35:
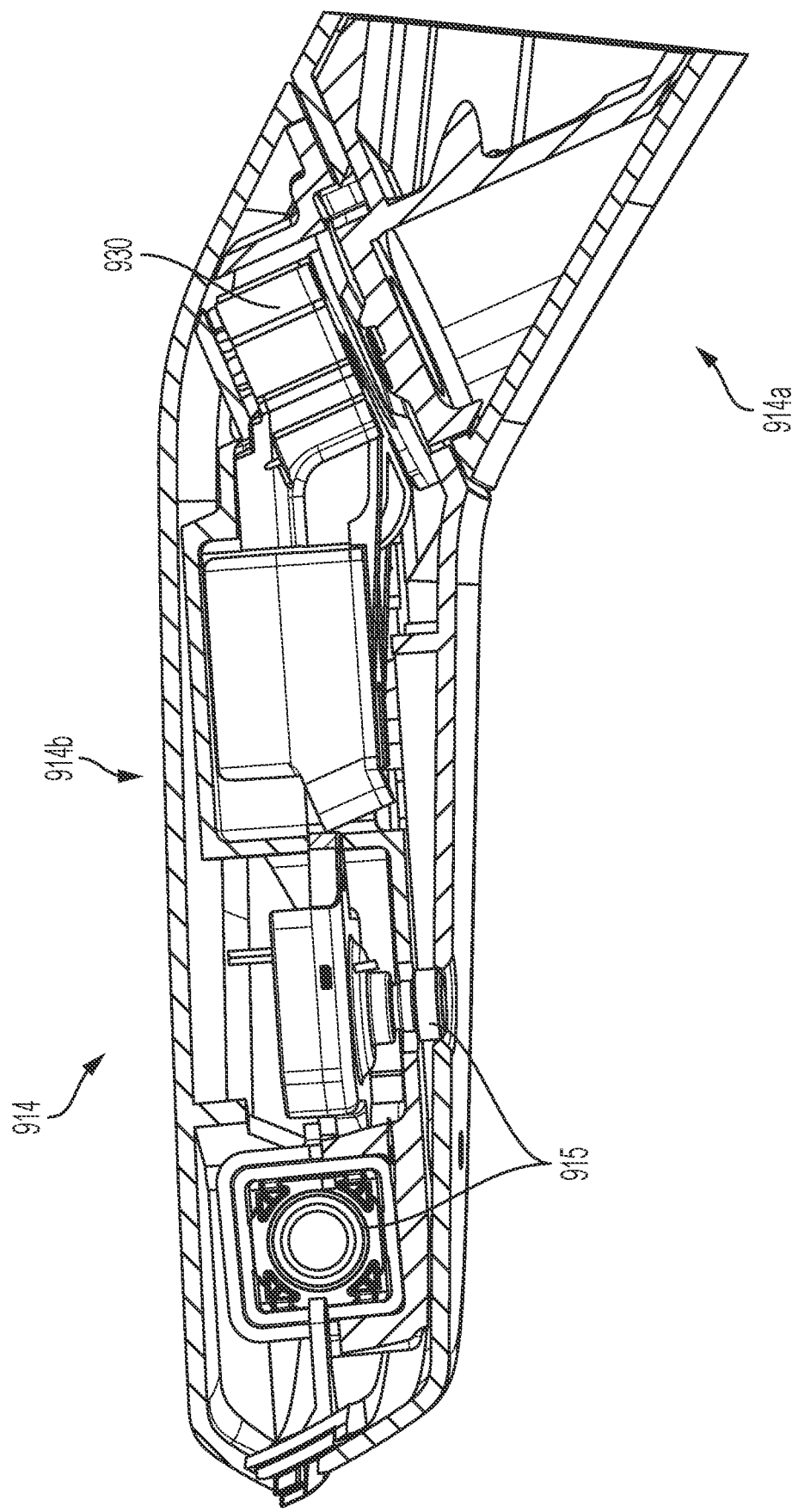
FIG. 35 is a view of a camera device having an actuator disposed within the device to pivot the camera device relative to a base portion at the vehicle between an extended state and a retracted state.

Optionally, the camera device may be disposed at the exterior of the vehicle and may comprise a base portion that is attached at the side of the vehicle and a pivoting portion that pivots relative to the base portion of the camera device. For example, and such as shown in FIG. 35, the camera device 914 includes a base portion 914a that is configured to mount to the side of the vehicle (so as to be at least partially exterior of the side portion of the vehicle) and a pivoting wing portion 914b that pivots relative to the base portion between the extended position (FIG. 35) and a retracted position (where the wing portion may be alongside and exterior of the side portion of the vehicle at which the base portion is mounted). The wing portion 914b houses one or more cameras 915 therein and includes a powerfold actuator 930 that is operable to pivot the wing portion relative to the base portion, such as responsive to a user input or responsive to a gear selection or speed of the vehicle. As styling preferences lean toward a slimmer profile wing, there is less room within the camera device for the actuator.

Figure 36:
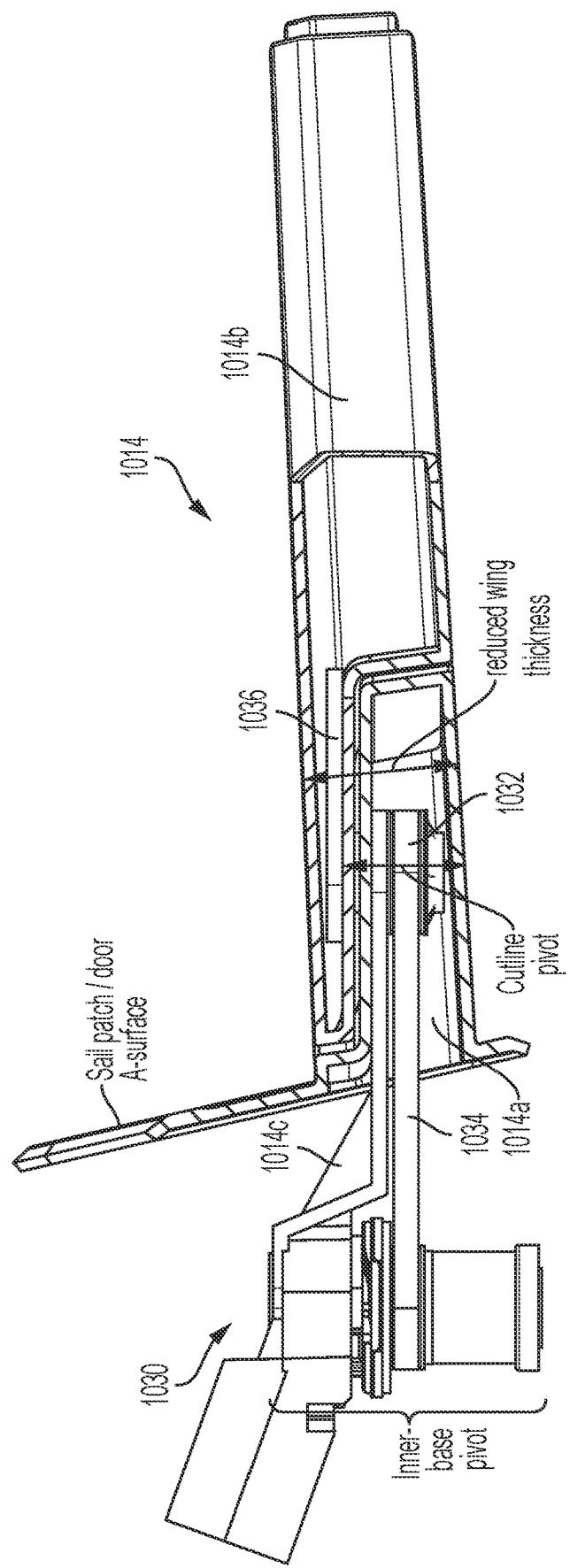
FIG. 36 is a view of another camera device having an actuator disposed within the side portion of the vehicle, with a linkage to a pivot element of the camera device for pivoting the camera device relative to a base portion at the vehicle between an extended state and a retracted state.
Figure 37:
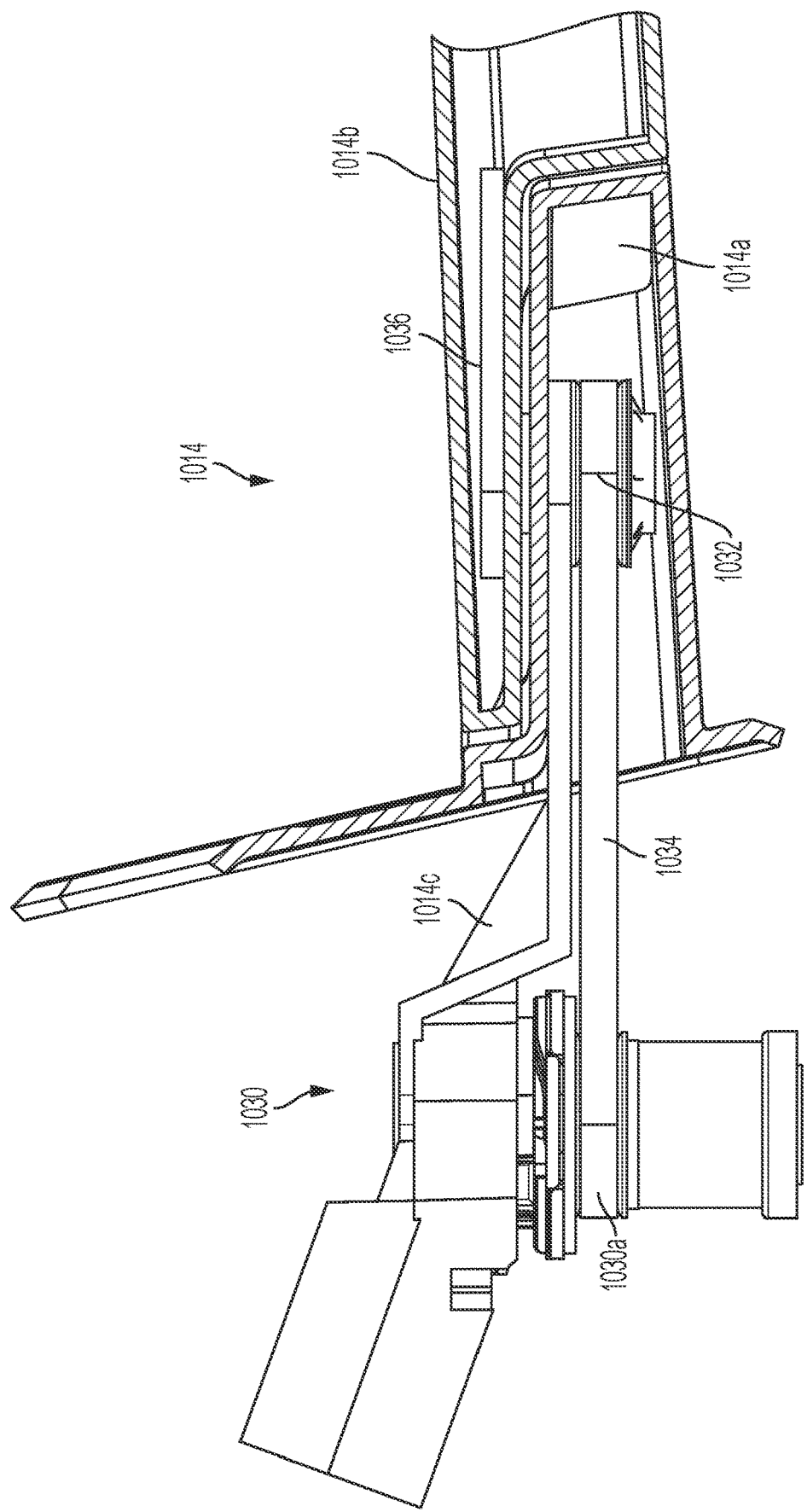
FIG. 37 is an enlarged view of the pivots of the camera device of FIG. 36.
Figure 38:
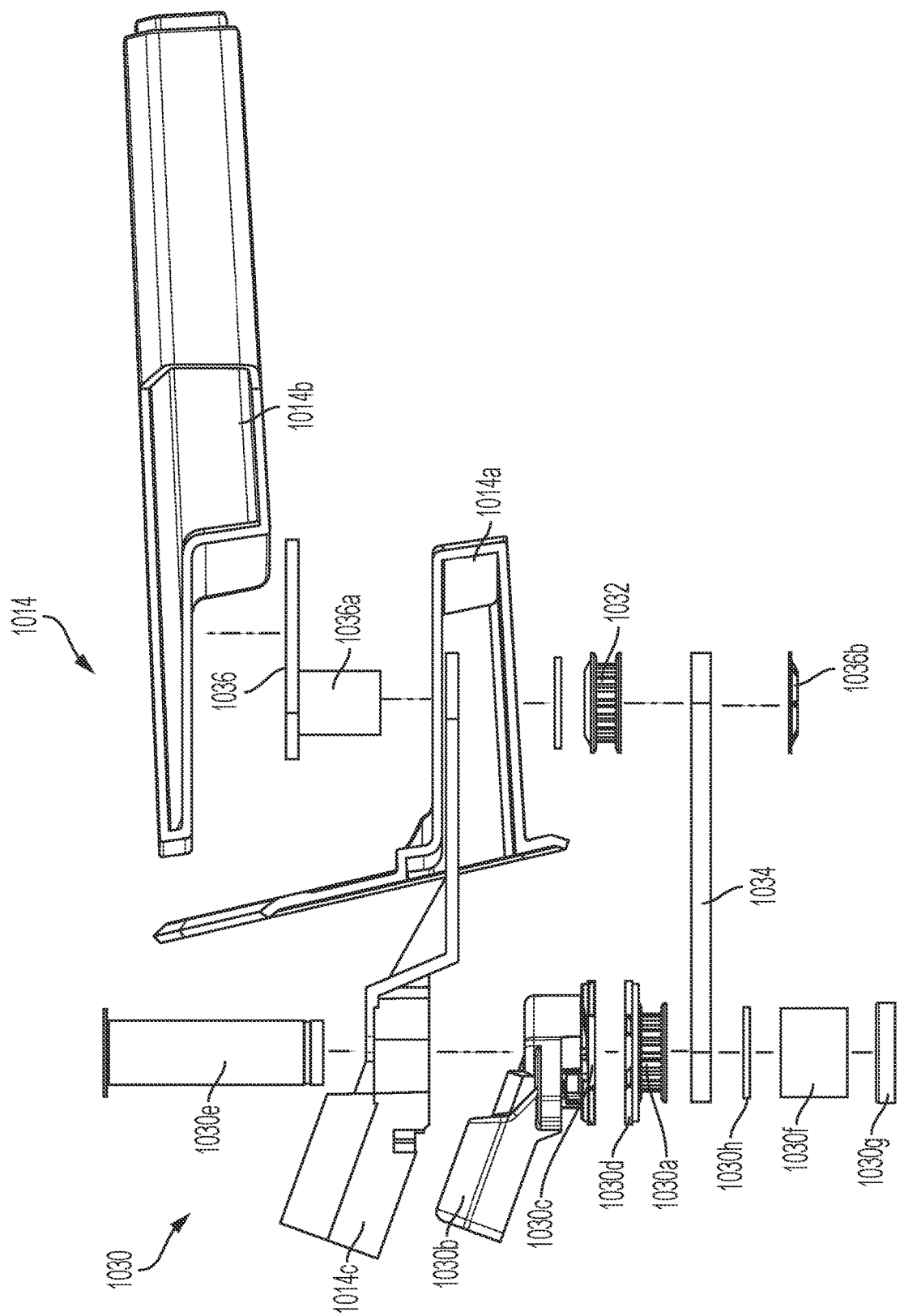
FIG. 38 is an exploded perspective view of the camera device of FIG. 36.
Figure 39:
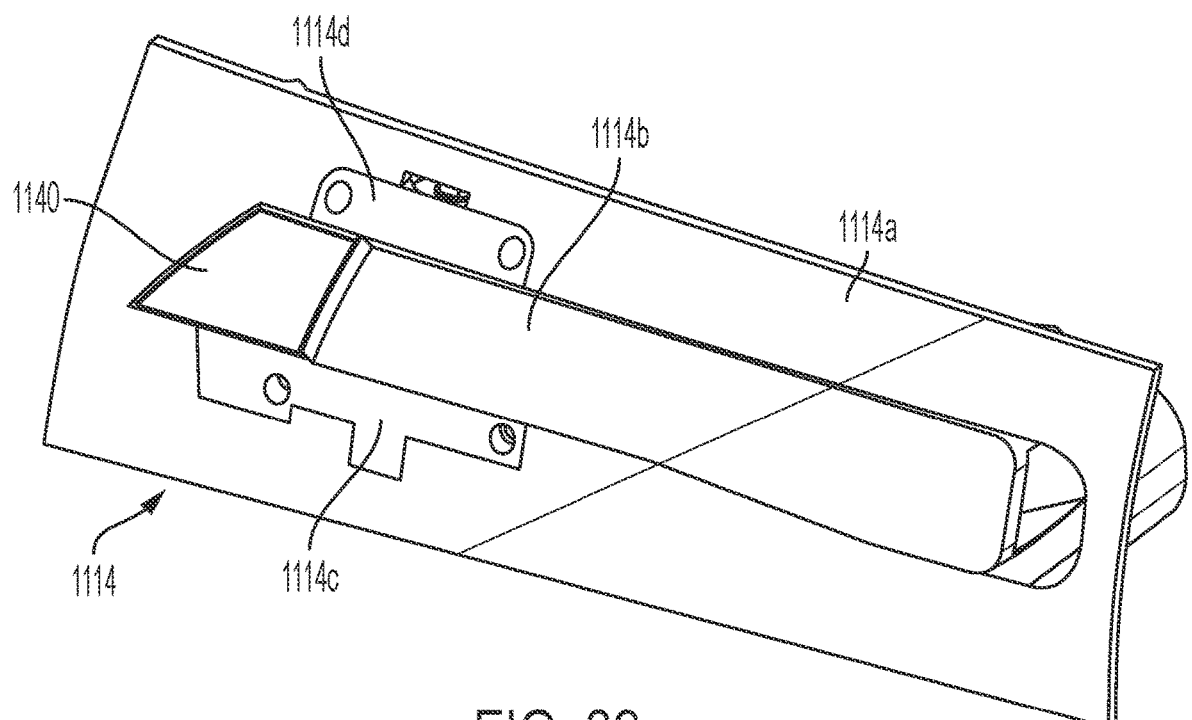
FIG. 39 is a perspective view of another camera device, shown in its retracted state.

As shown in FIGS. 36-38, a camera device 1014 may comprise a low or slim profile device having a low profile base portion 1014a configured to attach at the side of the vehicle, and a low profile wing portion 1014b pivotally mounted at the base portion 1014a. The wing portion 1014b houses at least one camera 1015 therein, and is pivotable relative to the base portion via a powerfold actuator 1030 between a retracted position and an extended position (FIG. 36). To reduce the space requirements in the camera device (e.g., in the wing or the base portion of the camera device), the actuator 1030 is disposed within the side portion of the vehicle and is linked to a pivot element 1032 at the base portion, whereby actuation of the actuator imparts pivotal movement of the pivot element 1032 to pivot the wing portion 1014b relative to the base portion 1014a.

In the illustrated embodiment, the actuator 1030 is connected to the pivot element 1032 via a linkage 1034, such as a flexible linkage, such as a belt or chain or the like, with the flexible linkage routed around a driven pivot element 1030a (such as a pulley or the like) of the actuator 1030 and around the pivot element 1032 (such as a pulley or the like) at the base portion. The pivot element 1032 is disposed at a cylindrical portion or pivot tube 1036a of a bracket 1036 that is part of or attached to the wing portion 1014b and that pivotally attaches the wing portion to the base portion. The pivot element or pulley 1032 receives or connects to the linkage 1034 and is retained at the cylindrical portion of the bracket via a retainer 1036b (such as a palnut or the like). The linkage connects to the pulleys and passes through and along a passageway of the base portion and into the side portion or door of the vehicle. As best seen with reference to FIG. 38, the bracket 1036 pivotally mounts the wing portion 1014b to the base portion 1014a, such that pivotal movement of the pulley 1032 pivots the bracket 1036 to pivot the wing portion relative to the base portion.

The powerfold actuator 1030 is attached at or mounted at an inner base portion or bracket 1014c that extends inward into the side portion or door of the vehicle from the outer base portion 1014a. As shown in FIG. 38, the actuator 1030 comprises a motor 1030b that operates to rotatably drive the pulley 1030a. The actuator includes an upper detent plate 1030c and a lower detent plate 1030d (which may be part of the pulley 1030a) that function to retain the wing portion at appropriate detent positions (e.g., at the retracted position and at the extended position). The detent plates and pulley are disposed at and along a pivot tube 1030e, and are retained thereat via a coil spring 1030f and a retainer 1030g (such as a palnut or the like). A washer 1030h (such as a low friction (e.g., Teflon coated) washer or the like) may be disposed between the spring 1030f and the lower surface of the pulley 1030a.

Thus, the camera device 1014 has its actuator 1030 disposed within the side portion or door of the vehicle at which the camera device is mounted. Using a belt, chain or other linkage device, rotation at the actuator is transmitted from the inner base or actuator pivot to the outer base or cutline pivot. This allows the camera device to have a thinner or reduced exterior profile wing portion than devices that place the powerfold actuator at the cutline or interface between the wing and the base (see, for example, FIG. 35). With the actuator disposed in the side portion or door of the vehicle, the wing and base thickness at the pivot joint (that pivotally attaches the wing portion to the base portion) may be reduced to less than or equal to about 50 mm, such as less than or equal to about 40 mm or less than or equal to about 30 mm.

Optionally, the camera device may have an actuator disposed remote from the support arm or wing portion and that transmits rotation to the camera wing, where the actuator is a cable pull actuator, such as a cable pull actuator that utilizes aspects of the cable pull actuators described in U.S. provisional application Ser. No. 63/202,633, filed Jun. 18, 2021, which is hereby incorporated by reference herein in its entirety. Such a cable pull actuator may allow for further slimming of the camera wing profile as rotation may be transferred via pulling (by an actuator remote from the camera wing) at a metallic cable connected to the pivot element of the wing. The camera wing may be pulled from its retracted position to its extended position via the cable pull actuator and returned from the extended position to the retracted position via a return spring or biasing element.

Figure 40:
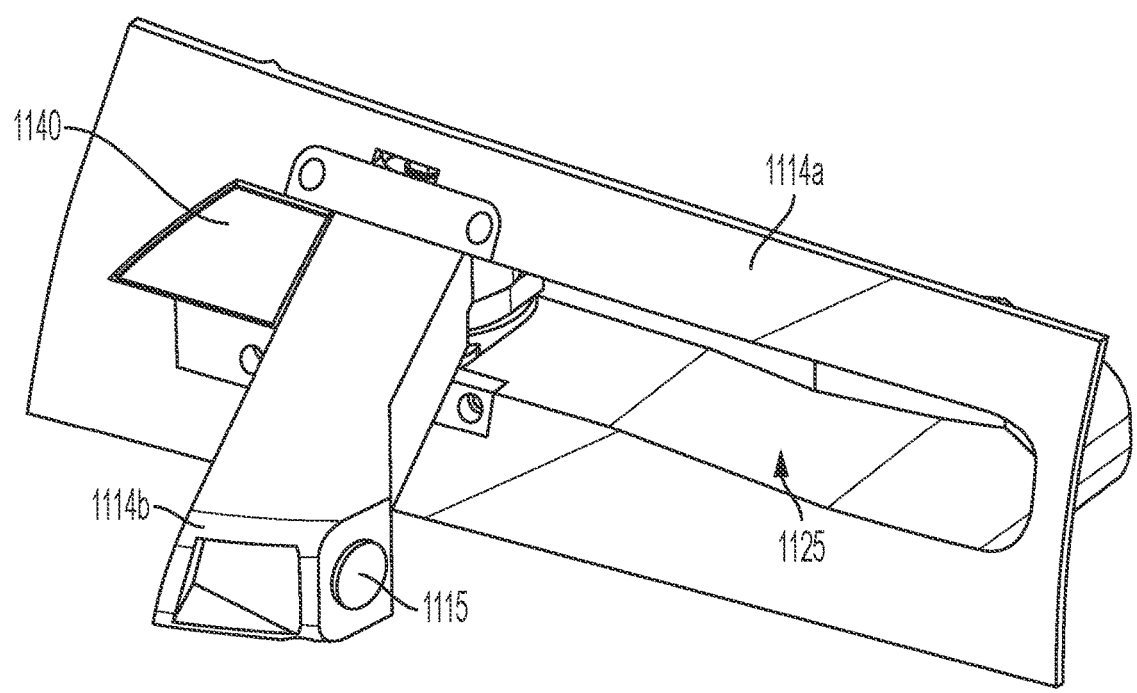
FIG. 40 is a perspective view of the camera device of FIG. 39, shown in its extended state.

Optionally, and as shown in FIGS. 39-49, a camera device 1114 is disposed at the side of the vehicle and pivotable relative to the vehicle body 1110a. The camera device 1114 includes a support arm or wing portion 1114b that supports a camera 1115 and that is pivotally mounted at a bracket or base portion 1114a and that is rotatable between a retracted position or state (FIG. 39) and an extended position or state (FIG. 40). The bracket or base portion includes a receiving structure for receiving the wing therein and for pivotally mounting the wing and detent assembly thereat, with a lower attachment plate 1114c and upper attachment plate 1114d that attach at the base portion to retain the wing and detent assembly at the base portion. The wing 1114b is received in an aperture or a recess 1125 of the base portion 1114a, which is received in an aperture or recess in the side of the vehicle body 1110a (or door), and an outer surface of the wing may be flush with the outer surface of the base portion or vehicle when in the retracted position. The wing may be pivotally attached at a recess at the side portion of the vehicle or at the base portion (whereby the base portion, with the wing and detent assembly mounted thereat, may be mounted at the side portion of the vehicle as a unit or module). The base portion thus may provide the recess or aperture for receiving the retracted or stowed wing, and the base portion may have an outer edge or surface that is coplanar with the outer surface of the side portion or body or door of the vehicle. When in the extended state, the camera is positioned with a field of view exterior the vehicle. Additionally, the wing 1114b is rotatable beyond the extended position in a direction opposite of the retracted position to a forward fold position (FIGS. 41 and 42) (such as on impact with an object) and is biased or spring loaded from beyond the extended position back toward the extended position via a forward fold flap assembly 1138.

Figure 41:
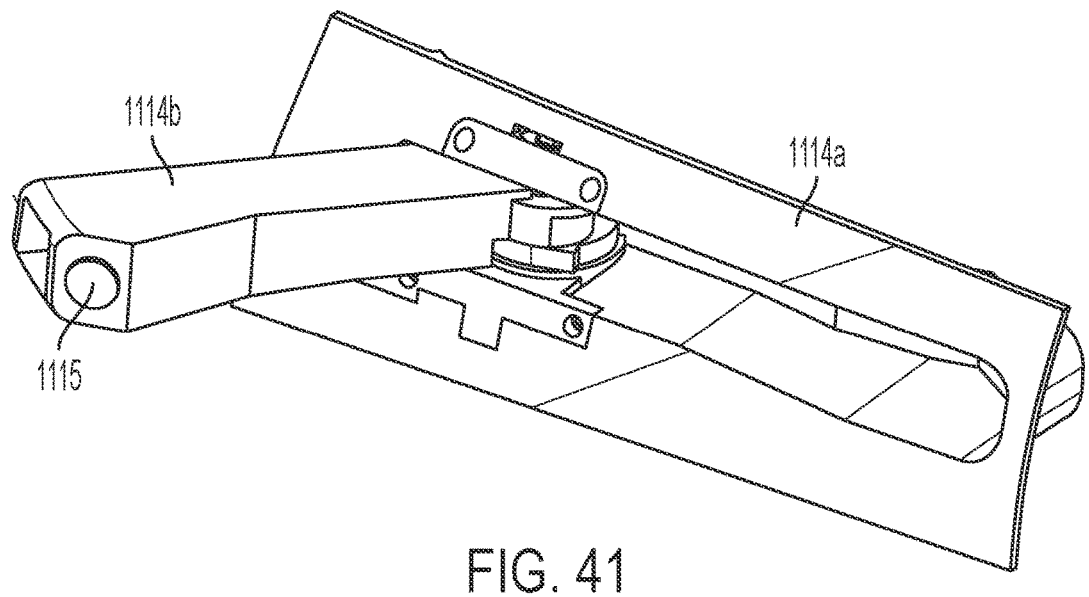
FIG. 41 is a perspective view of the camera device of FIG. 39, shown in its forward fold state beyond the extended state.
Figure 42:
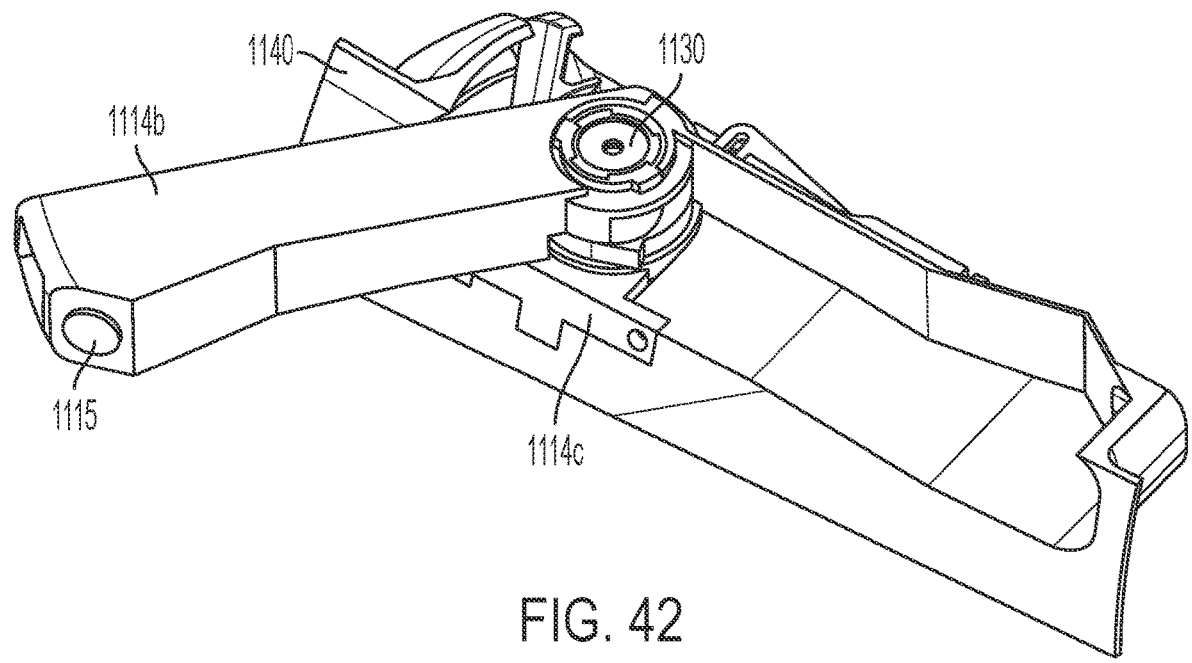
FIG. 42 is a perspective view of the camera device of FIG. 39, shown in its forward fold state with an upper portion of the vehicle body removed.
Figure 43:
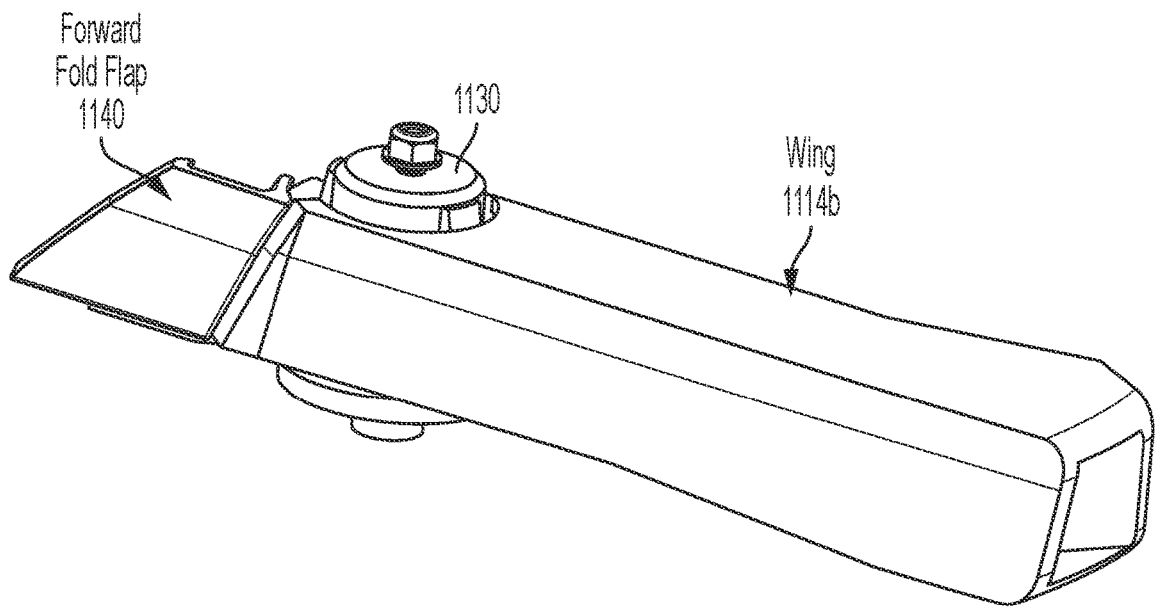
FIG. 43 is a perspective view of the camera device of FIG. 39, shown in its retracted state.

The forward fold flap assembly 1138 includes a forward cover element or fold flap 1140, a forward return spring 1142, and a forward return linkage 1144. As shown in FIGS. 41 and 42, when the wing 1114b is folded forward (such as via manual pushing the wing forward or via an impact with an object), the wing rotates beyond the extended position in a direction opposite the retracted position toward the front of the vehicle. A space or forward cavity or forward aperture in the outer surface of the vehicle accommodates the rotation of the wing into the forward cavity. The forward fold flap assembly 1138 positions the forward fold flap 1140 over the forward cavity when the wing 1114b is in the extended and retracted positions and the forward return spring 1142 provides a retaining force to retain the forward fold flap at the cavity to seal the forward cavity and preclude moisture, debris, and other material from entering the forward cavity. When the wing 1114b rotates beyond the extended position, the wing moves into the forward cavity and the forward flap 1140 is moved from its covering or sealing position to a non-covering or non-sealing position to accommodate the wing (e.g., the forward flap may be pushed into the cavity via the pivoting motion of the wing). The forward return spring 1142 biases the forward flap 1140 back toward the cavity sealing position and, via engagement of the forward flap and the wing, biases the wing 1114b back from the forward fold position toward the extended position. The forward return linkage 1144 connects the forward return spring 1142 to the forward fold flap 1140 and the wing 1114b engages the forward fold flap 1140 when the wing is pivoted beyond the extended position so that the forward return spring 1142, via the forward fold flap 1140, may provide the biasing force at the wing 1114b. Thus, the return spring 1142 provides the force required to keep the forward flap 1140 sealed when the wing is in the extended position and the retracted position (FIG. 43) as well as to return the wing to the extended position after it is rotated beyond the extended position and released.

The forward fold flap 1140 rotates about the same pivot axis as the wing 1114b via the pivot element 1146 disposed about the actuator 1130. The pivot element 1146 may be integrally formed with the forward fold flap 1140 and connects the forward return linkage 1144 to the forward fold flap 1140 to translate lateral movement of the linkage and return spring 1142 to rotational movement of the pivot element 1146 and flap 1140 about the pivot axis. The forward fold flap assembly 1138 assembles to the rest of the camera device 1114 to form a singular assembly that can be installed with the attachment plates 1114c, 1114d into the base portion 1114a.

Figure 44:
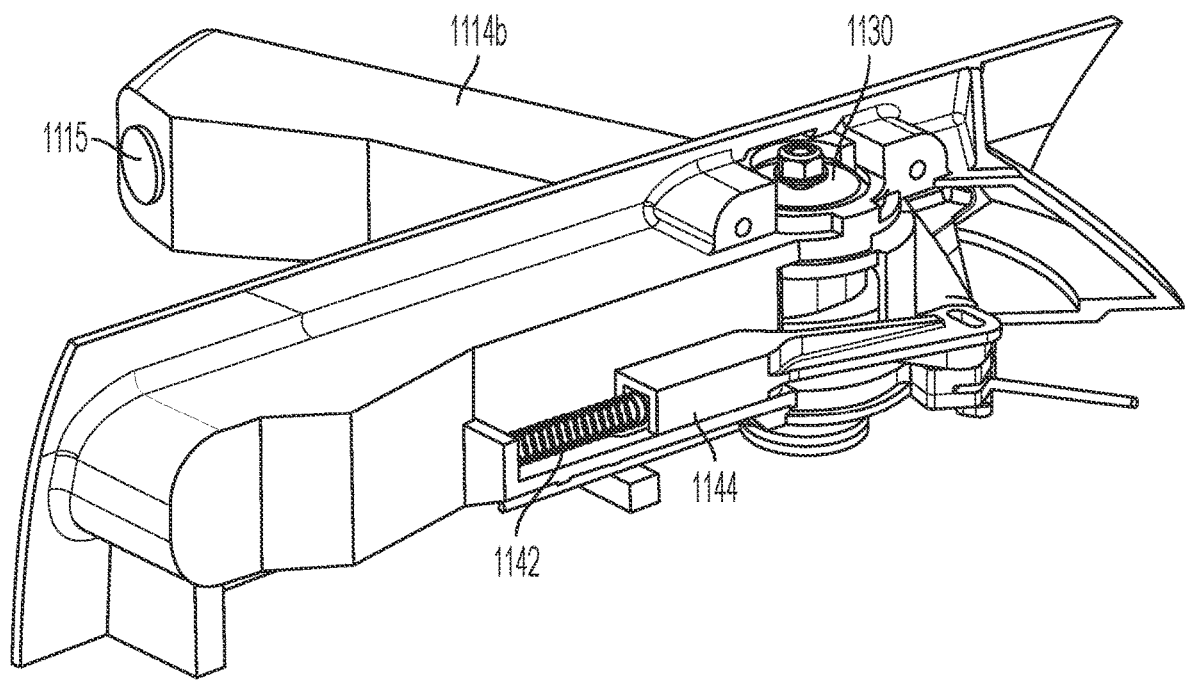
FIG. 44 is a perspective view of the camera device of FIG. 39, showing its actuator and forward fold flap assembly.
Figure 45:
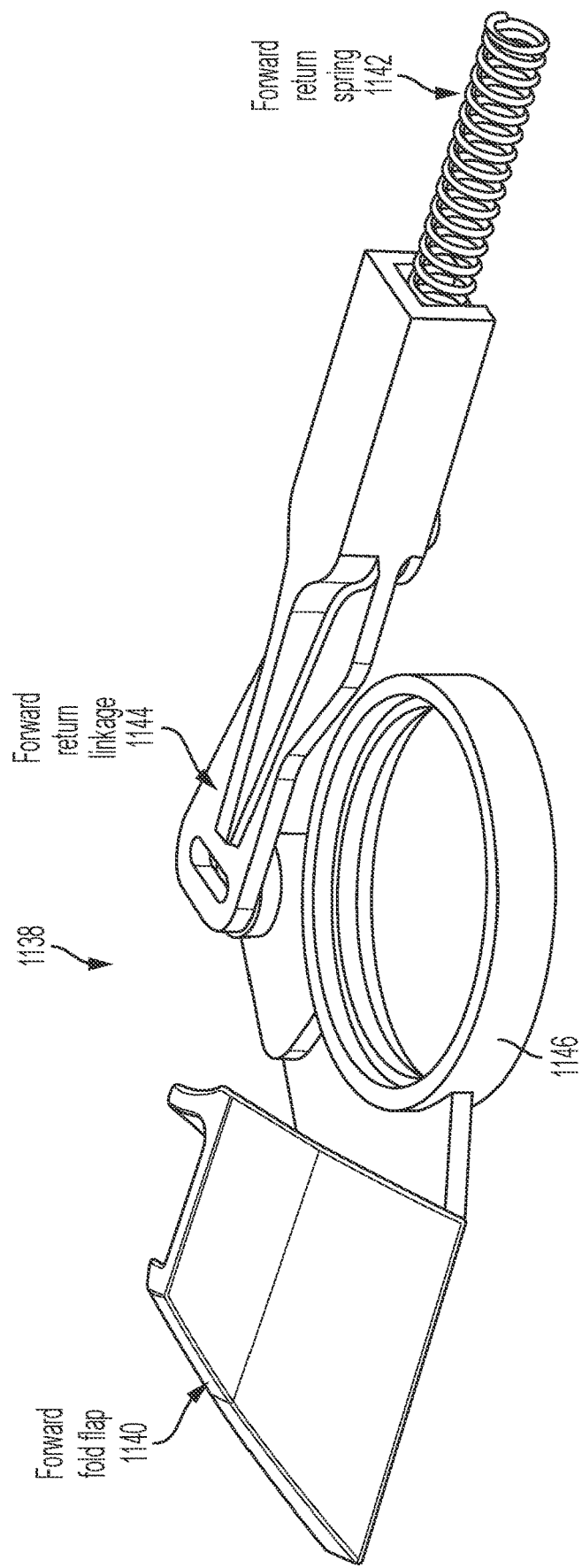
FIG. 45 is a perspective view of the forward fold flap assembly of the camera device of FIG. 39.

As shown in FIGS. 44 and 45, the forward return spring 1142, via the linkage 1144, may be connected at the pivot element 1146 to provide the biasing force to the forward fold flap 1140. The pivot element 1146 is attached at the wing pivot so that the forward fold flap and wing may pivot about the same pivot axis. The forward fold flap pivots only via manual pivoting or spring biased pivoting of the wing between the extended position and the forward fold position.

Optionally, when the wing 1114b is pivoted between the retracted and extended positions, the wing is pivoted via operation of a cable or pull mechanism pivoting an arm or protrusion 1137 of the wing pivot. The cable or pull mechanism may attach at the arm or protrusion 1137 to pull at the arm (via a remote actuator disposed within the vehicle door) to pivot the wing 1114b from the retracted or stowed or folded position toward the extended position, such as by utilizing aspects of the wings and actuators described in U.S. provisional application Ser. No. 63/202,633, filed Jun. 18, 2021, which is hereby incorporated herein by reference in its entirety.

Figure 46:
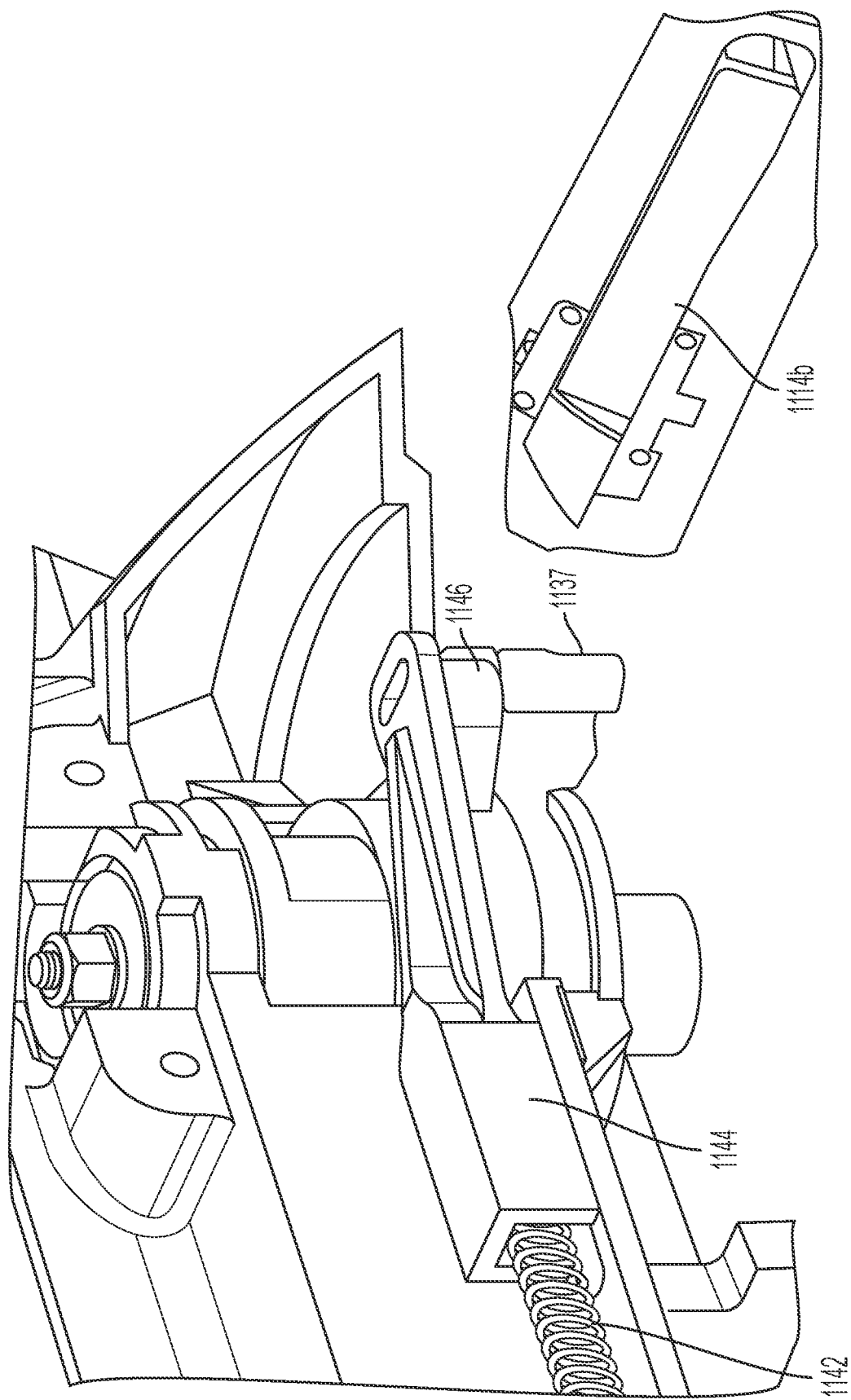
FIG. 46A is a perspective and partial cross-sectional view of the camera device of FIG. 39, shown in its retracted state.
FIG. 46B is a perspective view of the camera device of FIG. 39, shown in its retracted state.
Figure 47:
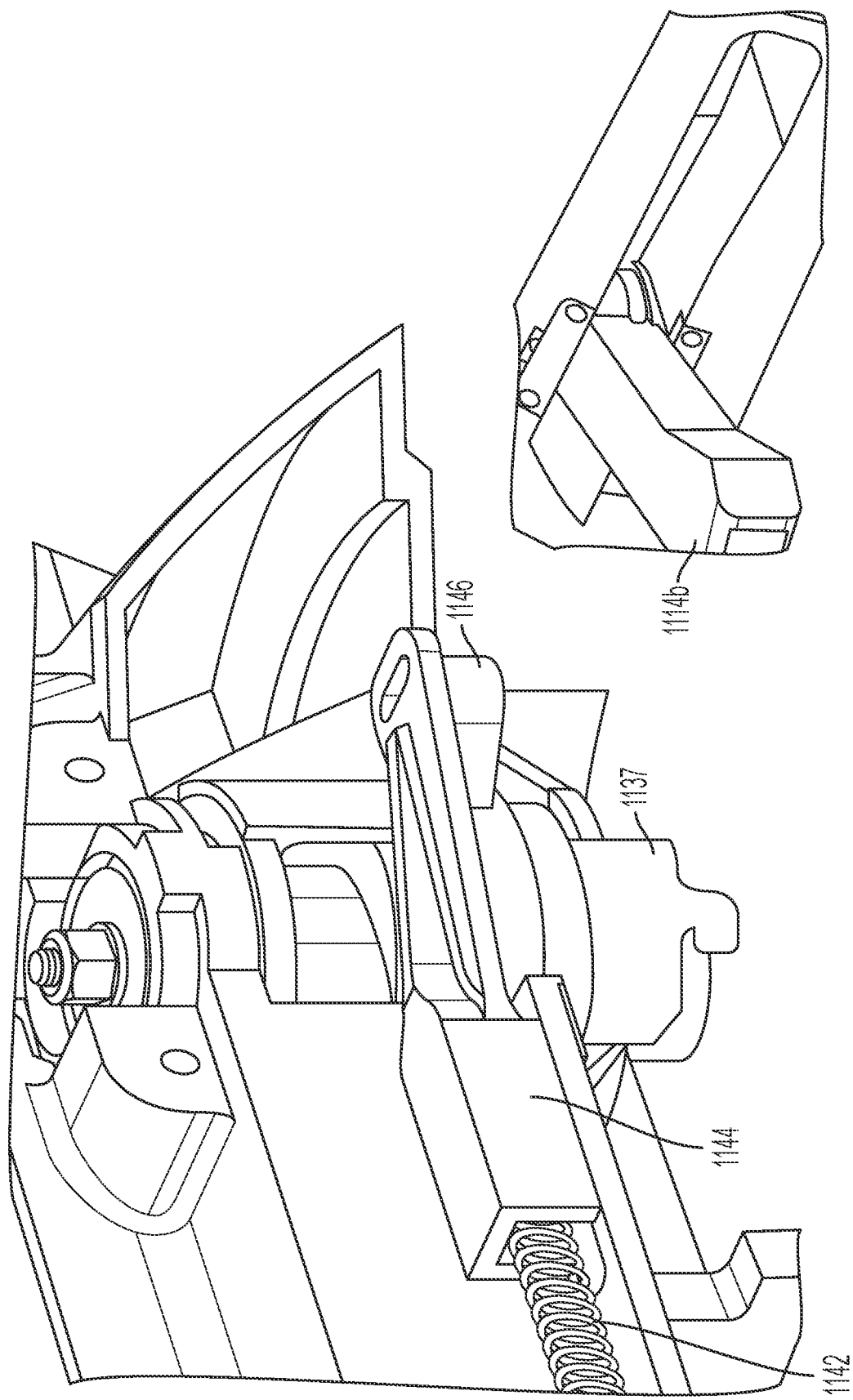
FIG. 47A is a perspective and partial cross-sectional view of the camera device of FIG. 39, shown in its extended state as extended via actuation of the actuator.
FIG. 47B is a perspective view of the camera device of FIG. 39, shown in its extended state.
Figure 48:
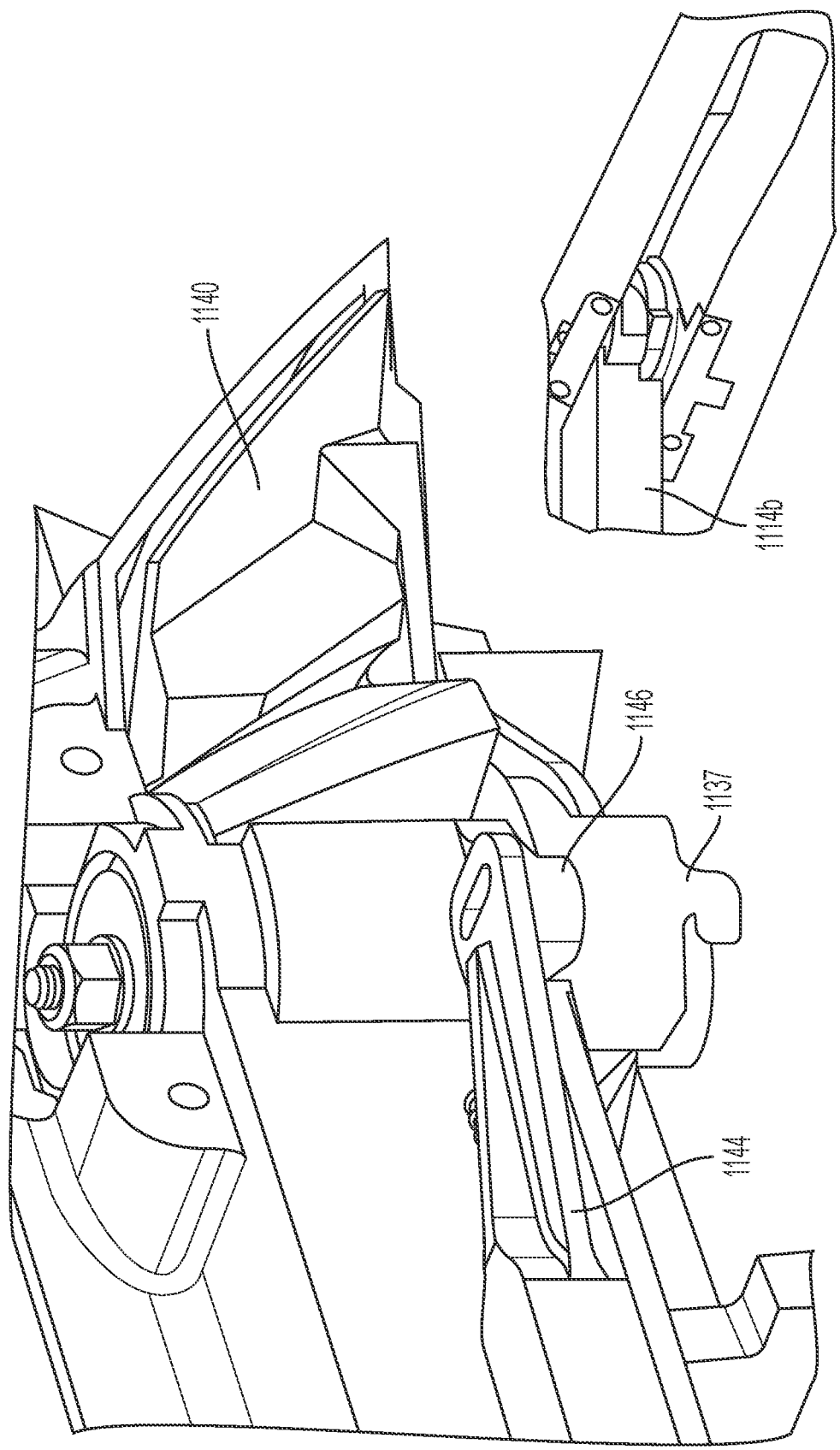
FIG. 48A is a perspective and partial cross-sectional view of the camera device of FIG. 39, shown in its forward fold state when manually moved from the extended state.
FIG. 48B is a perspective view of the camera device of FIG. 39, shown in its forward fold state.

For example and as shown in FIGS. 46A-48B, the remote actuator may pull a cable to pivot the arm or protrusion 1137 of the wing pivot toward the actuator and thus pivot the wing 1114b from the retracted (FIGS. 46A and 46B) to the extended position (FIGS. 47A and 47B). When the remote actuator is operated to pivot the wing 1114b from the extended position to the retracted position, the actuator may release the cable or allow for the cable to move in the opposite direction, whereby a torsion spring may bias the wing toward the retracted position. The forward fold flap assembly 1138 remains stationary (i.e., with the forward flap 1140 in the sealed position) when the wing 1114b is pivoted between the retracted and the extended positions. As shown in FIGS. 46A and 47A, the arm or protrusion 1137 of the wing pivot pivots when the wing 1114b is pivoted between the retracted and extended position while the linkage 1144 and pivot element 1146 remain stationary.

When the wing is manually pivoted beyond the extended position toward the forward fold position (FIGS. 48A and 48B), a locking component of the wing pivot may engage the arm or protrusion 1137 of the wing pivot and fix the arm or protrusion relative to the mounting base 1114a so that the arm or protrusion of the wing pivot, the cable, and the remote actuator are not subject to the force of the wing manually pivoting toward the forward fold position. Thus, when the wing is pivoted beyond the extended position toward the forward fold position, the remote actuator and torsion spring are effectively disengaged from the pivotable movement of the wing via the locking component fixing the arm or protrusion 1137 of the wing pivot to the mounting base 1114a. As shown in FIG. 48A, movement of the wing toward the forward fold position pushes the forward fold flap 1140 into the forward cavity and the compressed forward return spring 1142, via the forward return linkage 1144 and forward fold flap 1140, provides the biasing force to return the wing to the extended position when it has been released (i.e., when the force that moved it forward is removed). Additionally, because the forward return spring 1142 provides the biasing force on the wing 1114b via engagement of the forward fold flap 1140 and the wing, the forward return spring 1142 only provides the biasing force when the wing engages the forward fold flap and pushes the forward fold flap into the forward cavity.

Referring now to FIGS. 49-66, the camera device 1114 is pivotable via a cable pull actuator 1132 about an actuator 1130 having a detent assembly with an internal or integrated spring, a locking lug component 1174, a secondary detent 1136 at the top of the camera wing, and the camera device further having the forward fold flap assembly or forward cover element 1138. Instead of being driven directly by a cam or motor via a gear train, the actuator or detent assembly is activated from a remote actuator, such as via a push/pull Bowden cable 1134 attached to the cable pull actuator 1132. The cable pull actuator 1132 rotates the camera wing 1114b by pulling on a cable pull arm 1137 connected to the detent assembly. The locking lug component 1174 selectively fixes or retains the cable pull arm 1137 relative to the fixed attachment plate 1114c at the base portion 1114a at the vehicle to connect rotation of the camera wing with movement of the cable pull actuator 1132 during electrical pivoting of the camera wing 1114b and disconnect rotation of the camera wing from affecting movement of the cable pull actuator during manual rotation of the camera wing. The secondary detent 1136 engages the camera wing 1114b when the camera wing is manually pivoted to the extended position to retain the camera wing at the extended position. The forward fold flap assembly 1138 allows the camera wing 1114b to rotate beyond the extended position and provides a biasing force to return the camera wing to the extended position after being rotated beyond the extended position.

Figure 50:
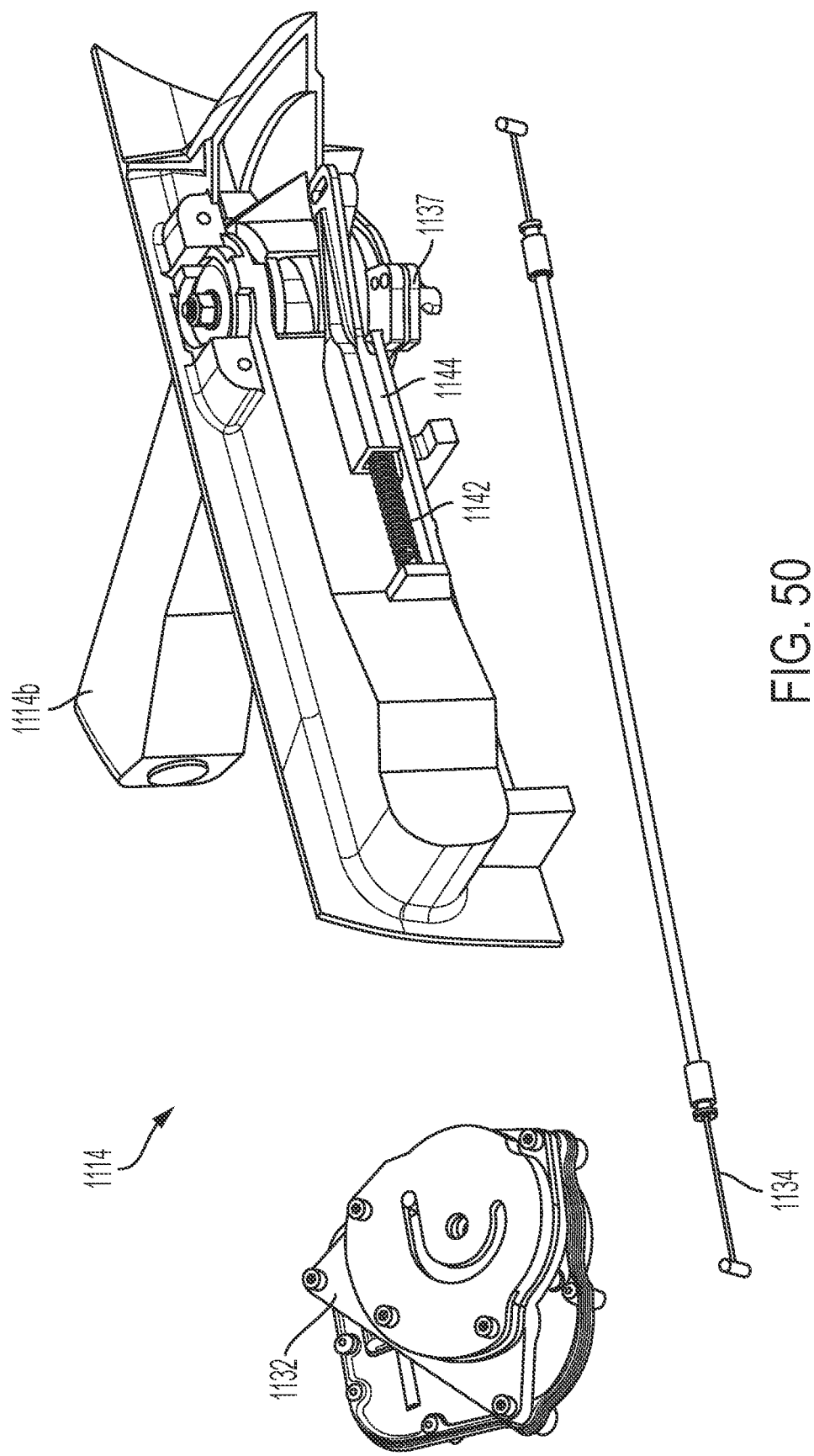
FIG. 50 is a perspective view of the camera device of FIG. 49 with a cable pull actuator operable to pivot the camera wing via a cable.
Figure 52:
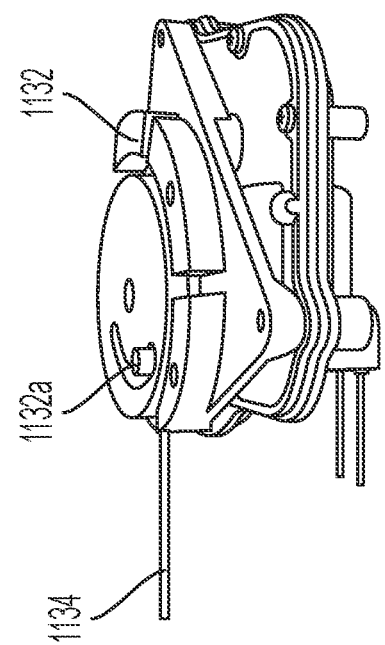
FIGS. 52-54 are perspective views of the cable pull actuator of FIG. 50.
Figure 51:
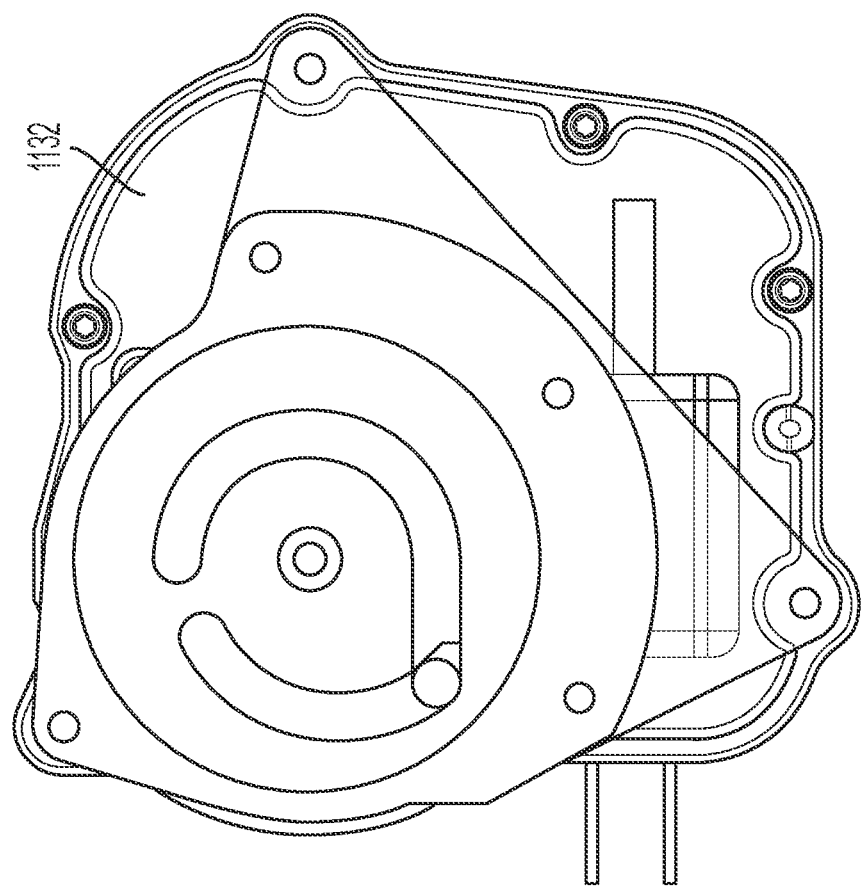
FIG. 51 is a plan view of the cable pull actuator of FIG. 50.
Figure 54:
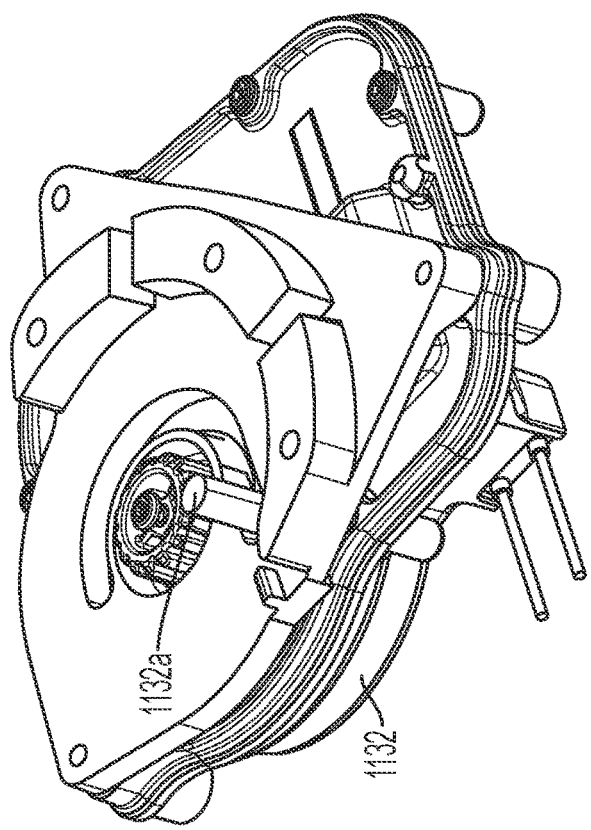
Figure 53:
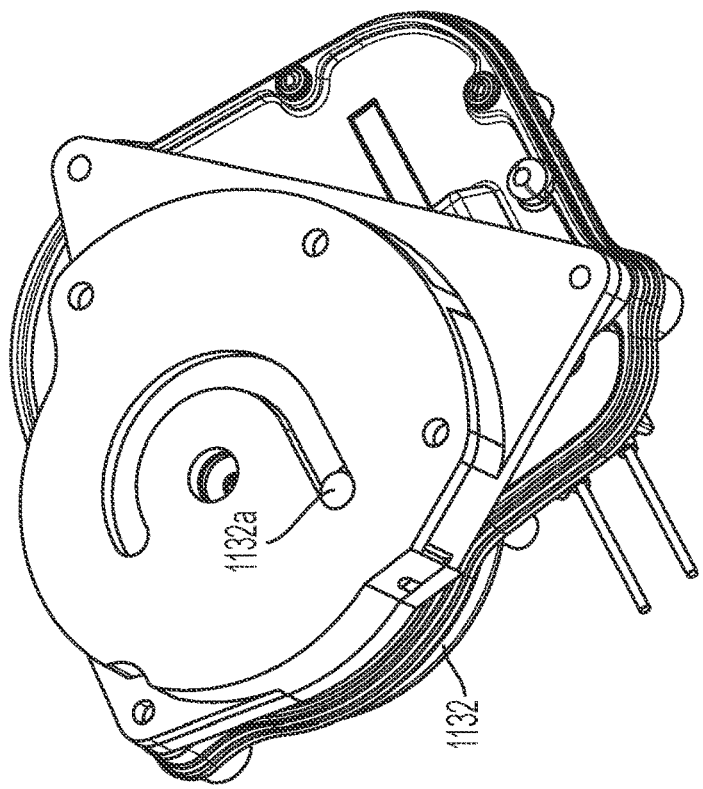

The camera wing 1114b is movable between the flush position (FIG. 39) and the extended position (FIG. 40) via the cable pull actuator 1132. As shown in FIG. 50, the cable pull actuator 1132 is disposed remote from camera wing and detent assembly and provides rotational force at the detent assembly via a cable 1134 attached at a cable pull arm element 1137. As will be discussed below, the cable pull actuator 1132 is only electrically operated to pivot the camera wing from the flush to the extended position. The camera wing is returned to the flush position from the extended position via a return torsion spring 1168. The cable 1134 attached to the cable pull actuator 1132 may comprise a metal cable (e.g., steel or other suitable flexible material with sufficient tensile strength) that is only capable of pulling, not pushing, as pushing the cable may result in bending, damaging or causing the cable to pull away from the cable pull arm element 1137 at the actuator.

When operated to rotate the camera wing from the flush position to the extended position, the cable pull actuator 1132 has a high initial pull force, such as to break through ice that has accumulated at the outer surface of the camera wing. The cable pull actuator has a variable torque ratio over the course of its travel with a high ratio at the start for a high pull force and lower ratio near the end of its rotation to increase the pull distance of the cable. The pull starts in a spiral region similar to a screw and transitions to a fully rotational movement.

As shown in FIGS. 51-54, the cable pull actuator 1132 includes a cam or motor operable to rotate a pin 1132a connected to the end of the cable 1134. The pin 1132a is connected to an end of the cable 1134 so that as the pin rotates at the cable pull actuator 1132, the cable 1134 wraps or unwraps around a pulley portion. The rotation of the pin 1132a is guided by an arcuate slot of the cable pull actuator and thus the torque provided by the actuator is variable based on the guidance of the slot at a given point in the rotation.

Figure 55A:
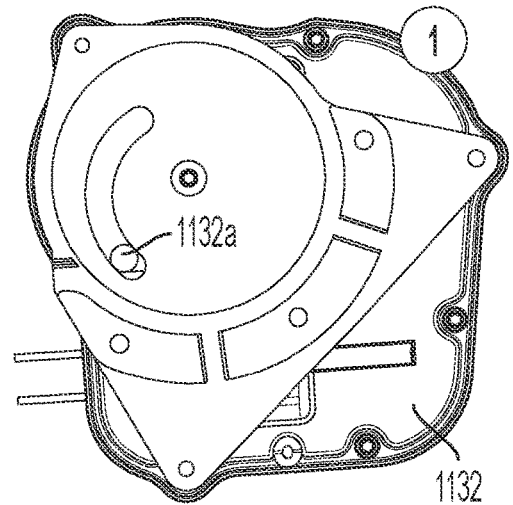
FIGS. 55A-D are plan views of the cable pull actuator during different stages of its rotation.
Figure 55B:
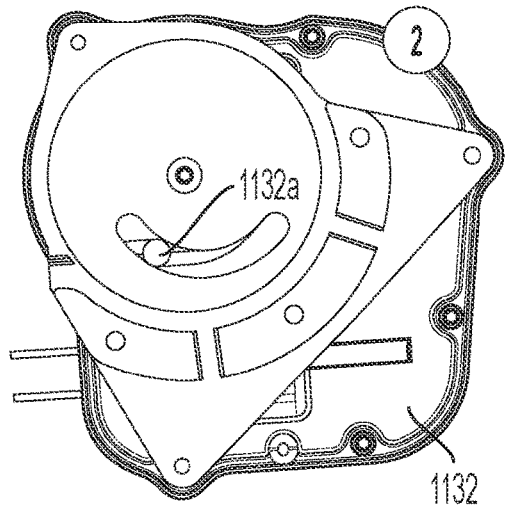
Figure 55C:
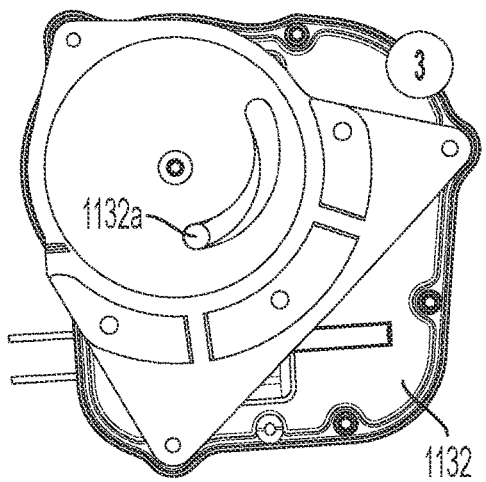
Figure 55D:
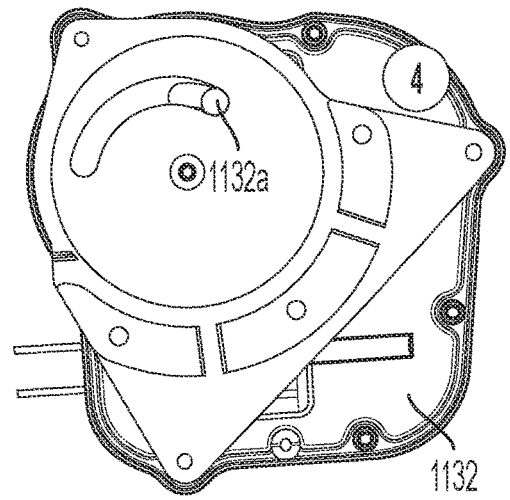

Positions 1-4 of FIGS. 55A-D depict the actuator 1132 in various stages of its rotation when operated to pivot the camera wing from the flush position to the extended position. When the actuator is activated, the cam pulley rotates counterclockwise. At position 1 (FIG. 55A), the pin 1132a starts in the spiral region of the cam and slides along the slot in the housing of the cable pull actuator to arrive at position 2 (FIG. 55B). Roughly half of the total cam rotation happens in this region, yet the pin 1132a moves a very small distance (high ratio, high force, low distance travelled) corresponding with a high initial opening force of the camera wing. Once the pin 1132a hits the end of the spiral region of the cam at position 3 (FIG. 55C), the cable 1134 starts to wind around the pulley portion of the cam. Roughly 80 percent of the total cable pull distance occurs here, where the cam only uses 50 percent of its rotation (low ratio, low force, high distance travelled). At position 4 (FIG. 55D), the camera wing is at the extended position.

Tension in the cable 1134 created when the actuator 1132 pulls the camera wing 1114b to the extended position helps to hold (along with the detent assembly) the camera wing in the extended position. When the camera wing is electrically rotated back to the folded position (i.e., when the actuator rotates in the opposite direction to allow slack in the cable), the actuator 1132 begins releasing tension in the cable 1134 (i.e., rotates the opposite direction as when extending the wing) and the torsion return spring 1168 helps to unwrap the cable 1134 from the pulley so that the camera wing may pivot to the folded position. The torsion return spring 1168 is used to return the wing to the flush position when the cable pull actuator releases tension on the cable. In other words, the torsion return spring works to rotate the camera wing in a direction opposing the cable pull actuator (i.e., the torsion return spring pushes at the pivot of the camera wing and the cable pull actuator pulls at the pivot of the camera wing via the cable). The torsion return spring may directly engage the cable pull arm 1137.

When the camera wing 1114b is manually rotated between the flush and extended position, the cable pull actuator 1132 does not rotate and thus the cable pull arm 1137 at the detent assembly remains stationary during manual rotation of the camera wing. If the camera wing is manually rotated to a position without being manually rotated back to its original position, the next activation of the cable pull actuator 1132 will resync the cable pull arm 1137 according to the position of the camera wing and the following operation of the cable pull actuator 1132 will pivot the camera wing. For example, if the camera wing is manually rotated from the flush to the extended position, the cable pull arm (and cable pull actuator) will remain stationary as if the camera wing was still in the flush position. Upon the next activation of the cable pull actuator, the cable will pull the cable pull arm into alignment with the detent assembly and the cable pull arm will resync with the camera wing in the extended position and the following activation will release tension in the cable to electrically rotate the camera wing back to the flush position.

Figure 49:
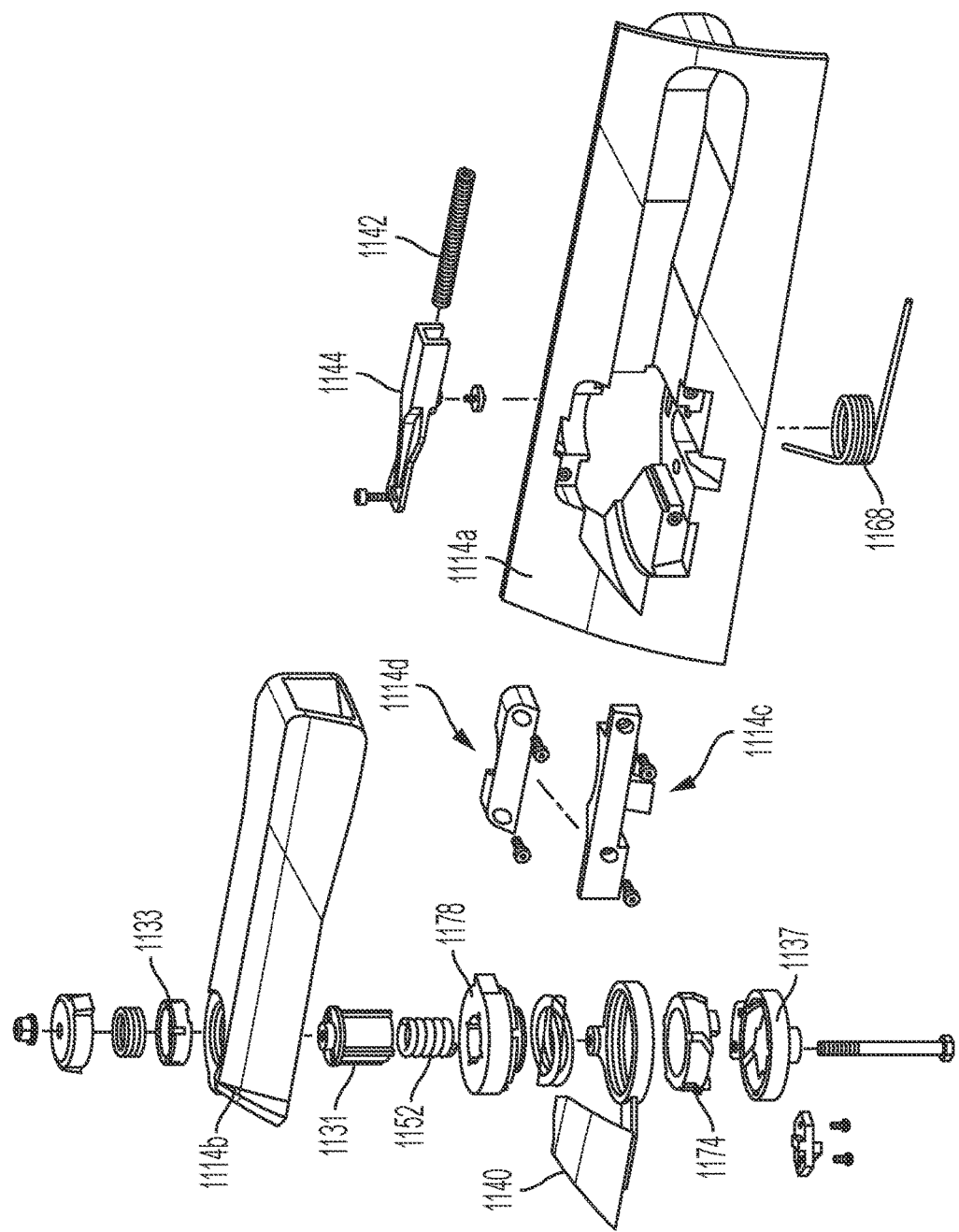
FIG. 49 is an exploded view of a camera device with a detent assembly and a forward fold flap assembly.

As shown in FIGS. 56-65, the rotational relationship between the cable pull arm 1137 (and thus cable pull actuator) and the camera wing 1114b is enabled via the detent assembly of the actuator 1130, which includes a primary detent component 1131 (FIG. 50), a secondary detent component 1133 (FIG. 51), and a locking lug component 1174 (FIG. 49). As the cable pull actuator 1132 pulls on the cable pull arm 1137 of the actuator 1130 to pivot the camera wing from the flush position to the extended position, the rotation of the cable pull arm is translated to rotation of the camera wing relative to the attachment plate 1114c of the base portion 1114a fixed to the vehicle at which the camera wing assembly is attached.

As shown in FIG. 58B, the locking lug 1174 engages and is fixed rotationally to the cable pull arm 1137 and also engages the attachment plate 1114c through the cable pull arm to, when in a lowered position, fix the cable pull arm 1137 relative to the attachment plate 1114c and prevent the cable pull arm (and therefore camera wing) from rotating. The locking lug 1174 component is engaged with the attachment plate 1114c at the bracket or base portion 1114a when the camera wing is in the flush position until the cable 1134 is pulled. The locking lug 1174 is connected to the cable pull arm 1137 via a screw interface and the locking lug 1174 raises as the arm is rotated via the cable pull actuator (i.e., the cable pulls the cable pull arm), compressing the locking lug compression spring 1176 that pushes the locking lug into engagement with the attachment plate. When the locking lug is lifted, the detent ring 1178 is able to rotate, with the wing connected to the detent ring via the primary detent 1131.

The locking lug 1174 prevents the lower portion of the camera wing pivot (the portion from which the cable pull arm extends) from rotating when the camera wing is manually rotated. The lower portion of the camera wing pivot can only rotate if the cable is pulled. Because the locking lug 1174 provides connection between the cable pull arm 1137 and the attachment plate 1114c, the locking lug holds the cable pull arm in place when the camera wing 1114b is manually extended and ensures that the wing rotates to the correct angle. In other words, the locking lug prevents creation of slack in the cable 1134 when the wing is manually extended via resisting the outside force manually rotating the camera wing from acting on the cable and cable pull actuator, which could result in the cable being pushed toward the cable pull actuator and thus bent, damaged, or disconnected. Thus, when the camera wing 1114b is manually pivoted, the locking lug engages the cable pull arm 1137 and the attachment plate 1114c to fix the cable pull arm relative to the attachment plate, preventing the movement of the camera wing from causing movement of the camera pull arm, effectively disengaging the cable pull actuator from the camera wing during such manual pivoting of the camera wing.

The locking lug also allows the return torsion spring force to be low and thus, a smaller torsion return spring 1168 may be used. Use of a smaller torsion return spring decreases the force load on the cable pull actuator and on the cable and also decreases the force loss from the cable pull, which aides in situations where more force than usual is needed to extend the wing from the flush position to the extended position (such as when ice builds up at the exterior surface of the vehicle).

Figure 60:
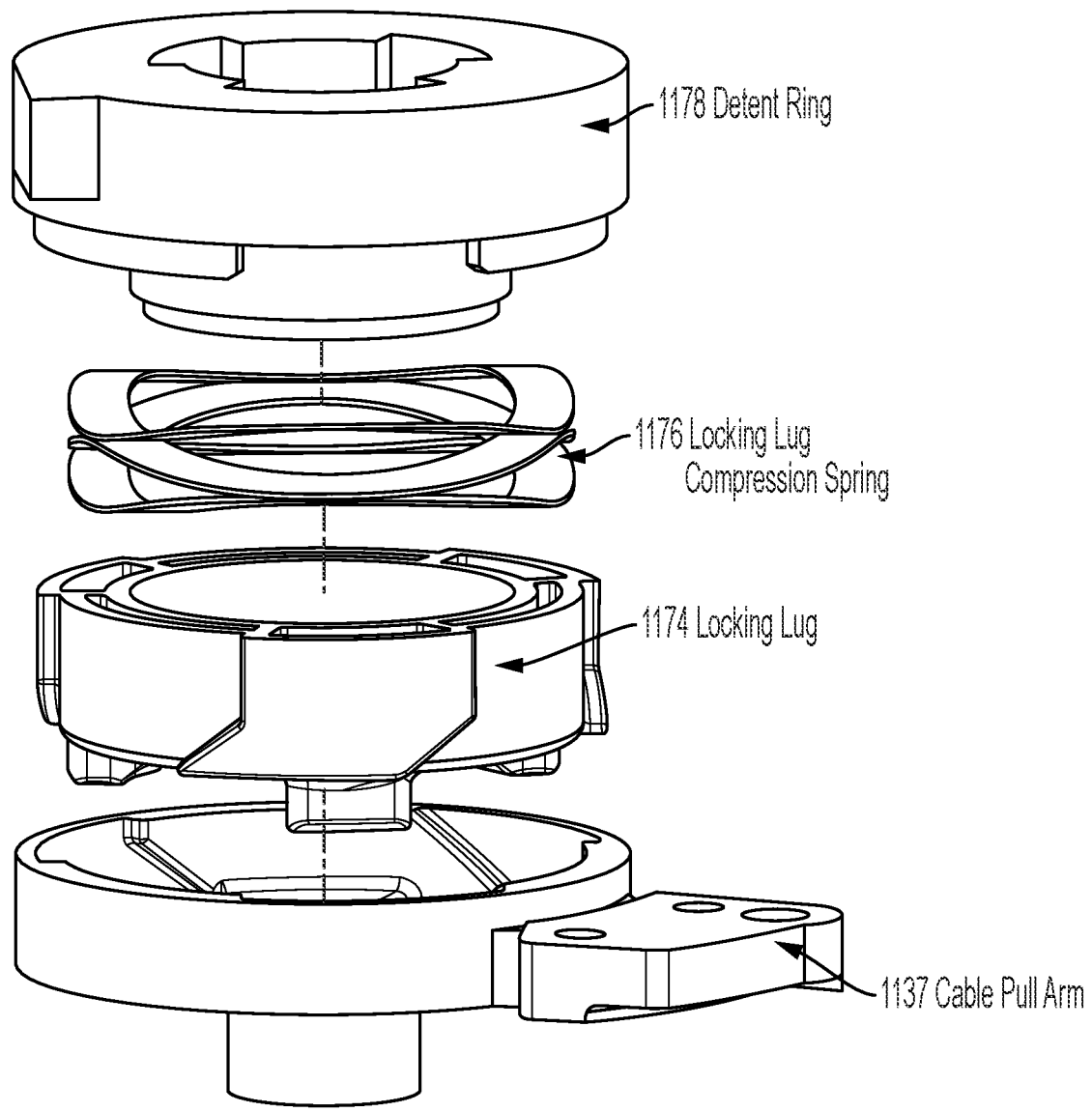
FIGS. 60-62 are exploded views of different portions of the detent assembly.

As shown in FIG. 60, the locking lug 1174 is keyed to the detent ring 1178 with the locking lug compression spring 1176 disposed between the locking lug and detent ring. As the cable pull arm 1137 is pulled, the detent ring 1178 is held in place by the locking lug's connection to the attachment plate 1114c. The cable pull lifts the locking lug 1174 to release the locking lug from its engagement with the attachment plate 1114c. Once the locking lug lifts, the detent ring 1178 and locking lug 1174 are able to rotate. The camera wing 1114b is connected to and rotates with the detent ring 1178 via the primary detent 1131.

Figure 61:
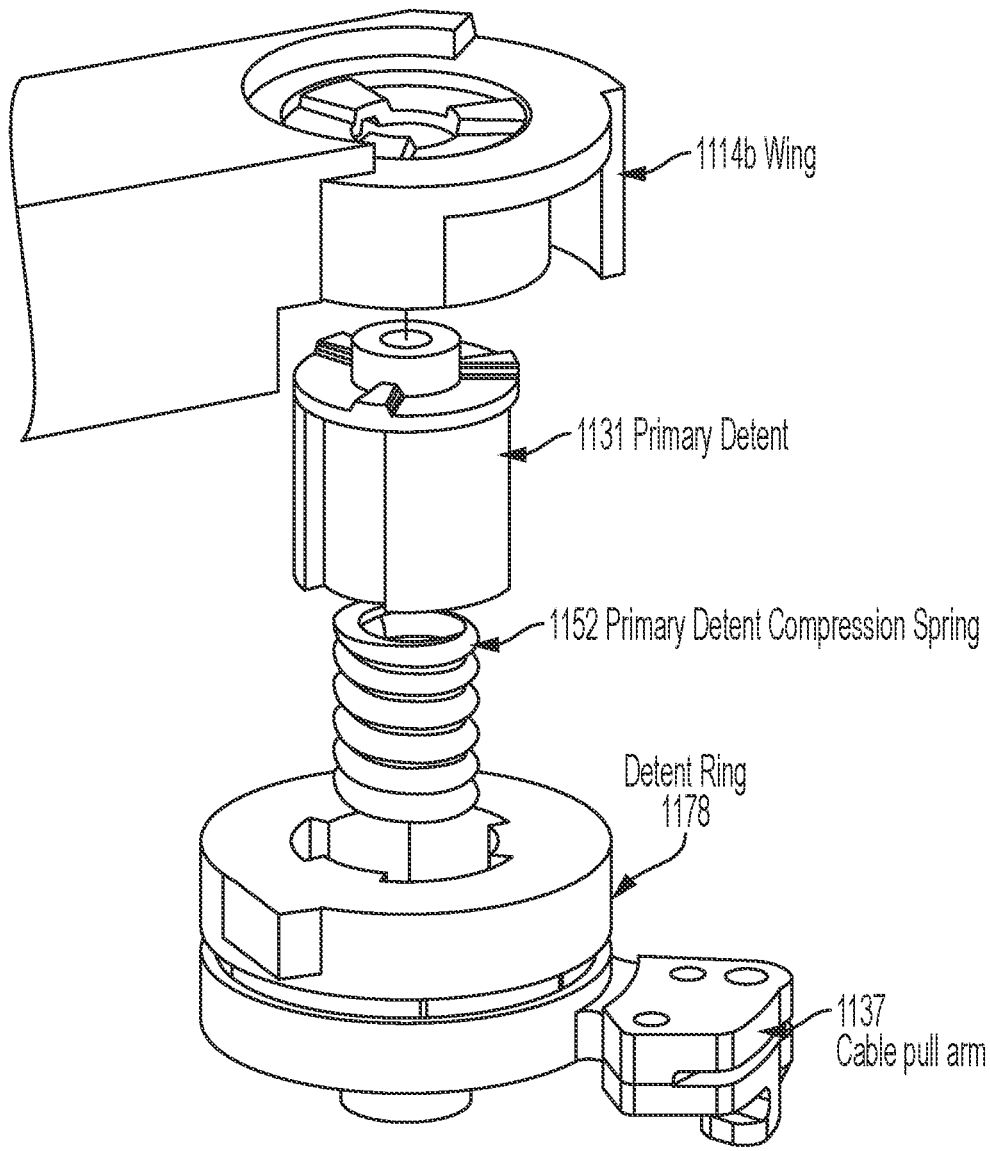

As shown in FIG. 61, the primary detent component 1131 connects the cable pull arm 1137 and the camera wing 1114b via the detent ring 1178. The primary detent 1131 separates or disengages from the camera wing during manual extension or a forward fold (when the camera wing is rotated beyond the extended position such as upon impact with an object). When the primary detent is engaged, it lifts the secondary detent 1133 out of position. Thus, there is no position in which more than one detent is engaged, providing more control and more consistent detent forces in every position. The primary detent 1131 is loaded with an internal compression spring 1152 to provide necessary retention forces to retain the camera wing in the detent positions.

Figure 59A:
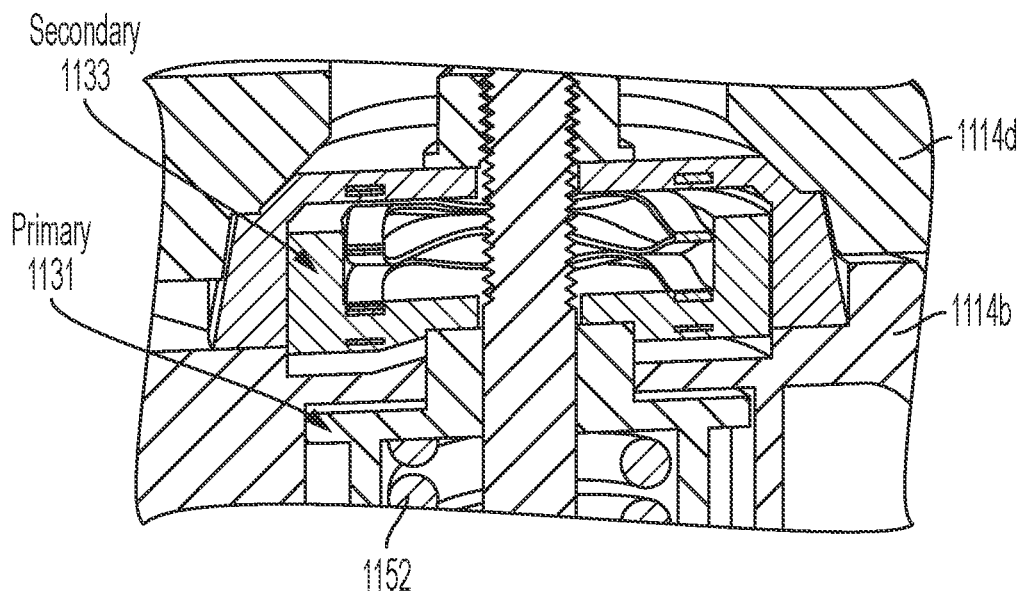
FIG. 59A is a cross-sectional view of an upper portion of the detent assembly.
Figure 59B:
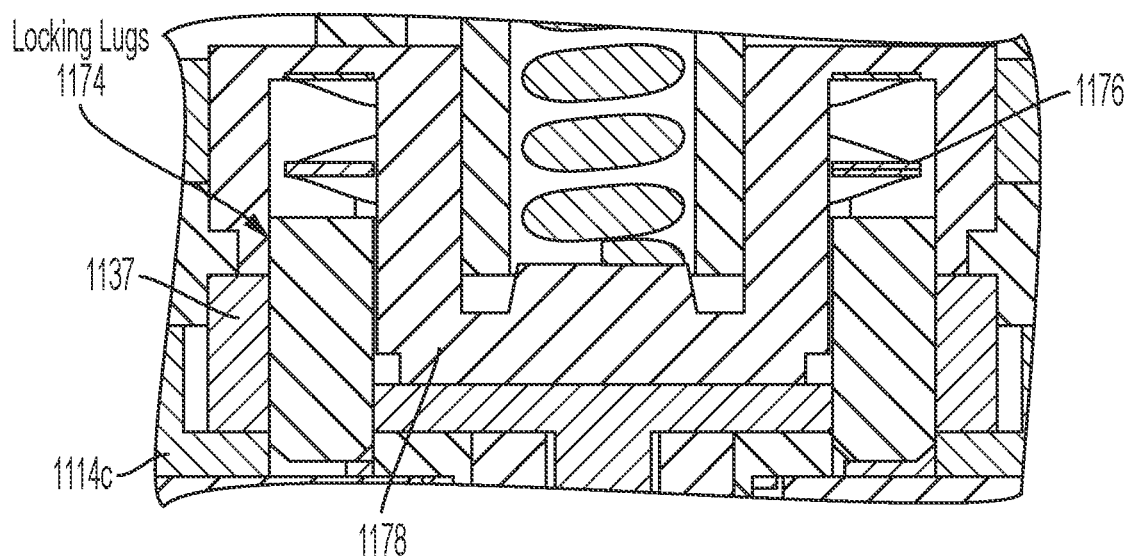
FIG. 59B is a cross-sectional view of a lower portion of the detent assembly.
Figure 62:
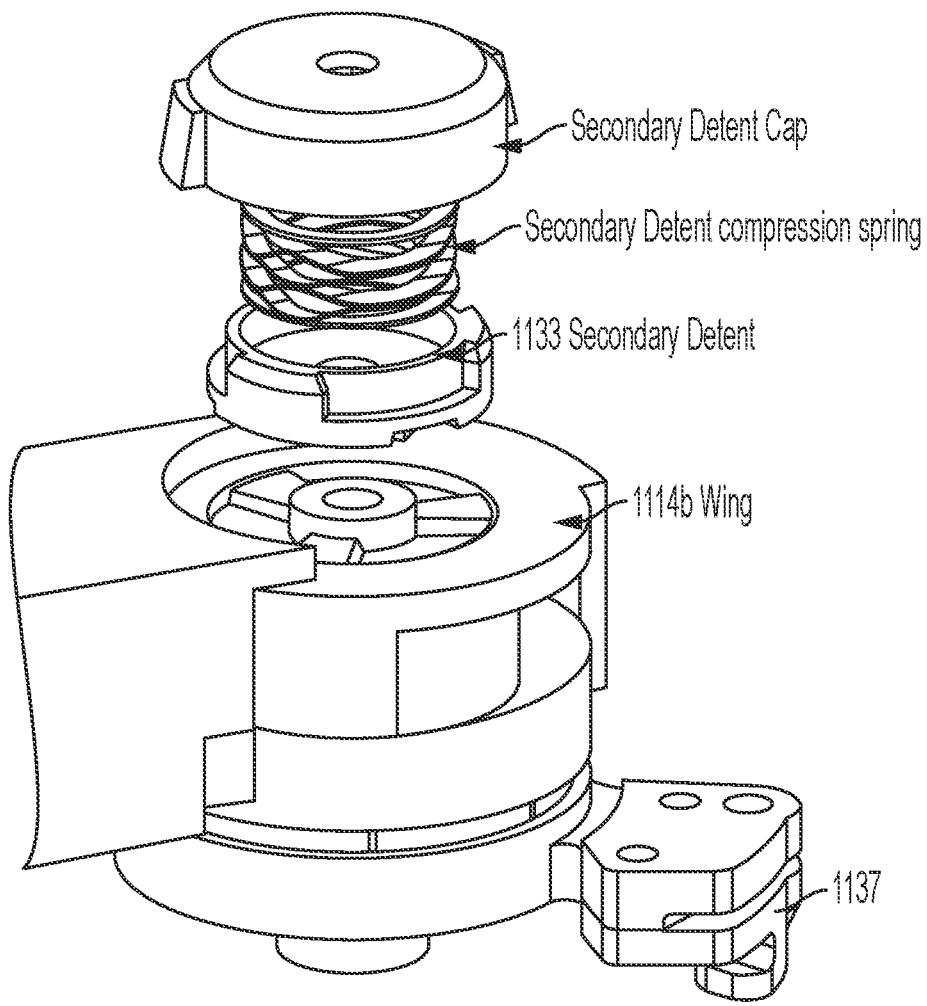
Figure 63:
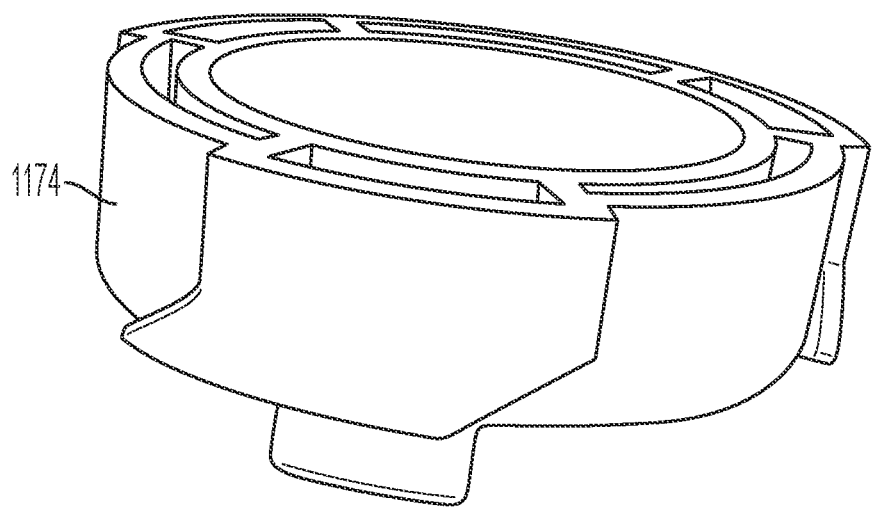
FIG. 63 is a perspective view of a locking lug component of the detent assembly.
Figure 64:
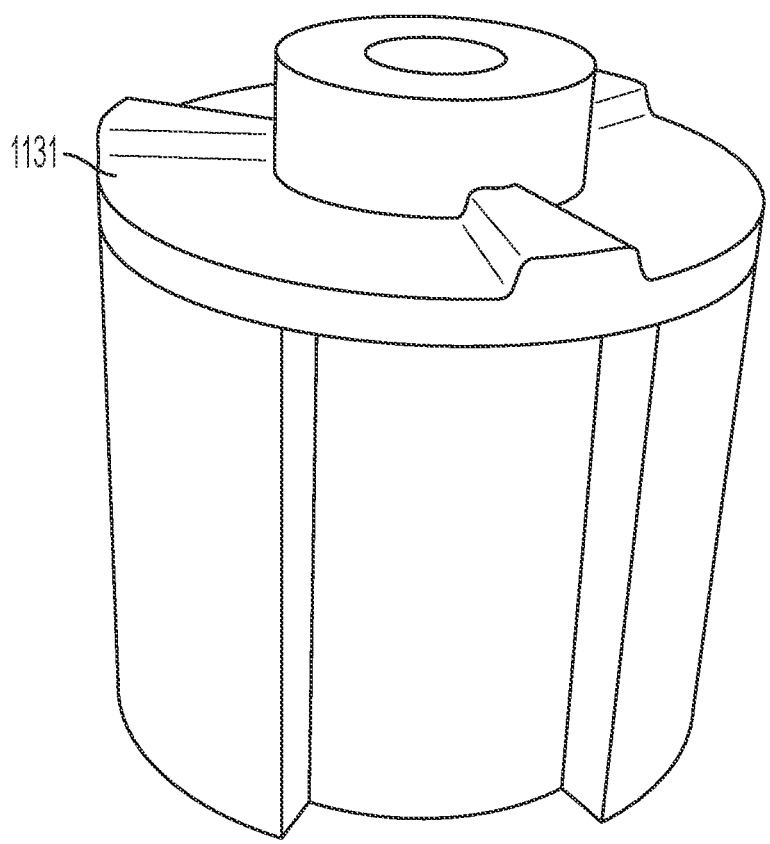
FIG. 64 is a perspective view of a primary detent component of the detent assembly.
Figure 65:
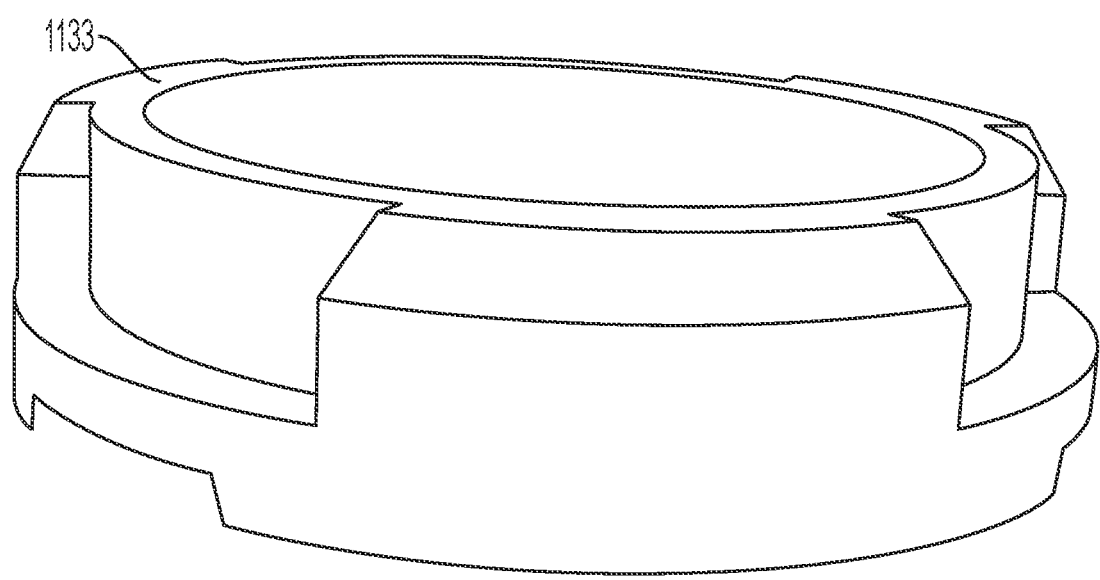
FIG. 65 is a perspective view of a secondary detent component of the detent assembly.

As shown in FIGS. 59A and 62, the secondary detent 1133 is disposed on top of the camera wing 1114b and connects the camera wing with an upper attachment plate 1114d and only makes connection with the attachment plate when the camera wing is manually extended (i.e., rotated from the park position to the extended position). The secondary detent 1133 may only engage the camera wing with the attachment plate once the camera wing has reached the extended position (such as about 70 percent of the camera wing's total rotational spectrum). In other words, when the camera wing is manually extended, the secondary detent 1133 provides a stop point for the camera wing and provides a detent force to retain the camera wing in the extended position. The detent force of the secondary detent is determined by the ramp angle of the detent surfaces in addition to the secondary detent compression spring positioned above the secondary detent and retained by the secondary detent cap.

Additionally, the secondary detent 1133 holds the camera wing in place during an electronic resync, allowing electronic recovery from the manually extended position. In other words, when the wing has been manually extended, the secondary detent engages the camera wing to hold the camera wing in place and the cable pull actuator can be activated to pull on the cable. The secondary detent prevents the wing from folding forward beyond the extended position and allows the primary detent to re-engage. When the primary detent re-engages, the secondary detent is forced to release. Once the primary detent is engaged, the wing can be deployed and retracted electrically as normal.

Figure 66:
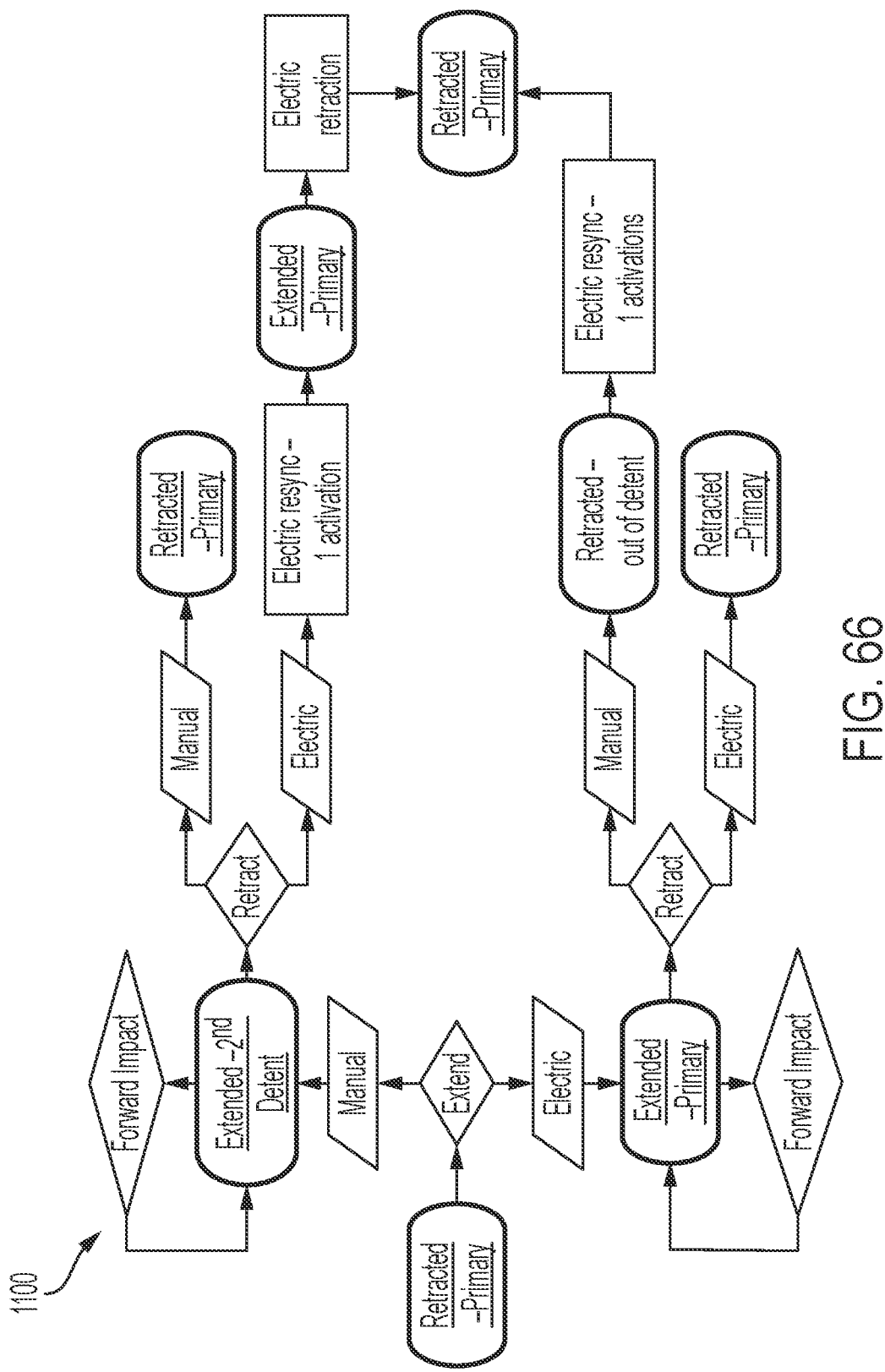
FIG. 66 is a flowchart showing the engagement of the detent assembly based on the position of the camera wing.

Thus, and as shown by the flowchart 1100 in FIG. 66, the camera wing is pivotable between the flush or retracted position and the extended position manually or via electric activation of the cable pull actuator. When in the retracted position, the primary detent is engaged with the camera wing. When electrically extended, the primary detent remains engaged and the camera wing is pivoted to the extended position with the primary detent engaged. If electrically retracted from extended position with the primary detent engaged, the primary detent remains engaged and the camera wing is pivoted to the retracted position. Thus, the primary detent does not release when the camera wing is operating electrically.

If, with the primary detent engaged at the extended position, the camera wing is retracted manually, the camera wing is retracted with both primary and secondary detents disengaged (a no detent position). From the retracted, no detent position, one activation of the electric cable pull actuator returns the cable pull arm into position via the torsion spring and brings the primary detent back into engagement and the camera wing remains retracted.

When the camera wing is extended manually, the primary detent is disengaged and the secondary detent is engaged. If the camera wing, in the extended position with the secondary detent engaged, is retracted manually, the primary detent re-engages and the camera wing is pivoted to the retracted position. If the camera wing, in the extended position with the secondary detent engaged, is retracted electrically, one electric activation of the cable pull actuator engages the primary detent in the extended position and a second electric activation of the cable pull actuator pivots the camera wing to the retracted position with the primary detent engaged.

If, when in the extended position (either with the primary or secondary detent engaged), the camera wing is manually pivoted beyond the extended position in a direction opposite the retracted position, the camera wing 1114*b* will fold forward toward a forward fold position and then return to its original extended position via the forward fold flap assembly 1138.

The camera or cameras may comprise any suitable imaging sensor or camera, such as a pixelated imaging array or the like, such as a CMOS imaging array sensor, a CCD sensor or other sensors or the like, such as a camera or sensor of the types disclosed in commonly assigned, U.S. Pat. Nos. 7,965,336; 5,550,677; 5,760,962; 6,097,023 and 5,796,094, which are hereby incorporated herein by reference in their entireties.

The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

Optionally, the camera may have a wide angle field of view at the side of the vehicle and/or may have an adjustable field of view and/or may capture images for use in other vision systems, such as for use in a top-down view or bird's-eye view vision system of the vehicle or a surround view vision system at the vehicle, such as by utilizing aspects of the vision systems described in U.S. Pat. Nos. 10,071,687; 9,900,522; 9,762,880; 9,126,525 and/or 9,041,806, and/or U.S. Publication Nos. US-2015-0022664 and/or US-2012-0162427, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular camera monitoring system comprising:
    an electronic control unit (ECU) disposed at a vehicle equipped with the vehicular camera monitoring system, wherein the ECU comprises electronic circuitry and associated software;
    a support arm movably disposed at a side portion of the vehicle, wherein the support arm has a base end attached at the side portion and a distal end opposite the base end;
    a camera disposed at the distal end of the support arm;
    wherein the camera comprises a lens and an imager, and wherein the imager comprises a two-dimensional imaging array having at least one million photosensors arranged in rows and columns;
    wherein the support arm is movable between a stowed position and an extended position;
    wherein, with the support arm in the stowed position, the support arm is at a rearward aperture at the side portion of the vehicle with an outer surface of the support arm being co-planar with an outer surface of the side portion, and wherein the rearward aperture is disposed closer to a rear of the vehicle from where the base end of the support arm is attached at the side portion of the vehicle;
    wherein, with the support arm in the stowed position and with the outer surface of the support arm co-planar with the outer surface of the side portion, the camera is positioned inboard of the outer surface of the side portion;
    wherein, with the support arm in the extended position, the support arm is extended from the side portion so that the camera is positioned outboard from the side portion of the vehicle;

a rearward cover element that covers the rearward aperture at the side portion at least when the support arm is in the extended position;

wherein the rearward cover element is movable between a covering position, where the rearward cover element covers the rearward aperture, and a non-covering position, where the rearward cover element does not cover the rearward aperture;

wherein, with the support arm in the extended position, the rearward cover element is in the covering position, and wherein, with the support arm in the stowed position, the rearward cover element is in the non-covering position;

wherein the support arm is movable beyond the extended position in an opposite direction from the stowed position, and wherein, when the support arm is moved beyond the extended position in the opposite direction from the stowed position, the support arm is at least partially received at a forward aperture at the side portion of the vehicle, and wherein the forward aperture is disposed closer to a front of the vehicle than the rearward aperture at the side portion of the vehicle;

wherein the camera, with the support arm in the extended position, captures image data and provides captured image data to the ECU; and wherein the captured image data is processed at the ECU for at least one selected from the group consisting of (i) display of video images derived from image data captured by the camera and provided to the ECU and (ii) detection of an object present exterior of the vehicle that is in a field of view of the camera.

2. The vehicular camera monitoring system of claim 1, wherein the rearward cover element is movably mounted at the side portion of the vehicle via a pair of parallel linkages that pivot to move the rearward cover element between the covering position and the non-covering position.

3. The vehicular camera monitoring system of claim 1, wherein the rearward cover element is spring-biased toward the covering position.

4. The vehicular camera monitoring system of claim 1, wherein the support arm is pivotally mounted at the side portion of the vehicle.

5. The vehicular camera monitoring system of claim 4, wherein the rearward cover element is pivotally mounted at the side portion of the vehicle and pivots between the covering position and the non-covering position.

6. The vehicular camera monitoring system of claim 5, wherein the support arm and the rearward cover element are pivotable about a common pivot axis.

7. The vehicular camera monitoring system of claim 5, wherein the support arm and the rearward cover element are pivotable about different pivot axes.

8. The vehicular camera monitoring system of claim 4, comprising a forward cover element disposed forward of a pivot axis of the support arm in a direction toward the front of the vehicle, wherein the forward cover element is in a forward covering position that covers the forward aperture when the support arm is in the extended position and when the support arm is in the stowed position, and wherein the forward cover element is moved from the forward covering position to a forward non-covering position when the support arm is moved beyond the extended position in the opposite direction from the stowed position.

9. The vehicular camera monitoring system of claim 8, wherein the forward cover element is spring-biased toward the forward covering position, and wherein, when the support arm is moved beyond the extended position in the opposite direction from the stowed position, the support arm is spring-biased toward the extended position.

10. The vehicular camera monitoring system of claim 8, wherein, when the support arm is moved beyond the extended position in the opposite direction from the stowed position and is at least partially received at the forward aperture, a biasing element biases the support arm toward the extended position and biases the forward cover element toward the forward covering position.

11. The vehicular camera monitoring system of claim 1, comprising a base portion that is mounted at the rearward aperture at the side portion of the vehicle, wherein the support arm is received in a recess of the base portion when in the stowed position.

12. The vehicular camera monitoring system of claim 1, comprising a video display screen disposed in the vehicle, wherein the video display screen displays video images derived from image data captured by the camera and provided by the ECU.

13. The vehicular camera monitoring system of claim 12, wherein the video display screen comprises a video mirror display screen disposed at an interior rearview mirror assembly of the vehicle.

14. A vehicular camera monitoring system comprising:

an electronic control unit (ECU) disposed at a vehicle equipped with the vehicular camera monitoring system, wherein the ECU comprises electronic circuitry and associated software;

a base portion disposed at a side portion of the vehicle, the base portion comprising a rearward aperture that is within the side portion of the vehicle;

a support arm pivotally disposed at the base portion, wherein the support arm has a base end pivotally attached at the base portion and a distal end opposite the base end;

a camera disposed at the distal end of the support arm;

wherein the camera comprises a lens and an imager, and wherein the imager comprises a two-dimensional imaging array having at least one million photosensors arranged in rows and columns;

wherein the support arm is pivotable between a stowed position and an extended position;

wherein, with the support arm in the stowed position, the support arm is at least partially within the rearward aperture of the base portion with an outer surface of the support arm being co-planar with an outer surface of the side portion of the vehicle, and wherein the rearward aperture is disposed closer to a rear of the vehicle from where the base end of the support arm is attached at the base portion;

wherein, with the support arm in the stowed position and with the outer surface of the support arm co-planar with the outer surface of the side portion, the camera is positioned inboard of the outer surface of the side portion;

wherein, with the support arm in the extended position, the support arm is extended from the side portion so that the camera is positioned outboard from the side portion of the vehicle;

a rearward cover element that covers the rearward aperture of the base portion at least when the support arm is in the extended position;

wherein the rearward cover element is movable between a covering position, where the rearward cover element covers the rearward aperture, and a non-covering position, where the rearward cover element does not cover the rearward aperture;

wherein the rearward cover element is spring-biased toward the covering position;

wherein, with the support arm in the extended position, the rearward cover element is in the covering position, and wherein, with the support arm is in the stowed position, the rearward cover element is in the non-covering position;

wherein the support arm is movable beyond the extended position in an opposite direction from the stowed position, and wherein, when the support arm is moved beyond the extended position in the opposite direction from the stowed position, the support arm is at least partially received at a forward aperture of the base portion, and wherein the forward aperture is disposed closer to a front of the vehicle than the rearward aperture of the base portion;

wherein the camera, with the support arm in the extended position, captures image data and provides captured image data to the ECU;

a video display screen disposed in the vehicle; and wherein the captured image data is processed at the ECU for display at the video display screen of video images derived from image data captured by the camera and provided to the ECU.

15. The vehicular camera monitoring system of claim 14, wherein the rearward cover element is movably mounted at the base portion via a pair of parallel linkages that pivot to move the rearward cover element between the covering position and the non-covering position.

16. The vehicular camera monitoring system of claim 14, wherein the support arm and the rearward cover element are pivotable about a common pivot axis.

17. The vehicular camera monitoring system of claim 14, wherein the support arm and the rearward cover element are pivotable about different pivot axes.

18. The vehicular camera monitoring system of claim 14, comprising a forward cover element disposed forward of a pivot axis of the support arm in a direction toward the front of the vehicle, wherein the forward cover element is in a forward covering position that covers the forward aperture of the base portion when the support arm is in the extended position and when the support arm is in the stowed position, and wherein the forward cover element is moved from the forward covering position to a forward non-covering position when the support arm is moved beyond the extended position in the opposite direction from the stowed position.

19. The vehicular camera monitoring system of claim 18, wherein the forward cover element is spring-biased toward the forward covering position, and wherein, when the support arm is moved beyond the extended position in the opposite direction from the stowed position, the support arm is spring-biased toward the extended position.

20. The vehicular camera monitoring system of claim 18, wherein, when the support arm is moved beyond the extended position in the opposite direction from the stowed position and is at least partially received at the forward aperture, a biasing element biases the support arm toward the extended position and biases the forward cover element toward the forward covering position.

21. The vehicular camera monitoring system of claim 14, wherein the video display screen comprises a video mirror display screen disposed at an interior rearview mirror assembly of the vehicle.

22. A vehicular camera monitoring system comprising:

an electronic control unit (ECU) at a vehicle equipped with the vehicular camera monitoring system, wherein the ECU comprises electronic circuitry and associated software;

a support arm having (i) a base end pivotally attached at a side portion of the vehicle and (ii) a distal end opposite the base end;

a camera disposed at the distal end of the support arm;

wherein the camera comprises a lens and an imager, and wherein the imager comprises a two-dimensional imaging array having at least one million photosensors arranged in rows and columns;

wherein the support arm is pivotable between a stowed position and an extended position;

wherein, with the support arm in the stowed position, the support arm is at a rearward aperture at the side portion of the vehicle with an outer surface of the support arm being co-planar with an outer surface of the side portion, and wherein the rearward aperture is disposed closer to a rear of the vehicle from where the base end of the support arm is attached at the side portion of the vehicle;

wherein, with the support arm in the stowed position and with the outer surface of the support arm co-planar with the outer surface of the side portion, the camera is positioned inboard of the outer surface of the side portion;

wherein, with the support arm in the extended position, the support arm is extended from the side portion so that the camera is positioned outboard from the side portion of the vehicle;

wherein the support arm is movable beyond the extended position in an opposite direction from the stowed position, and wherein, when the support arm is moved beyond the extended position in the opposite direction from the stowed position, the support arm is at least partially received at a forward aperture at the side portion of the vehicle, and wherein the forward aperture is disposed closer to a front of the vehicle than the rearward aperture at the side portion of the vehicle;

wherein the support arm is pivotable relative to the side portion of the vehicle via an actuator;

wherein the actuator comprises a drive portion disposed within the side portion of the vehicle, and wherein the drive portion comprises an electrical motor;

wherein the actuator comprises a linkage that is connected between (i) the drive portion and (ii) the support arm;

wherein the drive portion, when the electrical motor is operated, moves the linkage to pivot the support arm relative to the side portion of the vehicle;

wherein the camera, with the support arm in the extended position, captures image data and provides captured image data to the ECU; and wherein the captured image data is processed at the ECU for at least one selected from the group consisting of (i) display of video images derived from image data captured by the camera and provided to the ECU and (ii) detection of an object present exterior of the vehicle that is in a field of view of the camera.

23. The vehicular camera monitoring system of claim 22, comprising a video display screen disposed in the vehicle, wherein the video display screen is operable to display video images derived from image data captured by the camera and provided by the ECU.

24. The vehicular camera monitoring system of claim 23, wherein the video display screen comprises a video mirror display screen disposed at an interior rearview mirror assembly of the vehicle.

25. The vehicular camera monitoring system of claim 22, wherein the linkage comprises a flexible cable.

26. The vehicular camera monitoring system of claim 22, wherein the linkage comprises a belt that engages a pulley of the drive portion and a pulley of the support arm.

27. The vehicular camera monitoring system of claim 22, further comprising a rearward cover element that covers the rearward aperture at the side portion at least when the support arm is in the extended position.

28. The vehicular camera monitoring system of claim 27, wherein the rearward cover element is movable between a covering position, where the rearward cover element covers the rearward aperture, and a non-covering position, where the rearward cover element does not cover the rearward aperture.

29. The vehicular camera monitoring system of claim 28, wherein, with the support arm in the extended position, the rearward cover element is in the covering position, and wherein, with the support arm in the stowed position, the rearward cover element is in the non-covering position.

30. The vehicular camera monitoring system of claim 1, wherein the support arm is pivotable relative to the side portion of the vehicle via an actuator, and wherein the actuator comprises a drive portion disposed within the side portion of the vehicle, and wherein the drive portion comprises an electrical motor, and wherein the actuator comprises a linkage that is connected between (i) the drive portion and (ii) the support arm, and wherein the drive portion, when the electrical motor is operated, moves the linkage to pivot the support arm relative to the side portion of the vehicle.

31. The vehicular camera monitoring system of claim 30, wherein the linkage comprises a flexible cable.

32. The vehicular camera monitoring system of claim 30, wherein the linkage comprises a belt that engages a pulley of the drive portion and a pulley of the support arm.

33. The vehicular camera monitoring system of claim 14, wherein the support arm is pivotable relative to the base portion via an actuator, and wherein the actuator comprises a drive portion disposed within the side portion of the vehicle, and wherein the drive portion comprises an electrical motor, and wherein the actuator comprises a linkage that is connected between (i) the drive portion and (ii) the support arm, and wherein the drive portion, when the electrical motor is operated, moves the linkage to pivot the support arm relative to the base portion.

34. The vehicular camera monitoring system of claim 33, wherein the linkage comprises a flexible cable.

35. The vehicular camera monitoring system of claim 33, wherein the linkage comprises a belt that engages a pulley of the drive portion and a pulley of the support arm.

\* \* \* \* \*